United States Patent
Nakamura et al.

(10) Patent No.: US 7,489,796 B2
(45) Date of Patent: Feb. 10, 2009

(54) ELECTRONIC WATERMARK EMBEDDING DEVICE, ELECTRONIC WATERMARK DETECTION DEVICE, METHOD THEREOF, AND PROGRAM

(75) Inventors: Takao Nakamura, Yokohama (JP); Atushi Katayama, Setagaya-ku (JP); Masashi Yamamuro, Yokohama (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 693 days.

(21) Appl. No.: 10/548,672

(22) PCT Filed: Jan. 31, 2005

(86) PCT No.: PCT/JP2005/001347
§ 371 (c)(1),
(2), (4) Date: Sep. 8, 2005

(87) PCT Pub. No.: WO2005/074249
PCT Pub. Date: Aug. 11, 2005

(65) Prior Publication Data
US 2006/0126889 A1 Jun. 15, 2006

(30) Foreign Application Priority Data
Feb. 2, 2004 (JP) ............................. 2004-025899
May 28, 2004 (JP) ............................. 2004-159843

(51) Int. Cl.
*G06K 9/00* (2006.01)
*G06K 9/36* (2006.01)
*H04L 9/00* (2006.01)

(52) U.S. Cl. ...................... 382/100; 382/232; 713/176

(58) Field of Classification Search ................ 382/100, 382/232, 140, 246; 713/176, 179; 370/522–829; 283/72, 74–81, 93, 113, 901, 902; 348/461, 348/463; 380/51, 54, 210, 252, 287
See application file for complete search history.

(56) References Cited

U.S. PATENT DOCUMENTS 6,282,300 B1 * 8/2001 Bloom et al. ............... 382/100

(Continued)

FOREIGN PATENT DOCUMENTS

JP 11-98479 4/1999

(Continued)

OTHER PUBLICATIONS

U.S. Appl. No. 10/548,755, filed Sep. 8, 2005, Nakamura, et al.

(Continued)

*Primary Examiner*—Samir A Ahmed
*Assistant Examiner*—Mehdi Rashidian
(74) *Attorney, Agent, or Firm*—Oblon, Spivak, McClelland, Maier & Neustadt, P.C.

(57) ABSTRACT

A digital watermark embedding apparatus for embedding digital watermark information by superimposing macroblock patterns on an image is disclosed. The digital watermark embedding apparatus: spreads input digital watermark information to obtain an embedding series having a length corresponding to a number of pixel blocks of a macroblock pattern; selects at least a frequency from among predetermined plural frequencies according to a term value of the embedding series corresponding to a position of a pixel block in the macroblock pattern, and sets a waveform pattern corresponding to the selected frequency as a pixel of the pixel block; and amplifies, with an embedding strength value, the macroblock pattern on which a waveform pattern is superimposed on each pixel block by the waveform pattern setting unit, and superimposes the macroblock pattern on an input image like a tile.

20 Claims, 67 Drawing Sheets

U.S. PATENT DOCUMENTS

| | | | |
|---|---|---|---|
| 6,424,725 B1 * | 7/2002 | Rhoads et al. | 382/100 |
| 6,563,937 B1 * | 5/2003 | Wendt | 382/100 |
| 2003/0185417 A1 * | 10/2003 | Alattar et al. | 382/100 |

FOREIGN PATENT DOCUMENTS

| | | |
|---|---|---|
| JP | 11-355547 | 12/1999 |
| JP | 2003-209676 | 7/2003 |
| JP | 2003-219141 | 7/2003 |
| WO | WO 03/105068 A1 | 12/2003 |

OTHER PUBLICATIONS

U.S. Appl. No. 10/548,672, filed Sep. 8, 2005, Nakamura, et al.

* cited by examiner

FIG.12
(a) BINARIZING
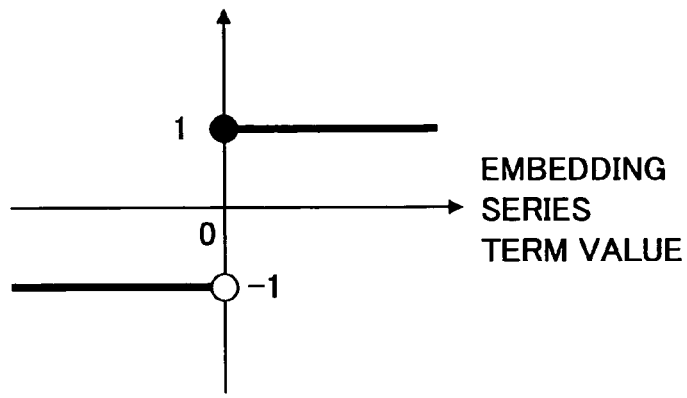
(b) QUANTIZING TO THREE VALUES
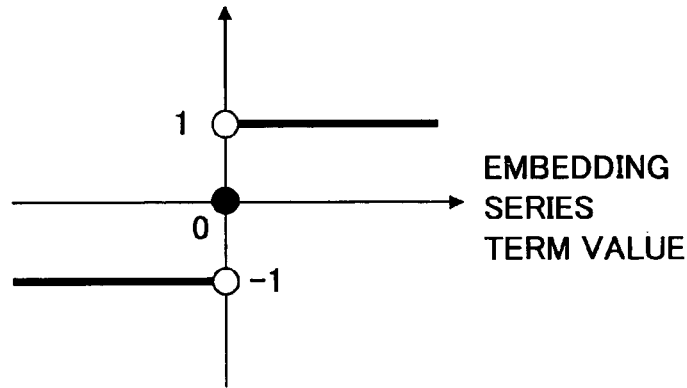
(c) QUANTIZING TO n VALUES
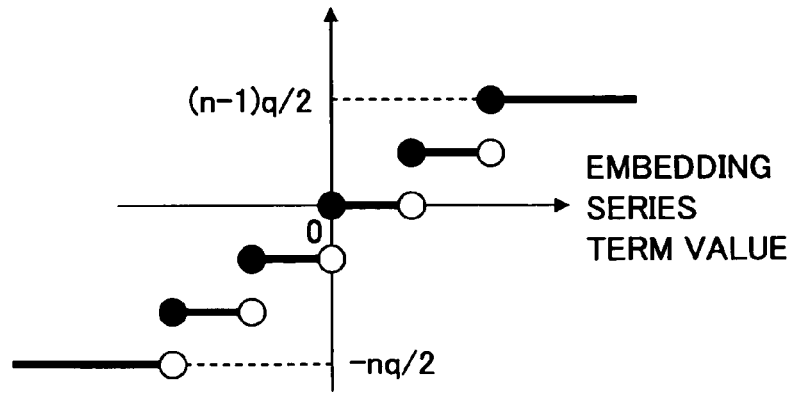

MACROBLOCK PATTERN
(WHEN NUMBER OF BLOCKS IS 3 X 3)

FIG.30

| -1 |  | -1 |  | -1 |
|---|---|---|---|---|
|  |  |  |  |  |
| -1 |  | 8 |  | -1 |
|  |  |  |  |  |
| -1 |  | -1 |  | -1 |

CONVOLUTION OPERATOR

● : START POSITION OF MACROBLOCK PATTERN WHEN EMBEDDING
▲ : START POSITION OF ADDED MACROBLOCK

BLOCK BORDER

FIG.53
PIXEL BLOCK GROUP CORRESPONDING
TO EACH FILTER PROCESSED IMAGE
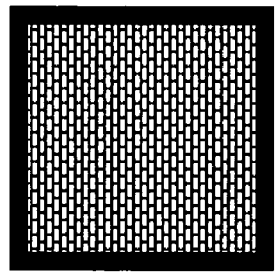 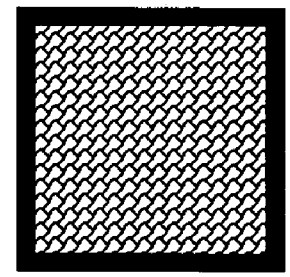
OBTAIN TOTAL SUM OF ABSOLUTE VALUES
OF PIXEL VALUES IN PIXEL BLOCK
100     500
PIXEL ABSOLUTE VALUE SUM GROUP
CORRESPONDING TO EACH PIXEL BLOCK

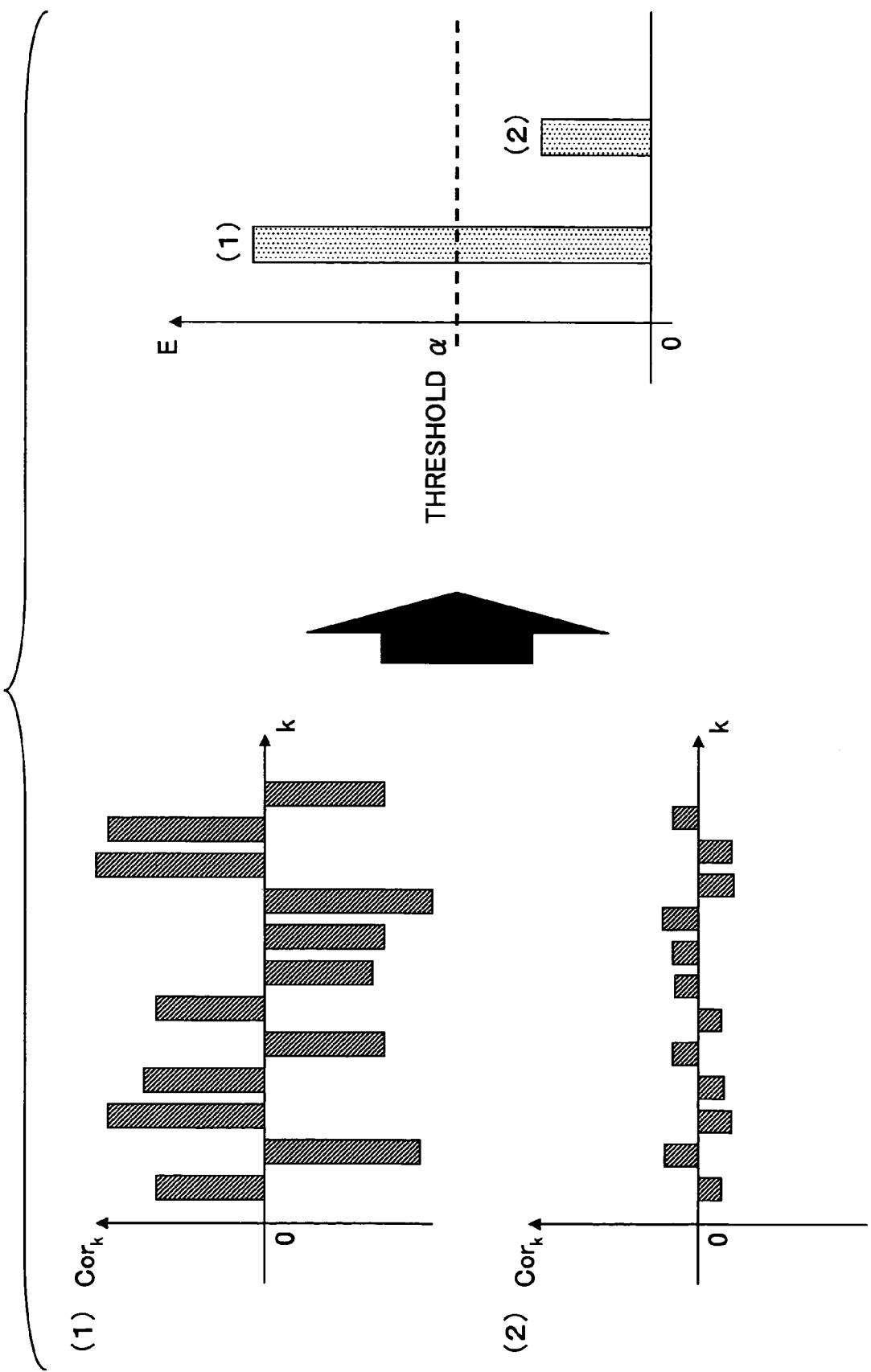

ELECTRONIC WATERMARK EMBEDDING DEVICE, ELECTRONIC WATERMARK DETECTION DEVICE, METHOD THEREOF, AND PROGRAM

TECHNICAL FIELD

The present invention relates to a digital watermark technology that is a technology for embedding sub-information into content such as an image or video such that the sub-information cannot be perceived by a human and for reading the sub-information. The digital watermark technology is currently used in copyright protection/management systems for content and in content service providing systems.

BACKGROUND ART

In order to achieve objectives for identifying and managing content and providing related information when distributing content such as the image, video and voice, there is a method using the digital watermark technology for imperceptibly embedding another information into the content. Generally, a digital watermark detection object image is subjected to geometric transformation so that it includes geometric distortion. Therefore, a digital watermark technology that has tolerance to such geometric transformation is needed.

As a conventional technology for detecting and correcting the geometric transformation, there is a technology described in the patent document 1. In the technology described in the patent document 1, a pattern for correcting geometric transformation is embedded separately from an embedding image so that the geometric transformation is detected by using the pattern.

[patent document 1] Japanese Laid Open Patent Application No. 11-355547

DISCLOSURE OF THE INVENTION

Problem to be Solve by the Invention

However, according to the conventional technology, since the pattern for geometric transformation correction is separated from the embedding image, there is a problem in that interference occurs between the signal of the pattern for the geometric transformation correction and the signal of the embedding image. Therefore, for increasing accuracy of geometric transformation correction, the pattern signal needs to be strengthened. But, to keep deterioration of image quality constant, the embedding image is inevitably weakened. On the other hand, when the embedding image is strengthened, the signal for geometric transformation correction needs to be weakened. At all events, detection accuracy for embedding information deteriorates.

The present invention is contrived from the viewpoint of the above-mentioned problems, and an object of the present invention is to provide a digital watermark embedding technology and a digital watermark detection technology that enable geometric transformation correction without independently adding the signal for geometric transformation correction separately from digital watermark information as conventionally performed.

Means for Solving the Problem

The object is achieved by a digital watermark embedding apparatus for embedding digital watermark information by superimposing macroblock patterns on an image, the digital watermark embedding apparatus including:

a digital watermark information spreading unit for spreading input digital watermark information to obtain an embedding series having a length corresponding to a number of pixel blocks of a macroblock pattern;

a waveform pattern setting unit for selecting at least a frequency from among predetermined plural frequencies according to a term value of the embedding series corresponding to a position of a pixel block in the macroblock pattern, and setting a waveform pattern corresponding to the selected frequency as a pixel of the pixel block; and a macroblock pattern superimposing unit for amplifying, with an embedding strength value, the macroblock pattern on which a waveform pattern is superimposed on each pixel block by the waveform pattern setting unit, and superimposing the macroblock pattern on an input image like a tile.

The macroblock pattern in the present invention corresponds to embedding digital watermark information, and can be used for geometric distortion correction. Thus, geometric distortion correction can be performed without independently adding a signal for geometric distortion correction separately from digital watermark information.

The waveform pattern setting unit may quantize the term value of the embedding series, and select the at least a frequency according to the quantized value, or may select the at least a frequency according to a sign of the term value of the embedding series.

The waveform pattern setting unit may set the waveform pattern on each pixel block while changing phases such that, among plural pixel blocks on which waveform patterns of the same frequency are set in the macroblock pattern, phases of the waveform patterns are aligned on the macroblock pattern.

In addition, the macroblock superimposing unit may superimpose the macroblock pattern on the input image while changing phases of waveform patterns of the same frequency in pixel blocks in the macroblock pattern such that phases of the waveform patterns of the same frequency are aligned on the image after the macroblock pattern is superimposed.

The above-object can be also achieved by a digital watermark detection apparatus for detecting digital watermark information from an image on which macroblock patterns each being formed by arranging pixel blocks including plural waveform patterns are superimposed, the digital watermark detection apparatus including:

a linear transformation distortion correction unit for performing linear transformation distortion correction for an input image by using at least two peak position information in a power spectrum matrix obtained by performing discrete Fourier transform on an input image and predetermined reference position information;

an added macroblock generation unit for dividing, from an arbitrary position, the linear transformation distortion corrected image into macroblocks each having a size of the macroblock pattern, and adding the macroblocks obtained by the division to generate an added macroblock;

a frequency-by-frequency filter processed image group generation unit for applying a convolution process using each of convolution operators corresponding to predetermined plural kinds of frequencies on the added macroblock to obtain filter processed images each corresponding to one of the frequencies;

a search position setting unit for setting coordinates of a point in a predetermined search region;

a block cut out position response value calculation unit for performing block dividing on each image in the filter processed images each corresponding to one of the frequencies using the coordinates as a block cut out position, obtaining pixel blocks located in the same block position from the images each corresponding to one of the frequencies, obtaining, for each pixel block in the pixel blocks located in the same block position, sum of absolute values of pixel values of all pixels in the pixel block to obtain a pixel absolute value sum group and obtain a largest value in the pixel absolute value sum group as a largest absolute value sum, and performing processes for obtaining the largest absolute value sum for every block position to obtain total sum of largest absolute value sums and output the total sum as a block cut out position response value;

a block cut out position detection unit for obtaining block cut out position response values by the block cut out position response value calculation unit for each point in the search region set by the search position setting unit, and detecting, as the block cut out position, coordinates corresponding to a largest block cut out position response value among block cut out position response values corresponding to each point;

a detection value matrix configuration unit for performing block dividing on each image of the filter processed images each corresponding to one of the frequencies using the block cut out position detected by the block cut out position detection unit, and from each image corresponding to one of the frequencies, obtaining, for each pixel block in a pixel block group corresponding to the same block position, sum of absolute values of pixel values of all pixels in the pixel block, and using at least a frequency corresponding to a pixel block having the largest absolute sum to obtain an element value of a detection value matrix corresponding to a block position of the pixel block, and performing processes for obtaining the element value for every pixel block to obtain the detection value matrix; and a watermark information despreading unit for obtaining a detection object series from the detection value matrix, and despreading the detection object series to obtain detected digital watermark information.

According to the present invention, the macroblock pattern embedded as digital watermark information can be used for geometric transformation correction.

The watermark information despreading unit may include:

a rotation unit for generating four matrixes by rotating arrangement of elements of the detection value matrix by 0 degree, 90 degrees, 180 degrees and 270 degrees respectively, and reversing each sign of all elements of two matrixes rotated by 90 degrees and 270 degrees respectively;

a conversion unit for performing, for each of four matrixes obtained by the rotation unit, a process for cyclically shifting elements such that a particular element position in the matrix moves to a predetermined position so as to obtain a converted detection value matrix group for each element position;

a unit for obtaining a detection object series group from each matrix in the converted detection value matrix group, and outputting, as the detected digital watermark information, a most reliable piece of information in an information group obtained by despreading each detection object series in the detection object series group.

The plural frequencies can be two kinds of frequencies associated with a sign + and a sign − respectively, and the detection value matrix configuration unit may determine a value, as the element value of the detection value matrix corresponding to the block position of the pixel block, by subtracting an absolute value sum of the pixel block corresponding to a frequency associated with the sign − from an absolute value sum of the pixel block corresponding to a frequency associated with the sign +. In addition, the detection value matrix configuration unit may determine a value, as the element value of the detection value matrix corresponding to the block position of the pixel block, by adding a sign corresponding to a frequency associated with a pixel block having a larger absolute value sum to an absolute value of a difference between absolute value sums of pixel blocks corresponding to the two kinds of frequencies.

EFFECT OF THE INVENTION

According to the present invention, digital watermark detection can be performed by correcting affine transformation (linear transformation + translation) added to the image without using the frame line and the like. In addition, without independently adding a signal for geometric transformation correction separately from digital watermark information as performed conventionally, the pattern representing the digital watermark information also functions as the signal for geometric transformation correction, so that the problem of the interference of signals is solved and detection performance improves.

BRIEF DESCRIPTION OF THE DRAWINGS

FIG. 12 is a diagram for explaining processes of an embedding series term quantization unit 29;

FIG. 30 is a diagram for explaining processes of the peak position search unit 47;

FIG. 53 is a diagram for explaining processes of a pixel absolute value calculation unit 73;

FIG. 67 is a diagram for explaining digital watermark presence or absence index value.

[Explanation of Symbols]

Figure 1:
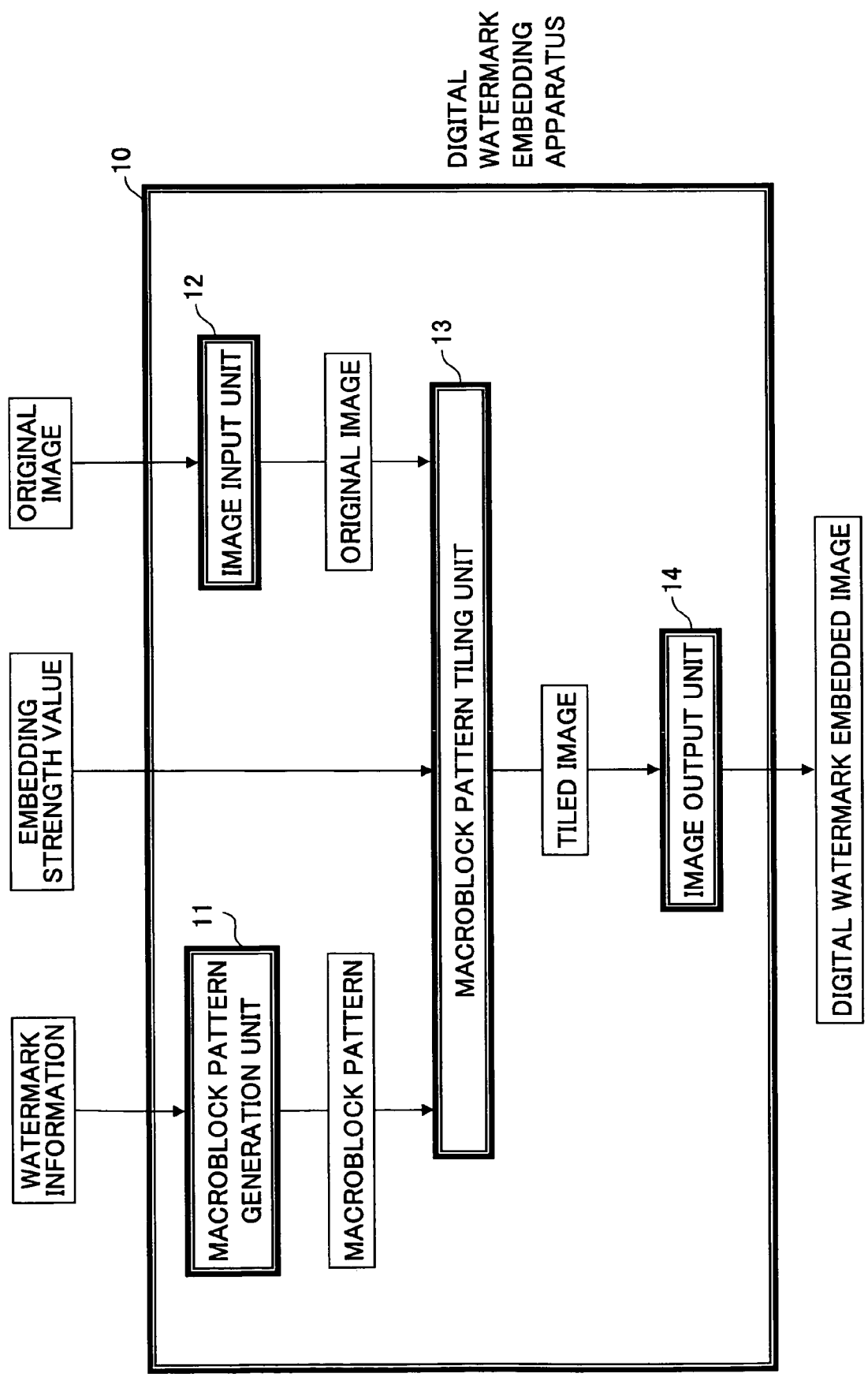
FIG. 1 is a block diagram of a digital watermark embedding apparatus 10 of an embodiment of the present invention.

10 digital watermark embedding apparatus
11 macroblock pattern generation unit
12 image input unit
13 macroblock pattern tiling unit
14 image output unit
16 watermark information spreading unit
17 frequency selection unit
18 waveform pattern generation unit
19 macroblock pattern setting unit
21 error correction/detection encoding unit
22 pseudorandom number generator
23 embedding series generation unit
25 embedding series term sign obtaining unit
26 selection unit
27 sign corresponding frequency database
29 embedding series term quantization unit
30 selection unit
31 quantization corresponding frequency database
33 amplifying unit
34 tiling superimposing unit
40 digital watermark detection apparatus
41 linear transformation distortion correction unit
42 added macroblock generation unit
43 detection value matrix generation unit
44 watermark information despreading unit
46 discrete Fourier transform unit
47 peak position search unit
48 linear transformation matrix estimation unit
49 image transformation unit
51 largest peak position search unit
52 second peak position search unit
53 peak position information output unit
55 peak position information conversion unit
56 spectrum space linear transformation matrix calculation unit
57 image correction linear transformation calculation unit
59 macroblock dividing unit
60 macroblock adding unit
62 filter processed image group generation unit corresponding to each frequency
63 block cut out position detection unit
64 detection value matrix configuration unit 65 sign corresponding frequency database
67 search position setting unit
68 block cut out position response value calculation unit
69 block cut out position response value buffer
70 block cut out position determination unit
72 block dividing unit
73 pixel absolute value sum calculation unit
74 largest absolute value sum determination unit
75 largest absolute value sum adding unit
77 block dividing unit
78 pixel absolute value sum calculation unit
79 largest energy frequency determination unit
80 detection value matrix element value setting unit
82 detection value matrix conversion unit
83 one-dimensionalizing process unit
84 pseudorandom number generation unit
85 despreading unit
86 decoding object information selection unit
87 error correction/detection decoding unit
89 90° by 90° rotation unit
90 macroblock start position conversion unit

PREFERRED EMBODIMENT FOR CARRYING OUT THE INVENTION

Figure 2:
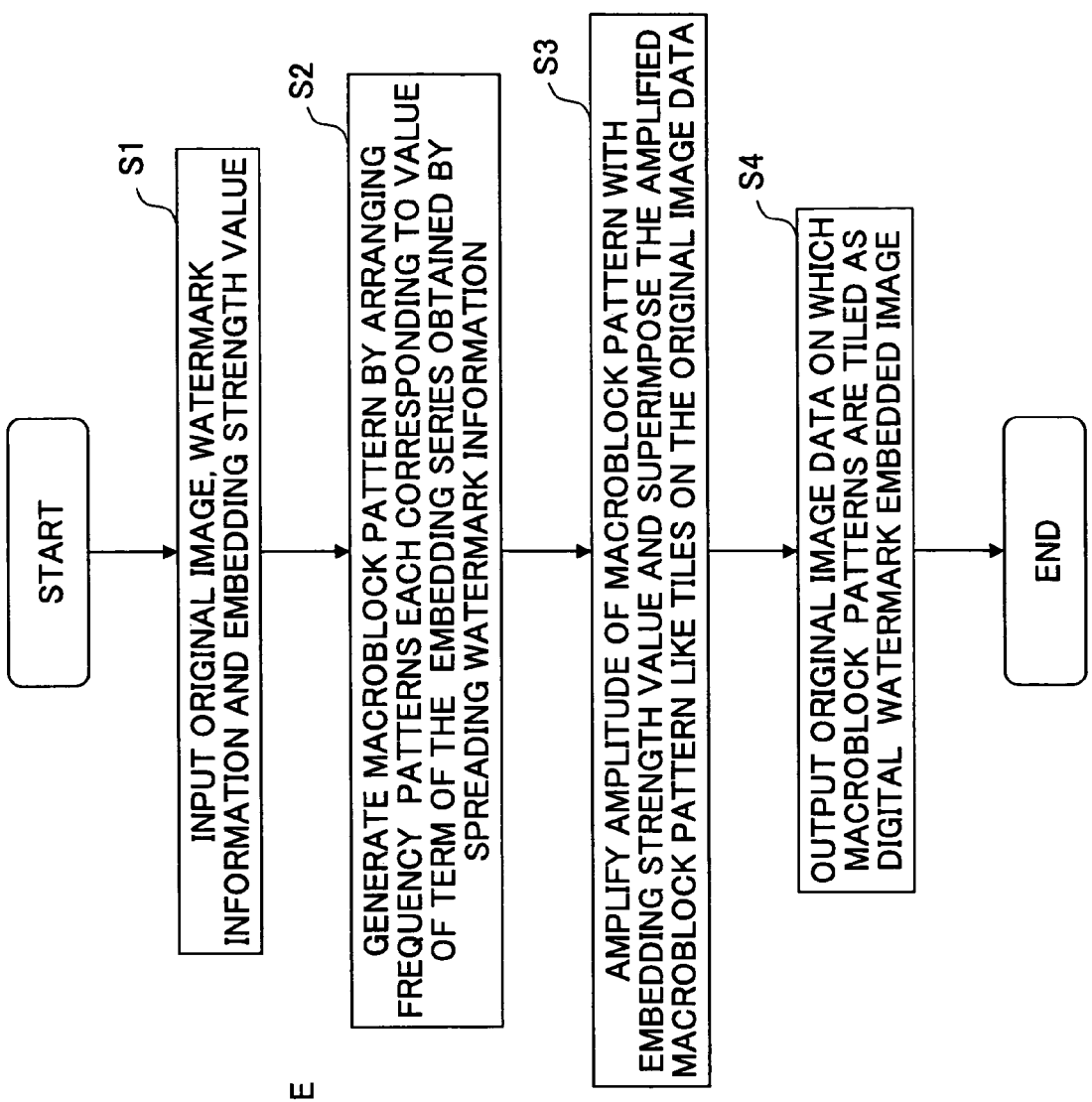
FIG. 2 is a diagram showing a process flow of the digital watermark embedding apparatus 10.

In the following, embodiments of the present invention are described with reference to figures. FIG. 1 shows a digital watermark embedding apparatus of an embodiment of the present invention, and FIG. 2 shows a process flow.

As shown in FIG. 1, the digital watermark embedding apparatus 10 of the embodiment of the present invention includes a macroblock pattern generation unit 11, an image input unit 12, macroblock pattern tiling unit 13 and an image output unit 14. The process flow in this configuration is described with reference to FIG. 2.

The digital watermark embedding apparatus 10 receives an original image, an embedding strength value (which is a parameter for specifying how strongly a pattern of digital watermark is superimposed into an image, the larger the parameter is, the more the image quality deteriorates, but, detection of digital watermark is stabilized) and watermark information that is information to be embedded in the original image (step 1).

The macroblock pattern generation unit 11 obtains an embedding series by spreading watermark information, and generates a macroblock pattern that is an image pattern by arranging frequency patterns each corresponding to a value and the like of a term of the embedding series (step 2).

The macroblock pattern tiling unit 13 superimposes the macroblock patterns like tiles on the original image obtained by the image input unit 12 to obtain tiled image data (step 3). Then, the image output unit 14 outputs the tiled image data as the digital watermark embedded image (step 4).

In the following, processes of each unit are described in more detail.

Figure 3:
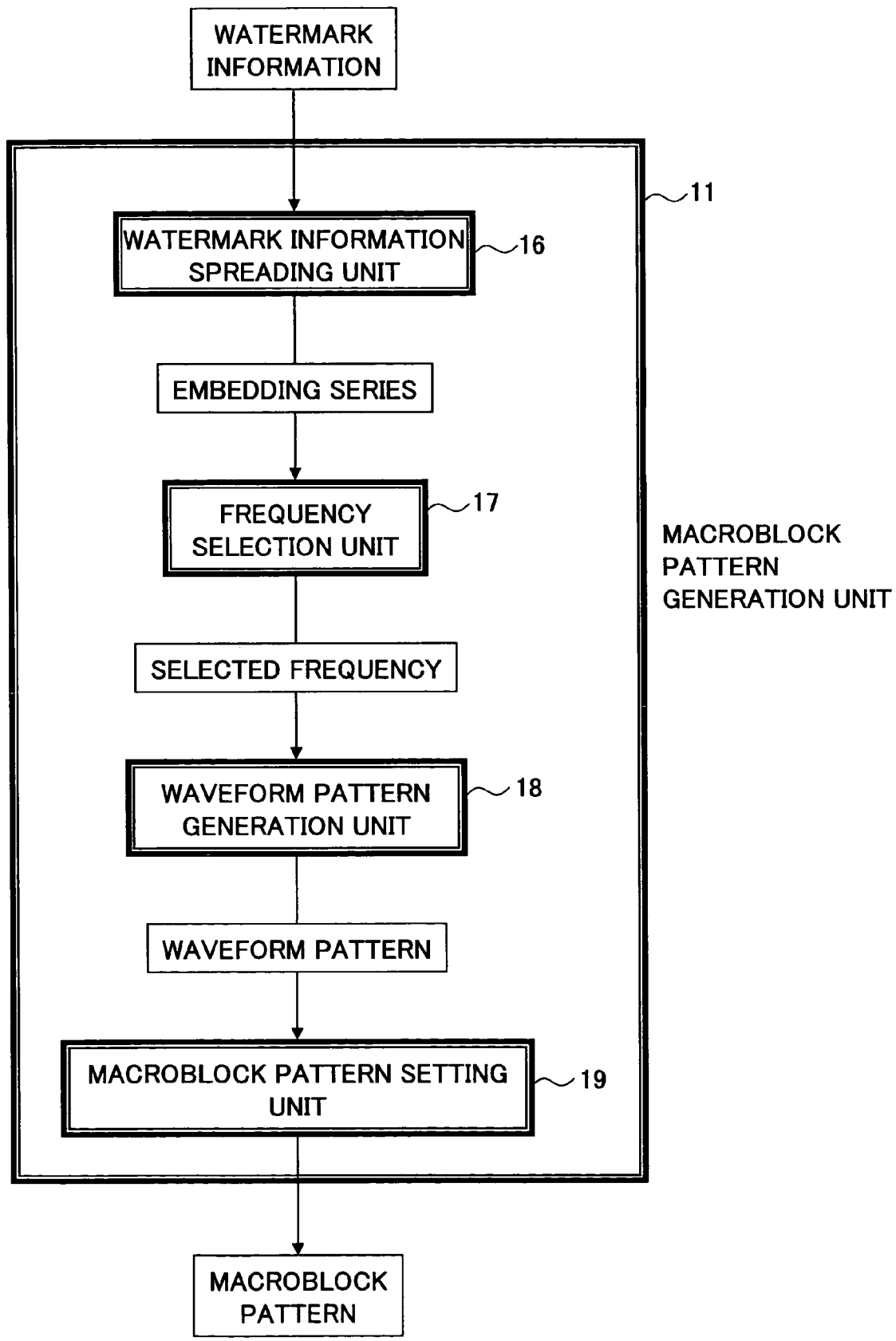
FIG. 3 is a block diagram of a macroblock pattern generation unit 11.
Figure 4:
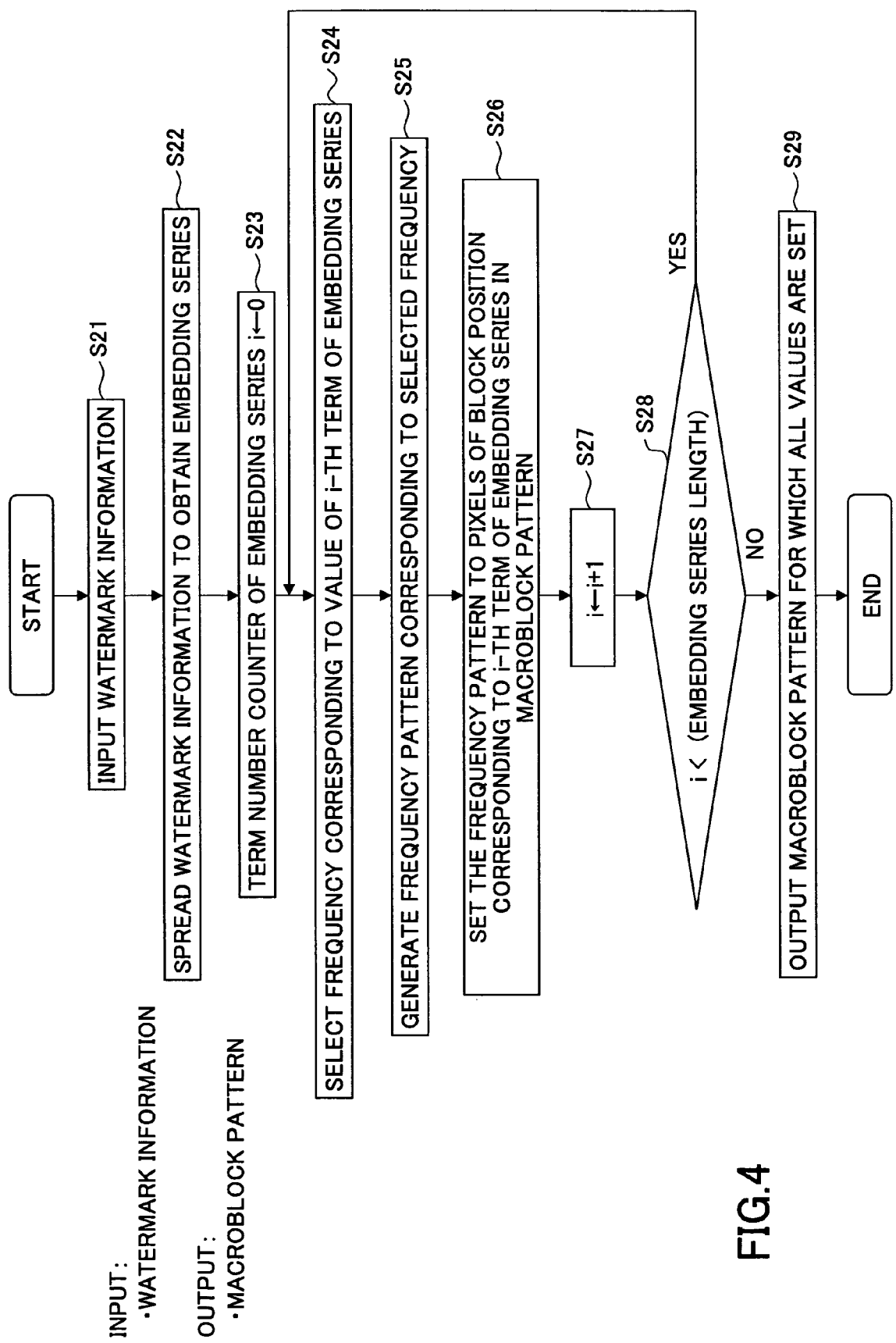
FIG. 4 is a diagram showing a process flow of the macroblock pattern generation unit 11.

FIG. 3 shows a configuration of the macroblock pattern generation unit 11 of the digital watermark embedding apparatus 10 in the embodiment of the present invention, and FIG. 4 shows a process flow. As shown in FIG. 3, the macroblock pattern generation unit 11 includes a watermark information spreading unit 16, a frequency selection unit 17, a waveform pattern generation unit 18, and a macroblock pattern setting unit 19. The process flow of the macroblock pattern generation unit 11 is described with reference to the flowchart of FIG. 4.

The macroblock pattern generation unit 11 receives the watermark information (step 21), and, first, the watermark information spreading unit 16 obtains the embedding series $\{e_i\}$ by spreading the watermark information (step 22).

The watermark information spreading unit 16 is described in more detail.

Figure 5:
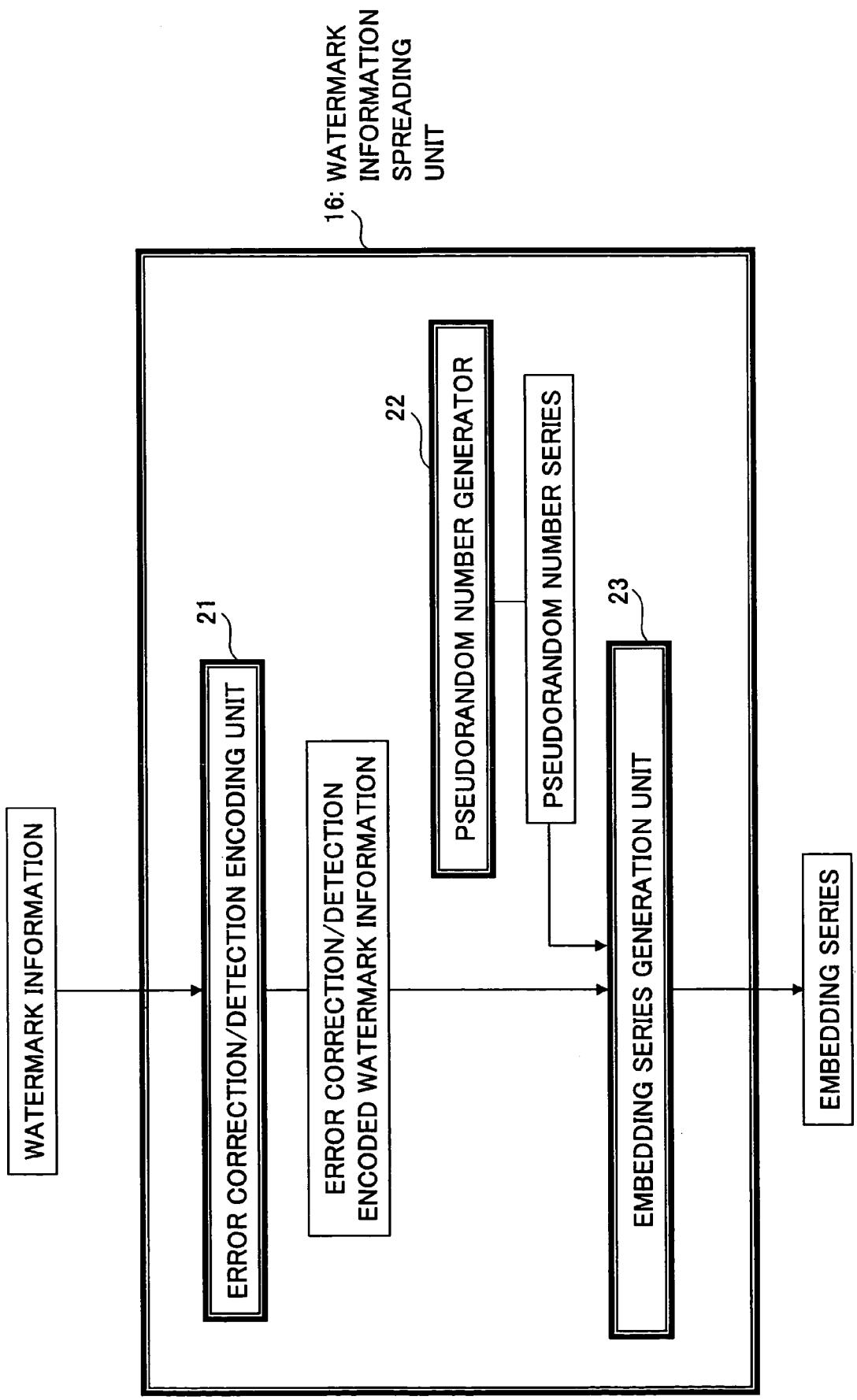
FIG. 5 is a block diagram of a watermark despreading unit 16.
Figure 6:
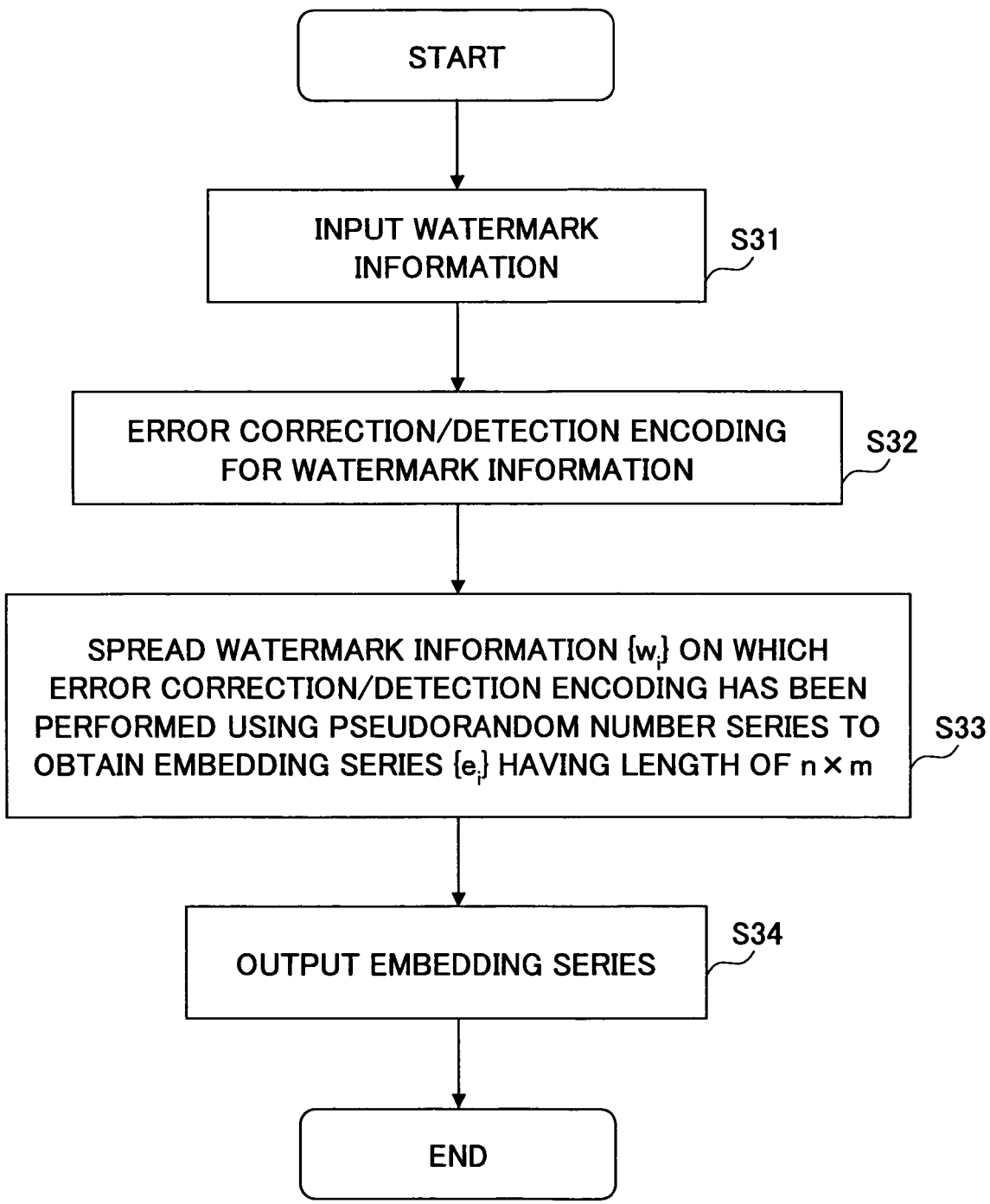
FIG. 6 is a diagram showing a process flow of the watermark despreading unit 16.

FIG. 5 shows a configuration of the watermark information spreading unit 16, and FIG. 6 shows a process flow of the unit. The watermark information spreading unit 16 includes an error correction/detection encoding unit 21, a pseudorandom number generator 22 and an embedding series generation unit 23.

As shown in FIG. 6, watermark information is supplied first (step 31), so that the error correction/detection encoding unit 21 performs error correction/detection encoding for the watermark information (step 32). As the error correction/detection encoding method, any method such as BCH code or Reed Solomon code can be used. Next, the embedding series generation unit 23 spreads the watermark information on which the error correction/detection encoding has been performed into an embedding series that is a sequence having a length m×n (depending on the size of the macroblock. As described later, the length is n×n in the present embodiment, however m×n is generally described here) using the pseudorandom number series generated by the pseudorandom number generator 22 (step 33), so as to output the embedding series (step 34). An initial value for generating the pseudorandom numbers in the pseudorandom number generator 22 may be a parameter input from the outside as a key parameter for watermarking. By doing so, following effects can be obtained, for example: independent digital watermark embedding can be realized using different key parameters, and it becomes difficult to estimate an embedding algorithm.

Concrete examples ((A)-(C)) of the method for spreading the watermark information in the embedding series generation unit 23 are shown below:

(A) Assuming that watermark information (S bits) on which error correction/detection encoding has been performed is $\{w_i\}$ (i=0~S-1), and that the pseudorandom number series is $\{r_i\}$ (i=0~mn-1 (total number of pixel blocks)), the embedding series $\{e_i\}$ (i=0~mn-1) is obtained by:

$$e_i = r_i \times w_{i\%S} \ (i=0 \sim mn-1)$$

wherein $w_i$=1 or −1 ($w_i$=1 when i-th bit in the watermark information on which error correction/detection encoding has been performed is 1, $w_i$=−1 when i-th bit in the watermark information on which error correction/detection encoding has been performed is 0) and $r_i$ is a random number series wherein $r_i$=1 or −1. In addition, x % y is a surplus when dividing x by y.

(B) Assuming that watermark information (S bits) on which error correction/detection encoding has been performed is $\{w_i\}$ (i=0~S-1), and that the pseudorandom number series is $\{r_i\}$ (i=0~mn-1), the embedding series $\{e_i\}$ (i=0~mn-1) is obtained by:

$$e_i = \Sigma_{k=0 \sim S-1}(r_{(i+k)\%mn} \times W_k)(i=0 \sim mn-1)$$

wherein $w_i$=1 or −1 ($w_i$=1 when i-th bit in the watermark information on which error correction/detection encoding has been performed is 1, $w_i$=−1 when i-th bit in the watermark information on which error correction/detection encoding has been performed is 0) and $r_i$ is a random number sequence wherein $r_i$=1 or −1. In addition, x % y is a surplus when dividing x by y.

Although binary random number series is used in the above examples, other random number series such as a random number series complying with Gaussian distribution can be used for performing spreading.

As mentioned above, the watermark information spreading unit 16 is described. As mentioned above, since the macroblock pattern consists of n×n blocks in this embodiment, the series length of the embedding series is $n^2$.

Next, as shown in the flow of FIG. 4, for setting the macroblock pattern for each block, a counter i for specifying a term number of the embedding series is set to 0 (step 23), and the frequency selection unit 17 selects a frequency corresponding to a value and the like of an i-th term $e_i$ in the embedding series (step 24). Next, the waveform pattern generation unit 18 generates a waveform pattern corresponding to the selected frequency (step 25). The waveform pattern is a pixel matrix having a block size as mentioned later.

In the following, processes for the frequency selection unit 17 and the waveform pattern generation unit 17 are described in more detail. In the following, three examples of process methods are has been performed is $\{w_i\}$ (i=0~S−1), and that two types of pseudorandom number series are generated in which one is $\{r1_i\}$ (i=0~mn−1) and another is $\{r2_i\}$ (i=0~mn−1), an array for permutation is generated using $\{r1_i\}$ first. For example, an array $\{p_i\}$ (i=0~mn−1) representing $$\begin{pmatrix} 0 & 1 & 2 & 3 & \cdots & mn-1 \\ p_0 & p_1 & p_2 & p_3 & \cdots & p_{mn-1} \end{pmatrix} \quad \text{[equation 1]}$$

is determined in the following way, wherein it is assumed that $r1_i$ is a random number of 0~mn−1:

```
For( i = 0 ; i<=mn−1 ; i++ ) {
    p_i = i;
}
For( i = 0 ; i<=mn−1 ; i++ ) {
    r = r1_i%mn;
    a = p_i;
    p_i = p_r;
    p_r = a;
}
```

Next, the embedding series $\{e_i\}$ (i=0~mn−1) is obtained in the following way:

$$e_i = r2_{pi} \times w_{pi\%S} \quad (i=0 \sim mn-1)$$

wherein $w_i=1$ or −1 ($w_i=1$ when i-th bit in the watermark information on which error correction/detection encoding has been performed is 1, $w_i=-1$ when i-th bit in the watermark information on which error correction/detection encoding has been performed is 0) and $r2_i$ is a random number sequence wherein $r2_i=1$ or −1. In addition, x % y is a surplus when dividing x by y. As mentioned above, $\{r1_i\}$ is a pseudorandom number series for generating $\{p_i\}$, and $\{r2_i\}$ is a pseudorandom number series for spreading $\{w_i\}$.

(C) Assuming that watermark information (S bits) on which error correction/detection encoding described.

(1) First, the frequency selection unit 17 and the waveform pattern generation unit 18 in a first example are described in more detail.

Figure 7:
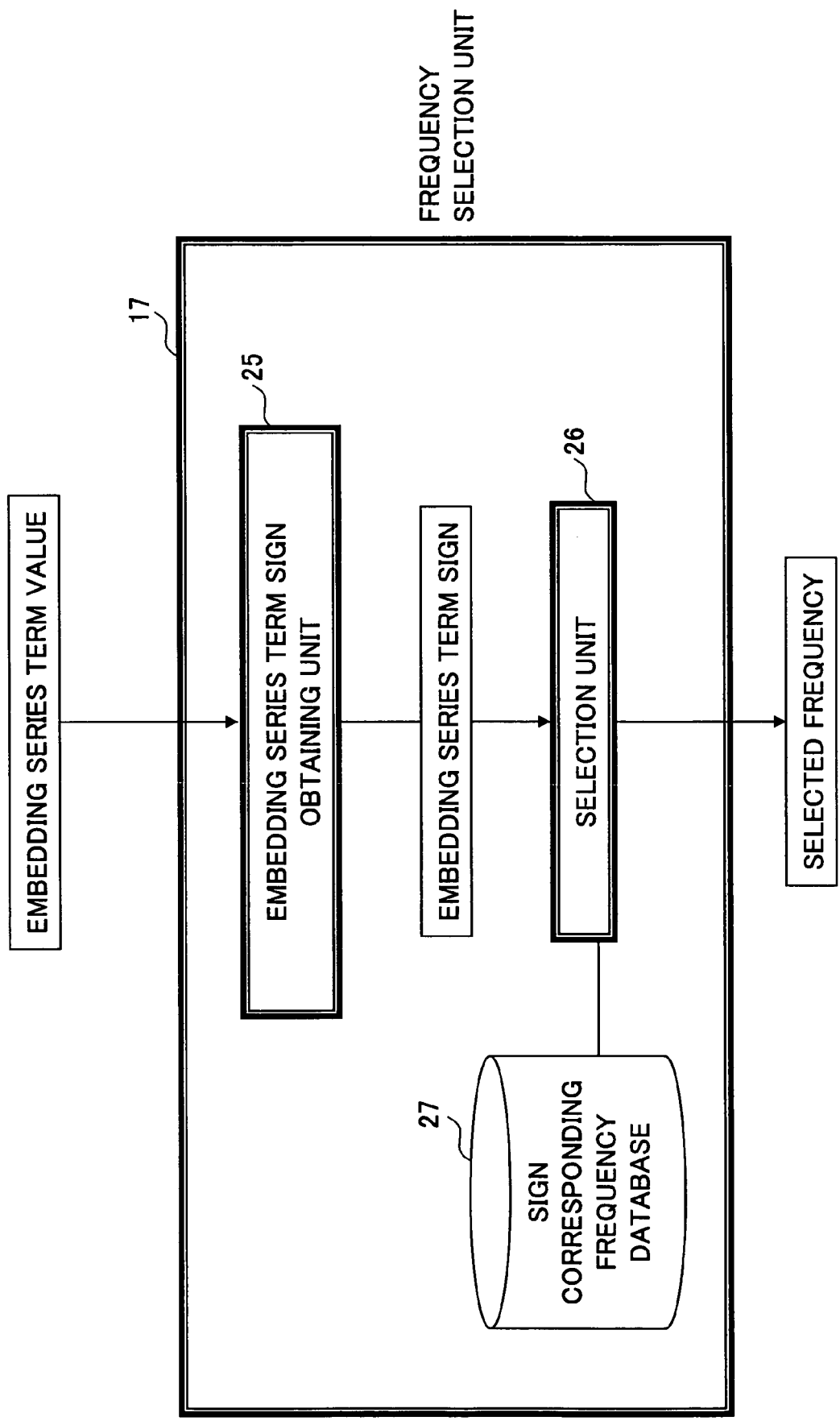
FIG. 7 is a block diagram of a frequency selection unit 17 in a first example.
Figure 8:
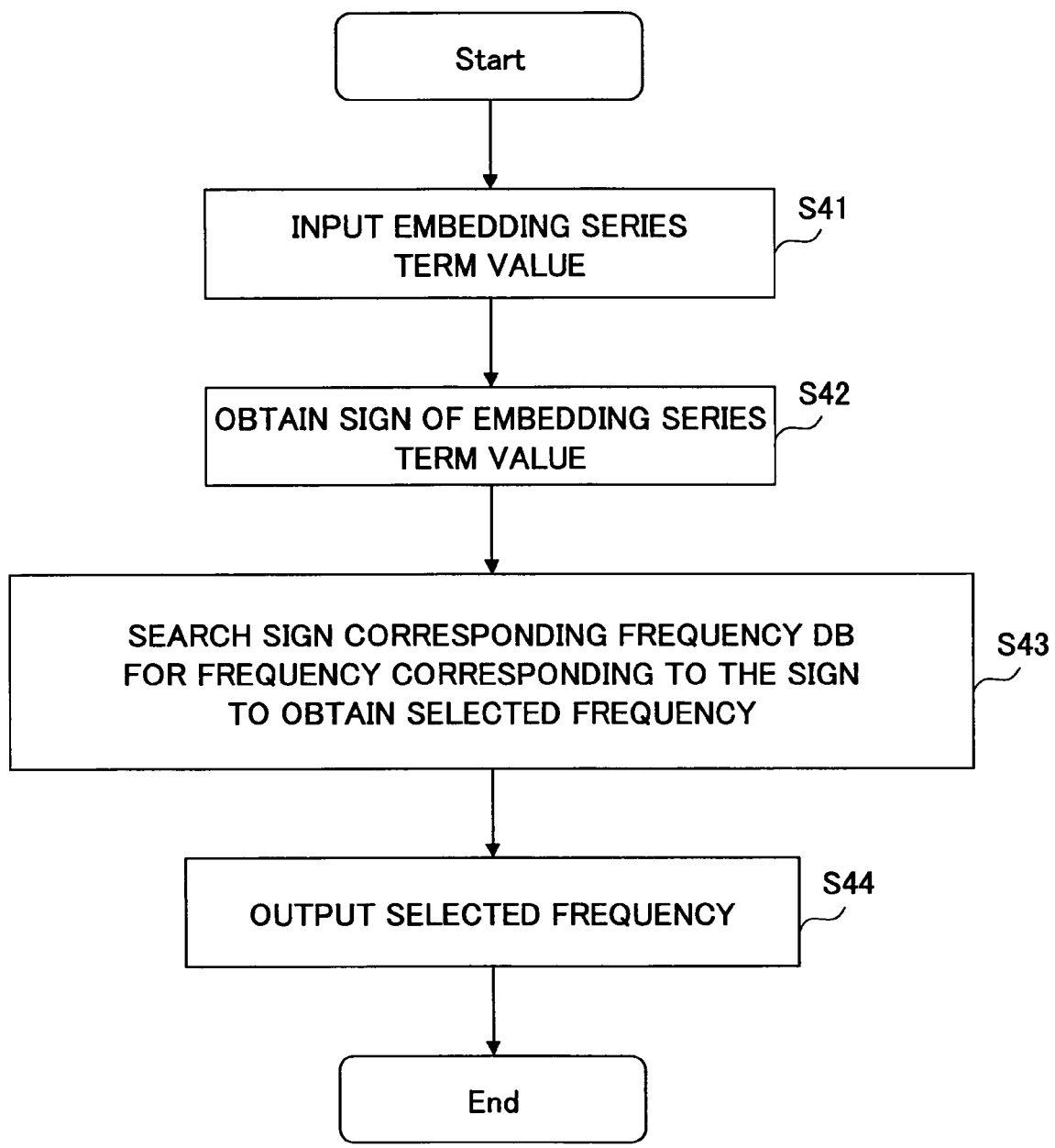
FIG. 8 is a diagram showing a process flow of the frequency selection unit 17 in the first example.

FIG. 7 shows a configuration of the frequency selection unit 17 and FIG. 8 shows a process flow of the unit. As shown in FIG. 7, the frequency selection unit 17 includes an embedding series term sign obtaining unit 25, a selection unit 26 and a sign corresponding frequency database 27.

Figure 9:
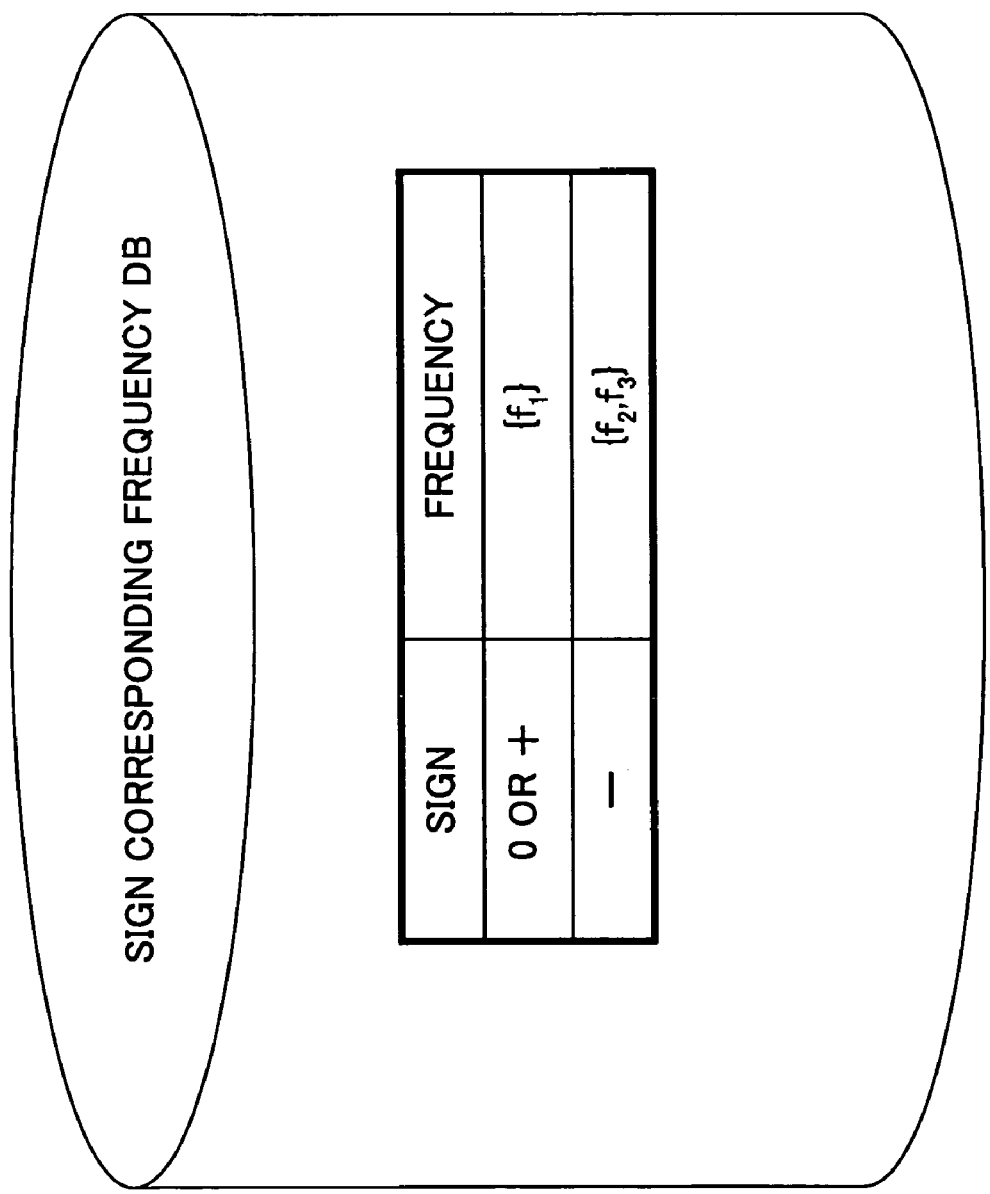
FIG. 9 is a diagram showing information of a sign corresponding frequency database 27.

As shown in FIG. 8, the frequency selection unit 17 receives the embedding series term value (step 41) so that the embedding series term sign obtaining unit 25 obtains the sign of the embedding series term value (step 42). As the sign, one of three values (+, −, 0) can be obtained. Next, the selection unit 26 searches the sign corresponding frequency database 27 for the frequency corresponding to the embedded series item value sign so as to output the frequency as the selected frequency (step 43). FIG. 9 shows a configuration of the sign corresponding frequency database 27. In the sign corresponding frequency database 27, frequencies corresponding to each output of the embedding series term sign obtaining unit 25 are stored. The number of the frequency corresponding to one sign is not necessarily one. As in the case of sign "−" in FIG. 9, a group of plural frequencies may correspond to one sign.

In the specification and claims in this application, the meaning of "frequency" includes not only one frequency but also plural frequencies corresponding to one sign (or 0, or after-mentioned quantized value) like the case of sign "−" unless they are specifically used distinguishably.

In addition, it is assumed that "frequency" is a two-dimensional frequency representing a two-dimensional waveform pattern, and indicates a relative frequency with respect to a block size. For example, the frequency is normalized with the pixel size such that a frequency representing two wavelength waveform in the x direction for an X×Y pixel block size is the same as a frequency representing two wavelength waveform in the x direction for an 2X×2Y pixel block size.

In the first example, the waveform pattern generation unit 18 generates a waveform pattern corresponding to the selected frequency. The waveform pattern generated by the waveform pattern generation unit 18 is a two-dimensional pattern having a size the same as that of a block. In addition, when there are plural selected frequencies, the waveform patterns are added to obtain a pattern and the amplitude of the obtained pattern is normalized such that energy of the pattern is the same as that for one frequency so as to obtain a waveform pattern.

(2) The second example is different from the first example in that the waveform pattern generation unit 18 amplifies the amplitude of the waveform pattern with an absolute value of the embedding series term value.

(3) Next, the frequency selection unit 17 and the waveform pattern generation unit 18 in the third example are described in more detail.

Figure 10:
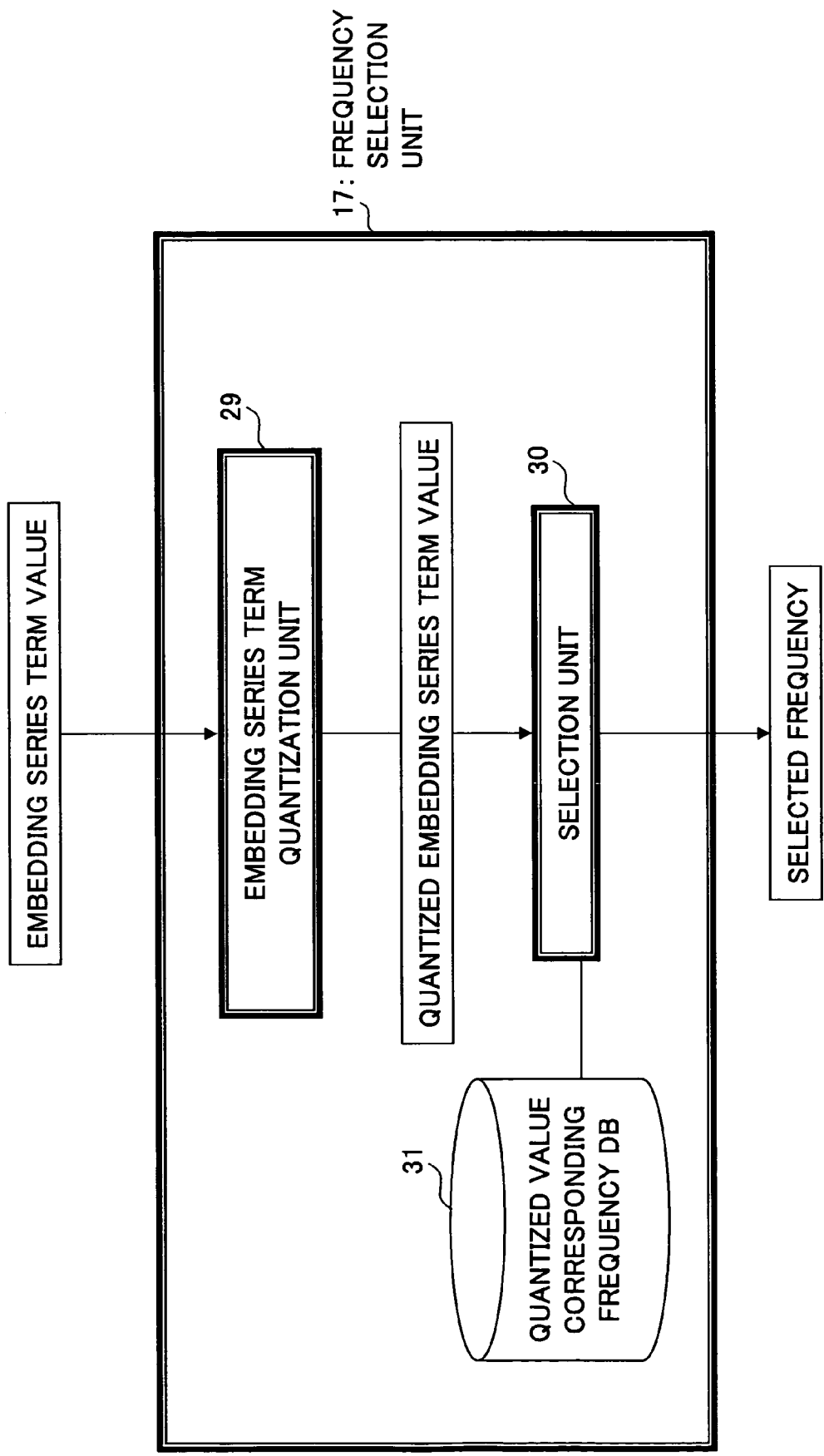
FIG. 10 is a diagram showing a frequency selection unit 17 in a third example.
Figure 11:
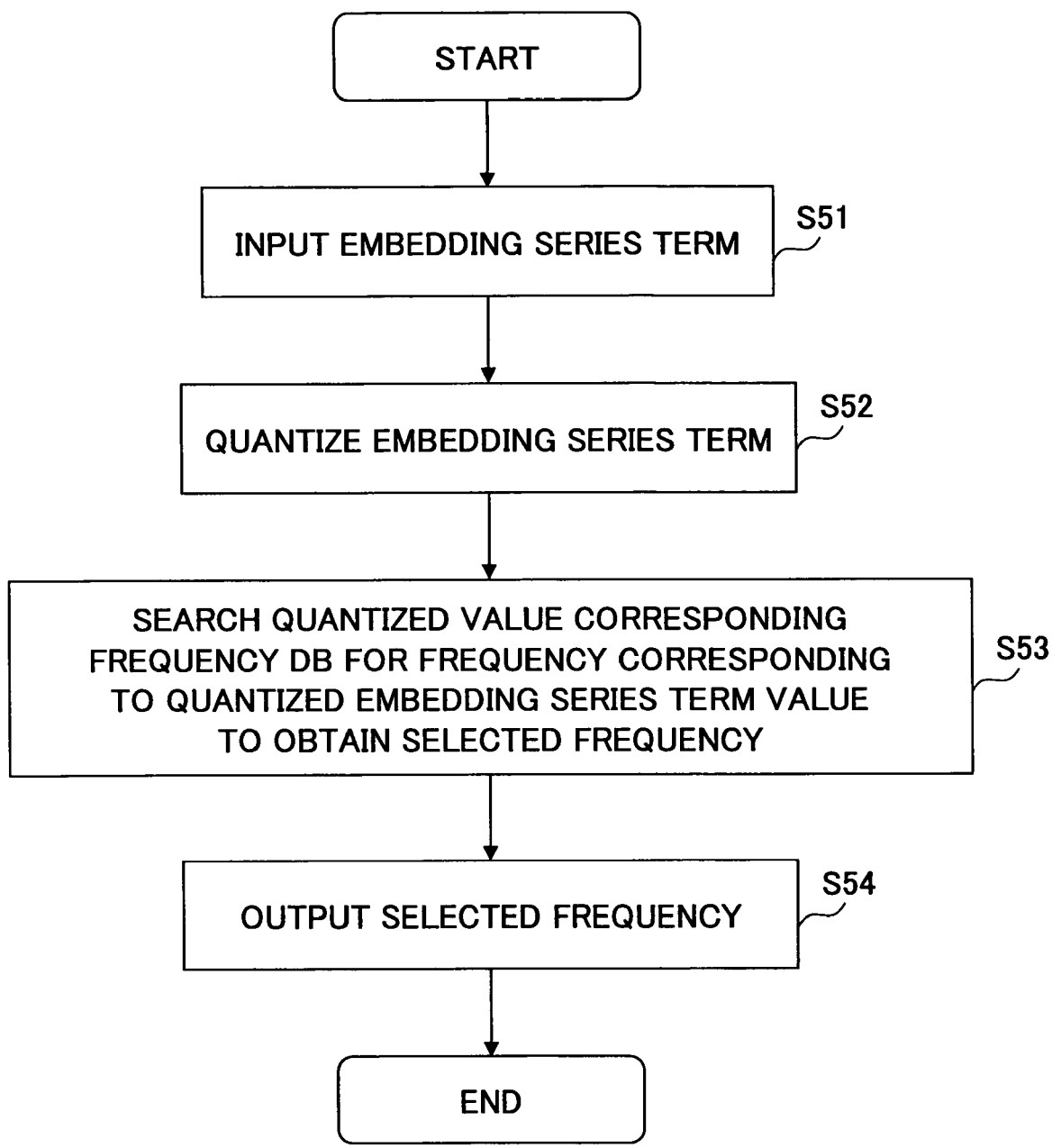
FIG. 11 is a diagram showing a process flow of the frequency selection unit 17 in the third example.

FIG. 10 shows a configuration of the frequency selection unit 17, and FIG. 11 shows a flow of the process. As shown in FIG. 10, the frequency selection unit 17 includes an embedding series term quantization unit 29, a selection unit 30 and a quantization corresponding frequency database 31.

As shown in FIG. 11, the frequency selection unit 17 receives the embedding term value (step 51). The embedding series term quantization unit 29 quantizes the embedding series term value so as to obtain a quantized embedding series term value (step 52). Then, the selection unit 30 searches a quantized value corresponding frequency database 31 for a frequency corresponding to the quantized embedding series term value so as to obtain the selected frequency (step 53) and output it (step 54).

As quantization methods performed in the embedding series term quantization unit 29, there are methods shown in FIG. 12. Quantization methods shown in (a)-(c) in FIG. 12 are respectively performed according to following calculation:

(a) Binarizing

When x is the embedding series term value, x is binarized as follows:

$x<0 \rightarrow -1$ $x>=0 \rightarrow 1$ (b) Quantizing to Three Values

When x is the embedding series term value, x is quantized to three values as follows:

$x<0 \rightarrow -1$ $x=0 \rightarrow 0$ $x>0 \rightarrow 1$ (c) Quantizing to n Values When x is the embedding series term value, x is quantized to n values as follows:

$x<-nq/2 \rightarrow -n/2 \; -nq/2<x<(n/2-1)q \rightarrow \lfloor x/q \rfloor$ ($\lfloor x \rfloor$ indicates a largest integar that does not exceed $x$) $x>(n/2-1)q \rightarrow n/2-1$ [equation 2]

Instead of using equal width quantization shown in (c), unequal width quantization can be used.

Figure 13:
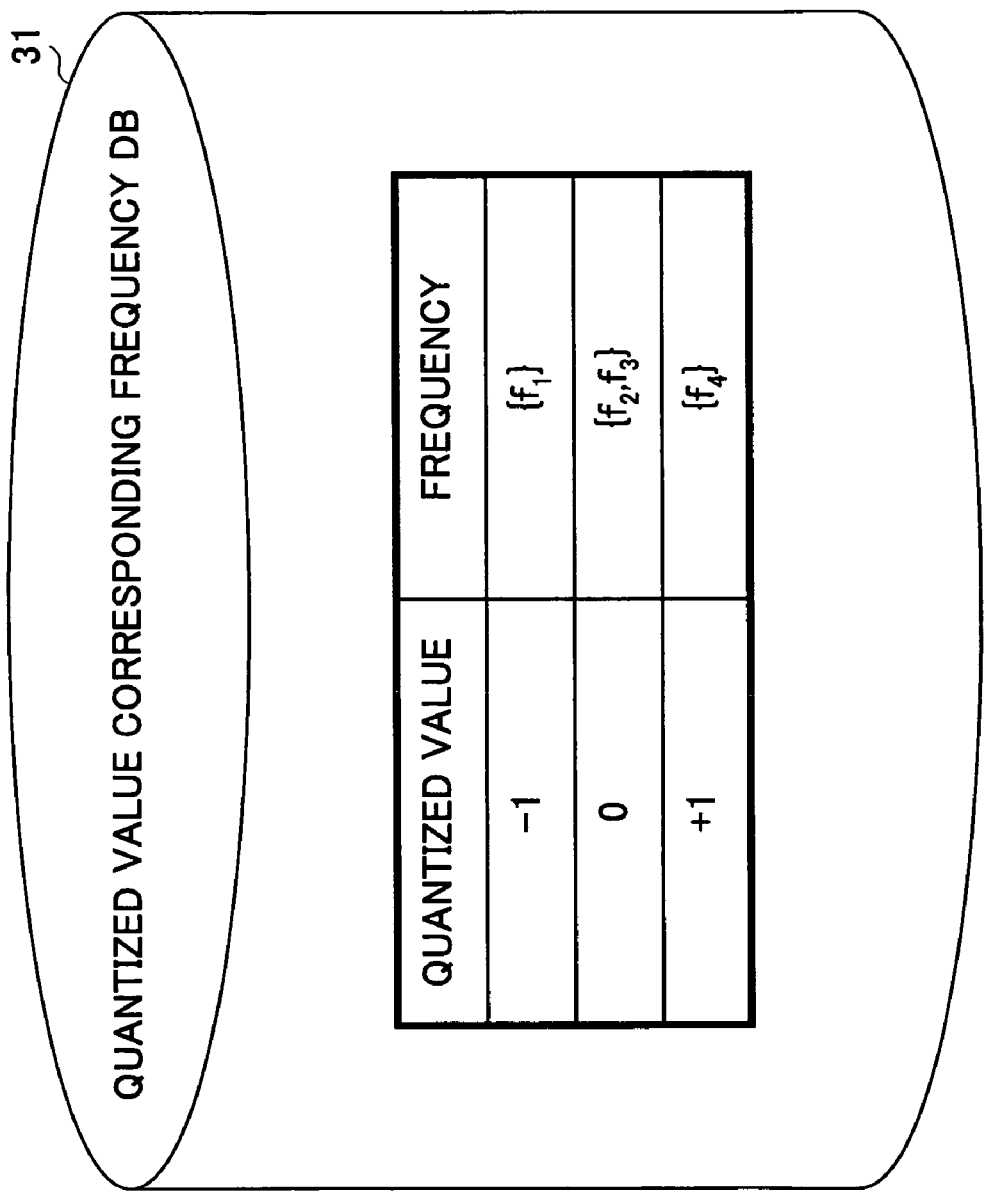
FIG. 13 is a diagram showing information of a quantized value corresponding frequency database 31.

FIG. 13 shows a configuration of the quantized value corresponding frequency database 31 to which the selection unit 30 refers in step 53. This example corresponds to the case of quantization to three values. As shown in FIG. 13, in the quantized value corresponding frequency database 31, frequencies corresponding to each output of the embedding series term quantization unit 27 are stored beforehand. The number of frequency corresponding to one quantized value is not necessarily one. As in the case of quantized value of 0 in FIG. 13, a group of plural frequencies may correspond to one quantized value.

The waveform pattern generation unit 18 is the same as one in the first example or the second example. That is, the amplitude of the selected frequency pattern is used as it is or the amplitude is amplified with the absolute value of the embedding series term value.

As mentioned above, although examples of the frequency selection unit 17 and the waveform pattern generation unit 18 are described, following descriptions of this embodiment are based on the first example and frequencies to be selected are two kinds (f0, f1). In addition, it is assumed that, as for the two kinds of the waveform patterns, a pattern obtained by rotating one of the two waveform patterns by 90 degrees is the same as another of the two waveform patterns.

Figure 14:
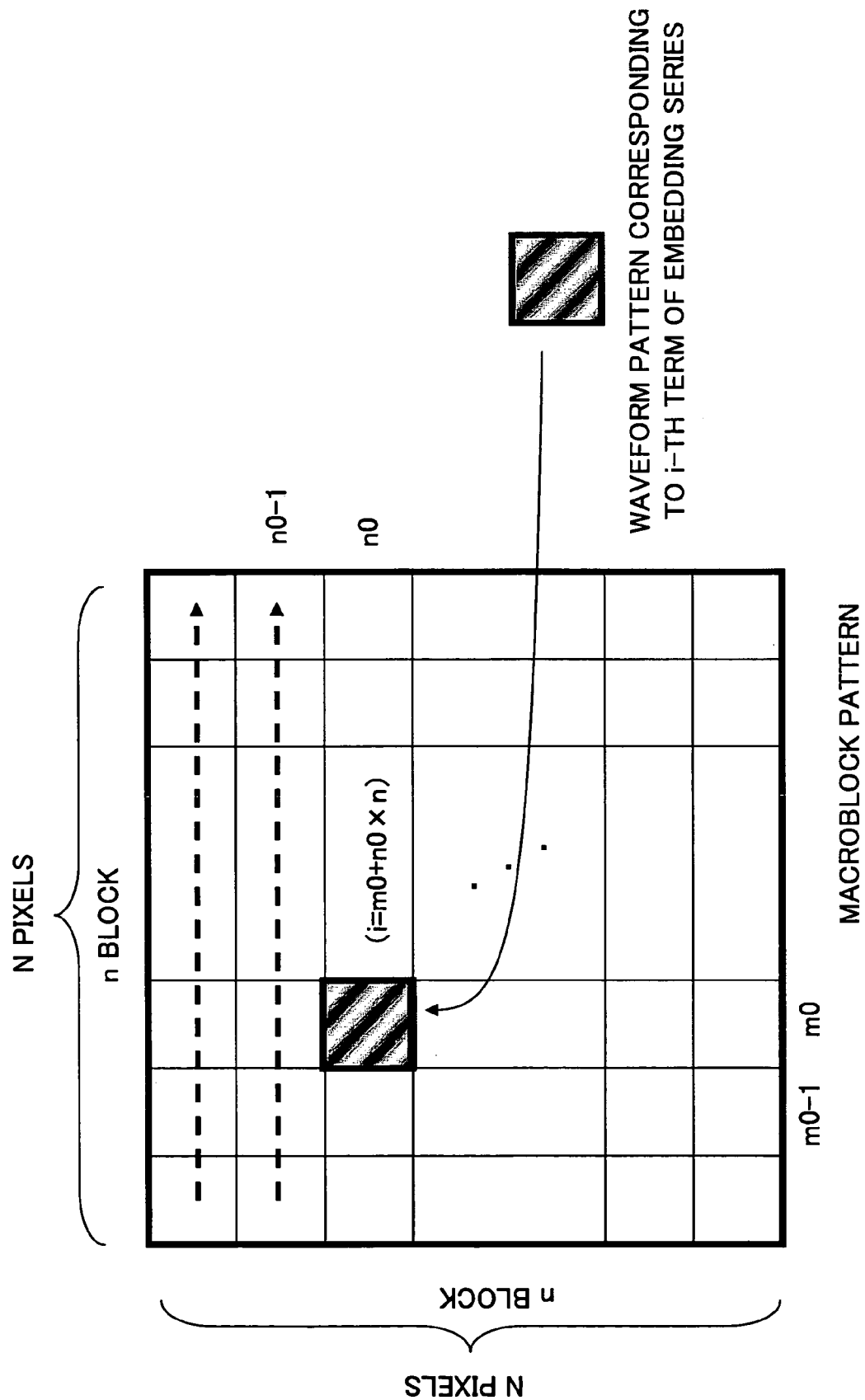
FIG. 14 is a diagram for explaining processes of a macroblock pattern setting unit 19.

In the flow shown in FIG. 4, next, the macroblock pattern setting unit 19 replaces, with the waveform pattern, a pixel block of a block position corresponding to the term number i of the embedding series in a prepared buffer of the macroblock pattern (step 26). As shown in FIG. 14, the macroblock pattern is a pixel array of N×N pixels and consists of n blocks vertically and horizontally. The macroblock pattern setting unit 19 associates a term number i of the embedding series with a block position (m0, n0) in a one-to-one relationship by defining i=m0+n0×n for horizontal block position m0 and vertical block position n0, for example, and replaces a pixel block of a corresponding block position with a corresponding waveform pattern.

Figure 15:
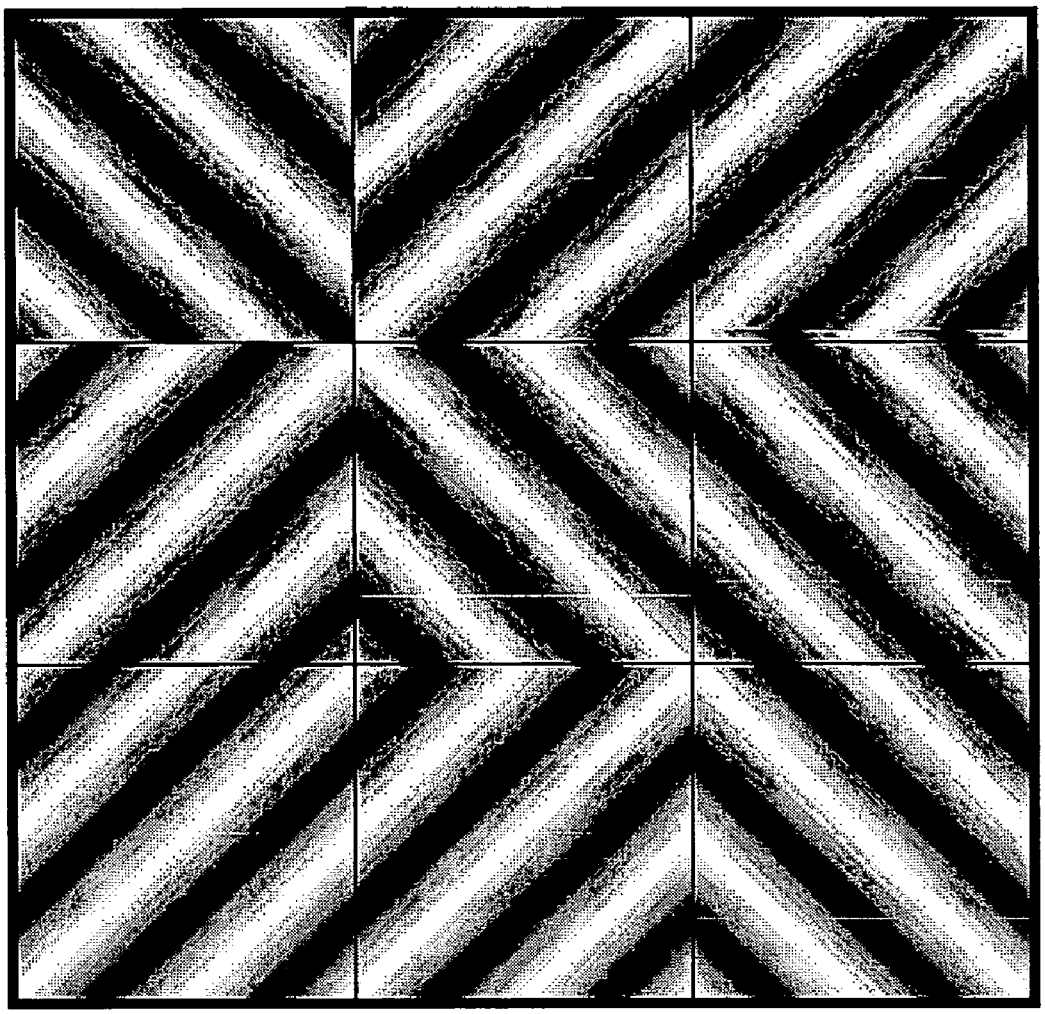
FIG. 15 is a diagram for explaining processes of a macroblock pattern generation unit 11.

The counter i for specifying the term number of the embedding series is incremented (step 27) to repeat the process from the frequency selection unit 17 to the macroblock pattern setting unit 19 for all terms (step 28) so that the macroblock pattern is generated as one in which blocks having different frequency patterns are arranged as shown in FIG. 15. Finally, the macroblock pattern in which setting of all blocks is completed is output (step 29).

Figure 16:
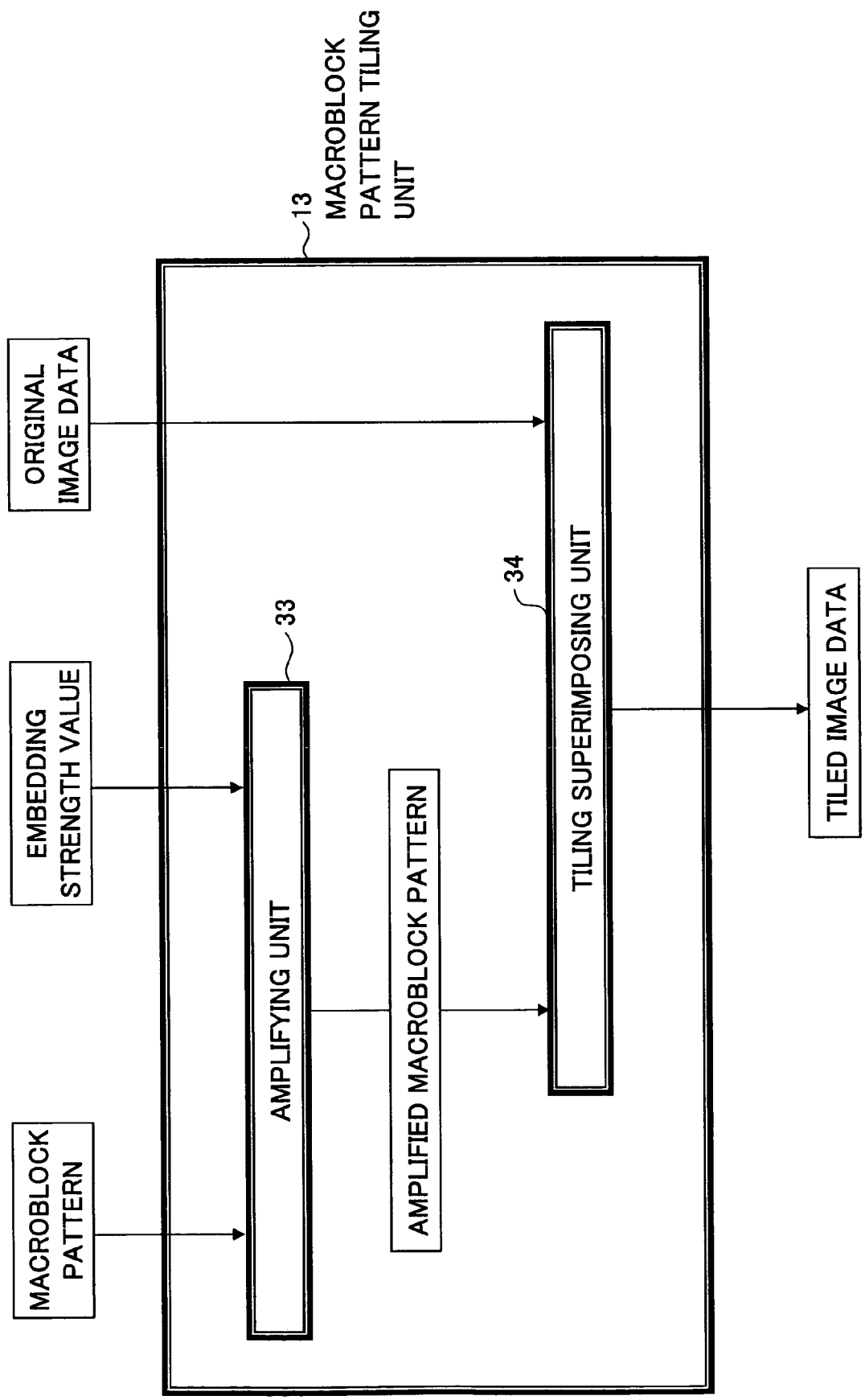
FIG. 16 is a block diagram of a macroblock pattern tiling unit 13.
Figure 17:
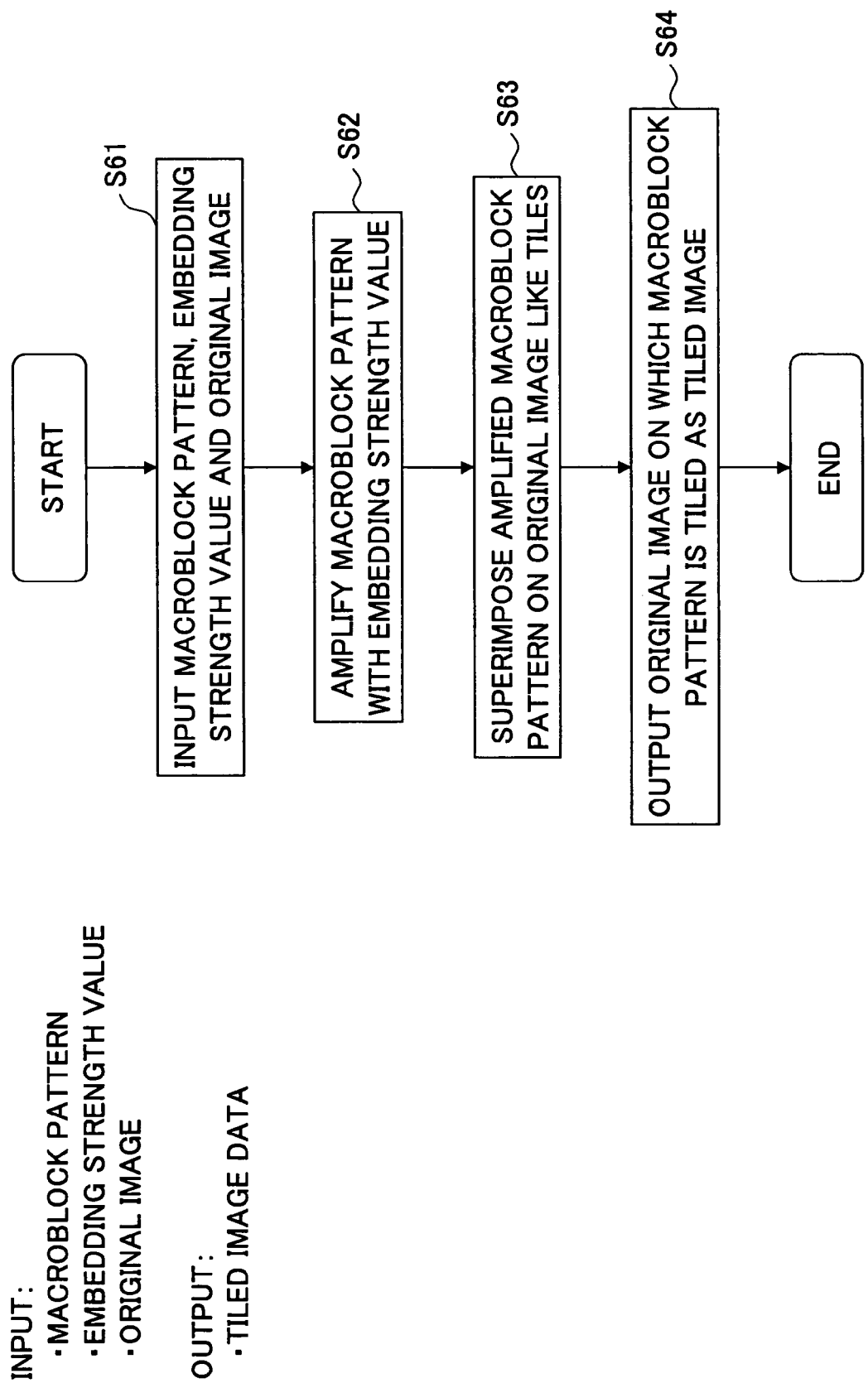
FIG. 17 is a diagram showing process flow of the macroblock pattern tiling unit 13.

The macroblock pattern tiling unit 13 in the macroblock pattern generation unit 11 is described in more detail. FIG. 16 shows a configuration of the macroblock pattern tiling unit 13 in this embodiment, and FIG. 17 shows a process flow.

As shown in FIG. 16, the macroblock tiling unit 13 includes an amplifying unit 33 and a tiling superimposing unit 34. The process flow in this configuration is described with reference to FIG. 17.

The macroblock pattern tiling unit 13 receives the macroblock pattern generated by the waveform pattern generation unit 11, the embedding strength value and the original image (step 61). The amplifying unit 33 amplifies the amplitude of the macroblock pattern with the embedding strength value (step 62) so as to output the amplified macroblock pattern. The amplified macroblock pattern is supplied to the tiling superimposing unit.

Figure 18:
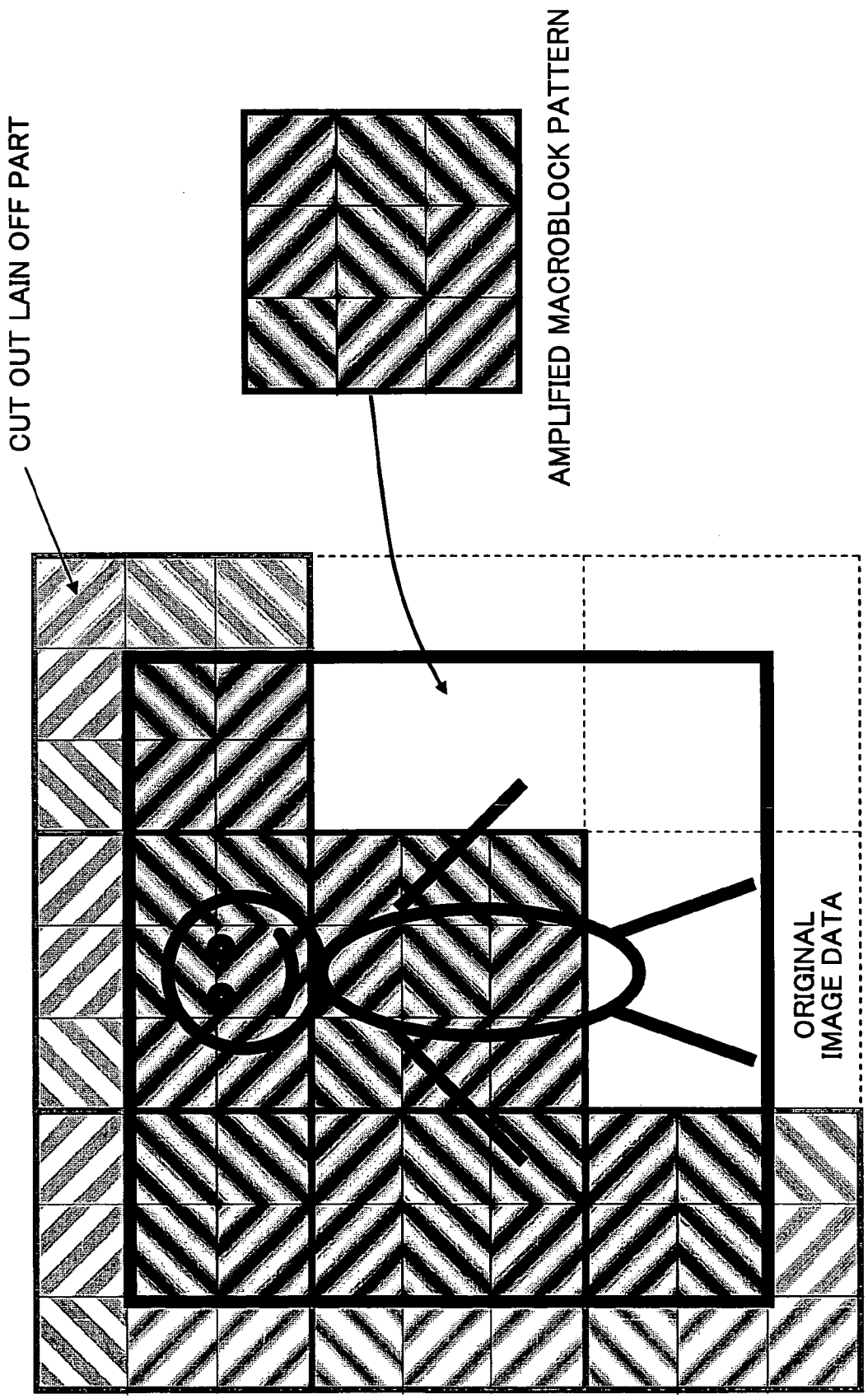
FIG. 18 is a diagram for explaining processes of the macroblock pattern tiling unit 13.
Figure 19:
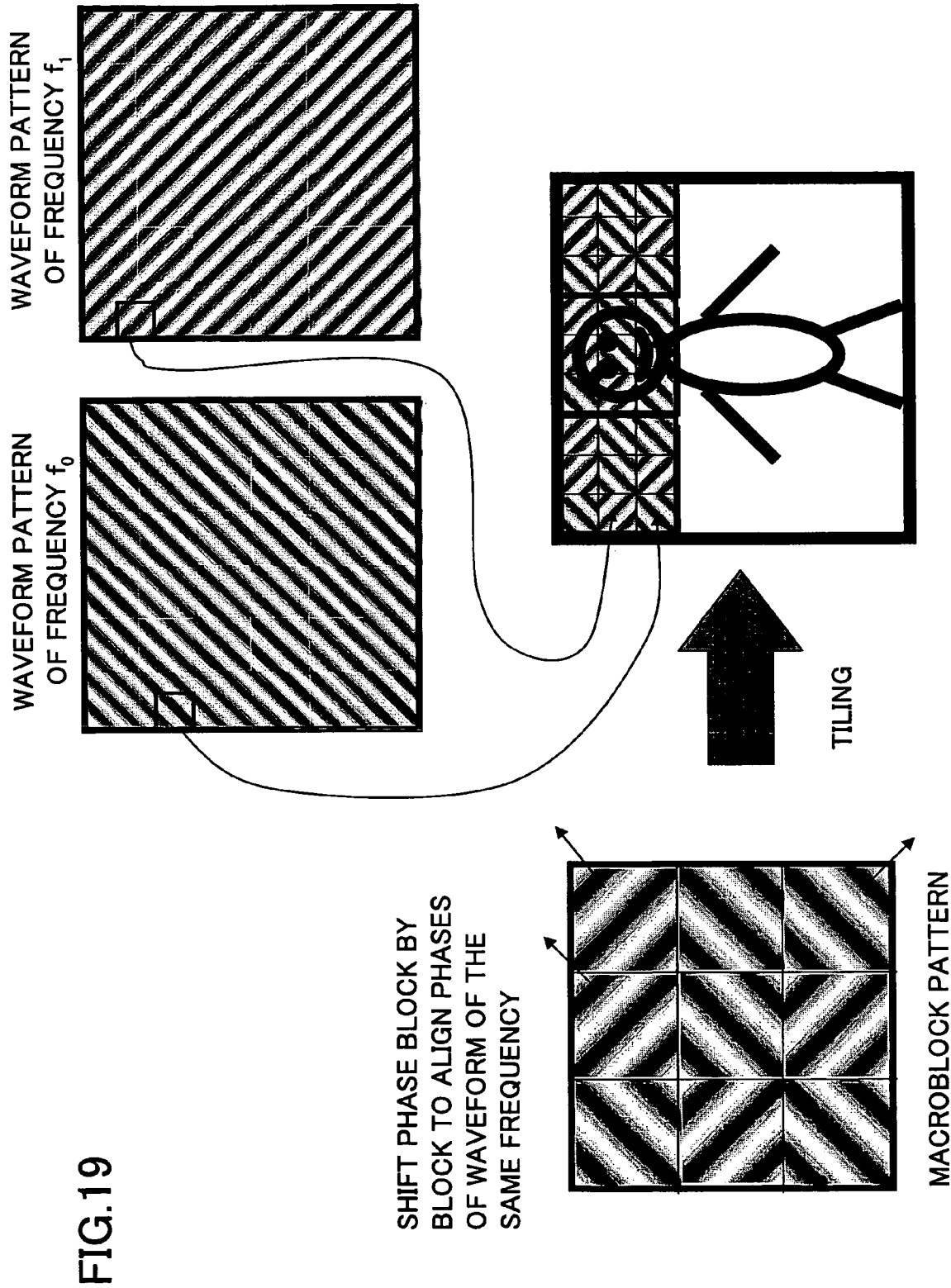
FIG. 19 is a diagram for explaining processes of a tiling superimposing unit 34.

Next, the tiling superimposing unit 34 superimposes amplified macroblock patterns on the original image like tiles as shown in FIG. 18 (step 63). At the time, a start position of tiling is not necessarily the upper left of the original image. The tiling may be started from any position. When the macroblock pattern to be tiled lies off the edge of the original image data, the part lying off is discarded such that the macroblock patterns are embedded in the whole area of the original image. In addition, when superimposing the macroblock pattern on the original image, as to the block waveform patterns forming the macroblock, the phase of the waveform pattern may be changed for each block while performing tiling such that phases of waveform patters having the same frequency are aligned as shown in FIG. 19. Aligning phases of the waveform patterns having the same frequency is to change the phases such that each waveform pattern of block positions in a waveform pattern having a size the same as the size of the original image becomes each waveform pattern in blocks being tiled at positions corresponding to those on the original image as shown in FIG. 19. By performing such process, a peak of power spectrum for estimating a conversion parameter can be strengthened in an after-mentioned linear transformation distortion correction when detecting watermark so that tolerance can be improved. When the block size is an integer times the wavelength of the waveform pattern, the above process is not necessary since the phases of the tiled waveform patterns on the original image are aligned without changing the phases of the waveform patterns in the blocks.

The original image on which the macroblock patterns are tiled is output from the macroblock pattern tiling unit 13 as a tiled image (step 64). Then, the image output unit 14 of the digital watermark embedding apparatus 10 outputs the tiled image as the digital watermark embedded image.

Next, a digital watermark detection apparatus 40 that detects digital watermark from the digital watermark embedded image generated as mentioned above is described.

Figure 20:
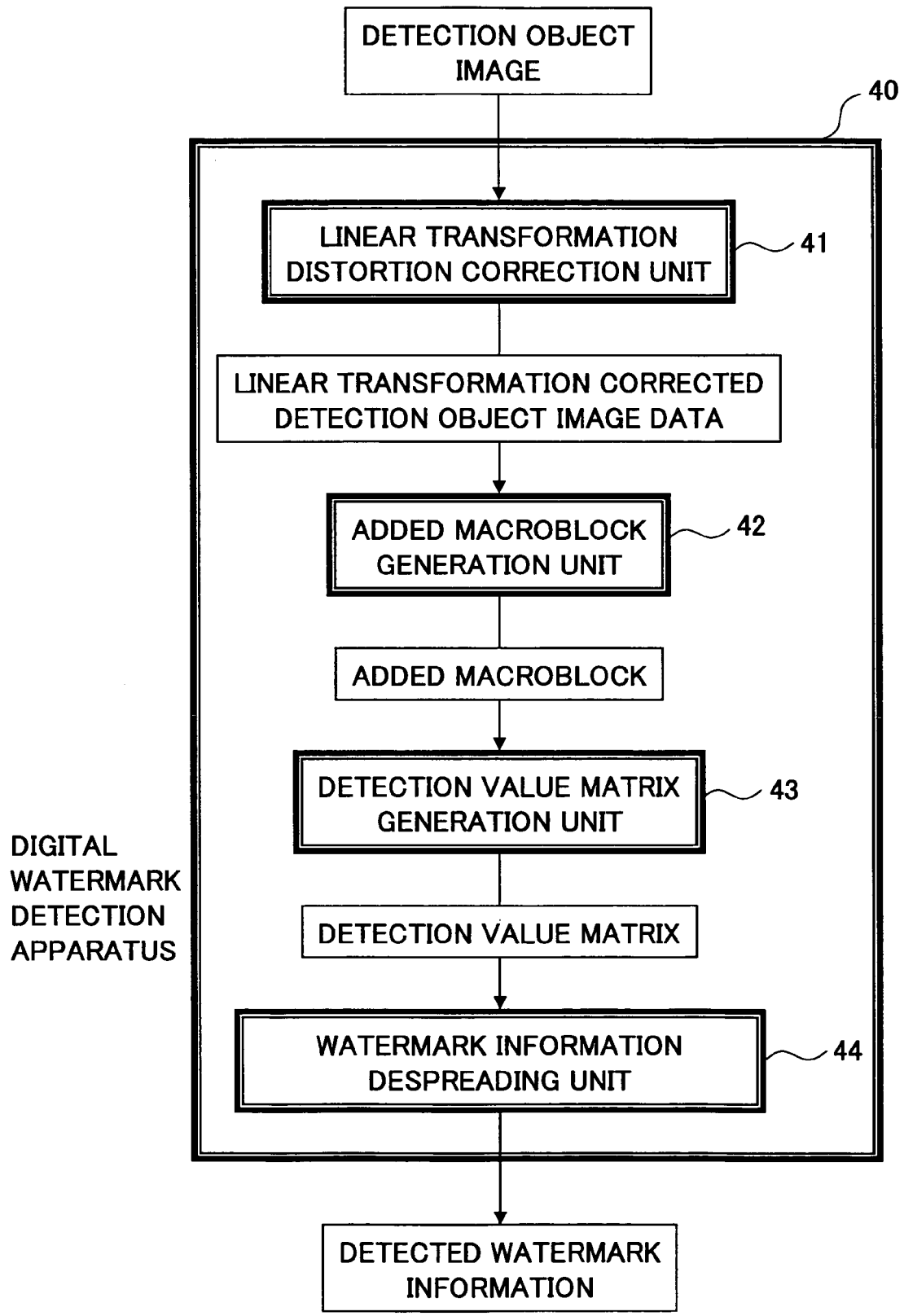
FIG. 20 is a block diagram of a digital watermark detection apparatus 40 in an embodiment of the present invention.
Figure 21:
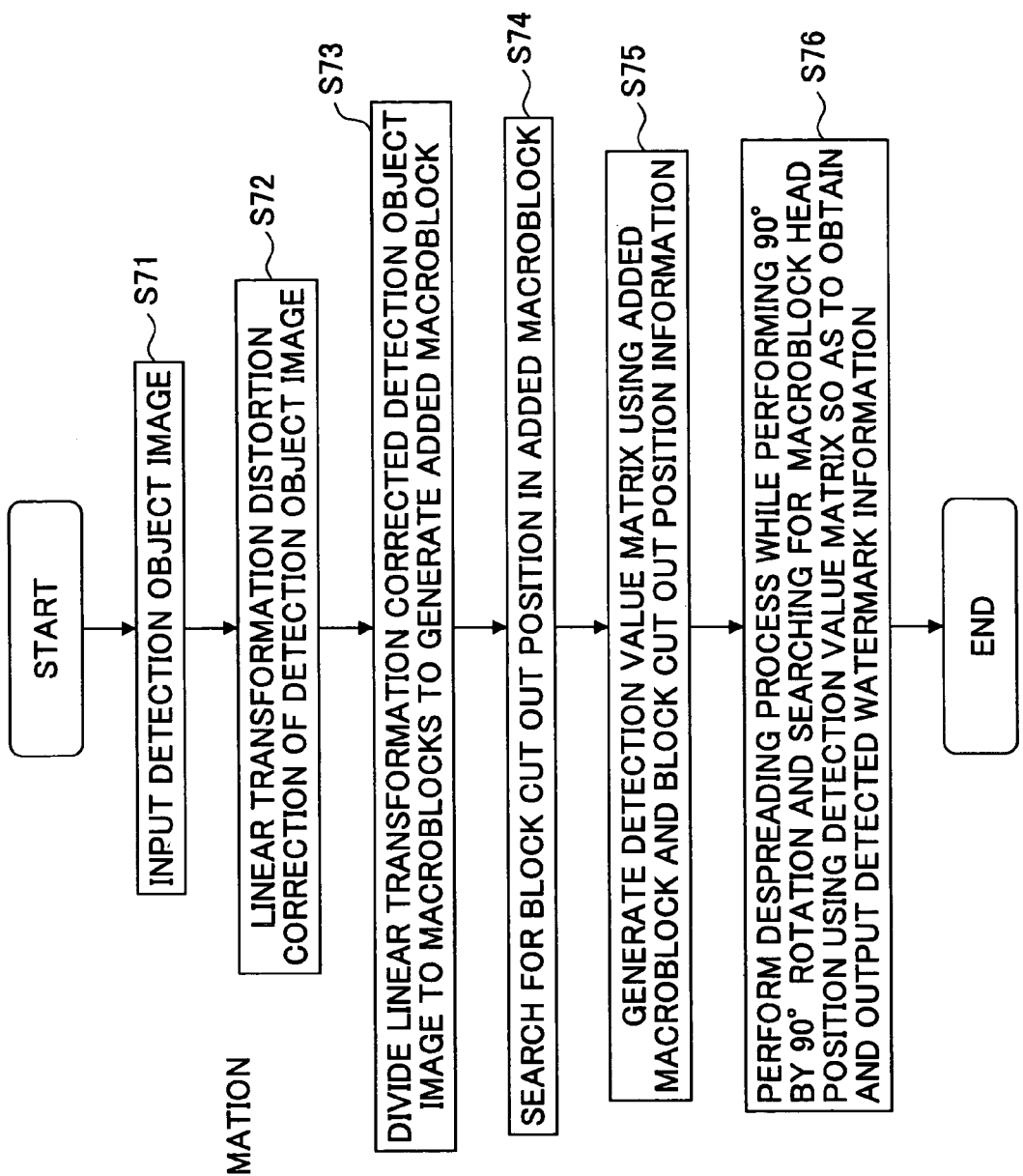
FIG. 21 is a diagram showing a process flow of the digital watermark detection apparatus 40.

FIG. 20 shows a configuration of the digital watermark detection apparatus 40 in this embodiment, and FIG. 21 shows a process flow.

As shown in FIG. 20, the digital watermark detection apparatus 40 of this embodiment includes a linear transformation distortion correction unit 41, an added macroblock generation unit 42, a detection value matrix generation unit 43 and a watermark information despreading unit 44. The process flow in the digital watermark detection apparatus 40 having this configuration is described with reference to FIG. 21.

The digital watermark detection apparatus 40 receives a detection object image (step 71). Then, first, the linear transformation distortion correction unit 41 estimates a parameter of linear transformation performed on the detection object image, corrects the image by performing inverse transformation to obtain a linear transformation corrected detection object image data (step 72).

Next, the added macroblock generation unit 42 divides the linear transformation corrected detection object image to regions each having the size of the macroblock, and adds divided regions to obtain an added macroblock (step 73). Next, the detection value matrix generation unit 43 searches for a block cut out position in the added macroblock (step 74) to generate a detection value matrix according to the block cut out position (step 75). Next, the watermark information despreading unit 44 performs a despreading process using the detection value matrix while performing 90° by 90° rotation and searching for a macroblock head position so as to obtain and output the detected watermark information (step 76).

In the above-mentioned procedure, after inputting the detection object image, enlarging/reducing process may be performed on the detection object image such that the size of the image becomes a size of a predetermined number of pixels to generate a size normalized detection object image so as to use the size normalized detection object image as input data for processes after that. In addition, to improve detection tolerance, a preprocess filter unit may be provided before the linear transformation distortion correction unit 41 or the added macroblock generation unit 42 to perform preprocess filter processing on the detection object image or the linear transformation distortion corrected detection object image. In addition, the preprocess filter processing can be performed on each of the detection object image and the linear transformation distortion corrected detection object image.

The preprocess filter processing is described. As a filter for the pre-process filter processing, it is desirable to use a band-pass filter that passes a frequency of the frequency pattern used for embedding. According to band limit process by the band-pass filter, a low-frequency component is reduced. Since a pattern of the original image data includes large amount of low-frequency components, effects by a pattern of the original image data against the frequency pattern can be reduced. As the pre-process filter processing unit, a differentiating circuit for differentiating the waveform of the image signal data can be used. By performing clipping process in addition to the filter process, detection performance can be further improved. The clipping process is to perform a rounding process on signal parts that exceed a predetermined upper limit value or a predetermined lower limit value in the signal waveform in an filter processed image. As a result, a signal having a weak amplitude is relatively strengthened. Therefore, the level of the filter processed signal can be reduced within a setting value so that detection sensitivity of the frequency pattern can be increased.

Next, each unit of the digital watermark detection apparatus 40 is described in more detail.

Figure 22:
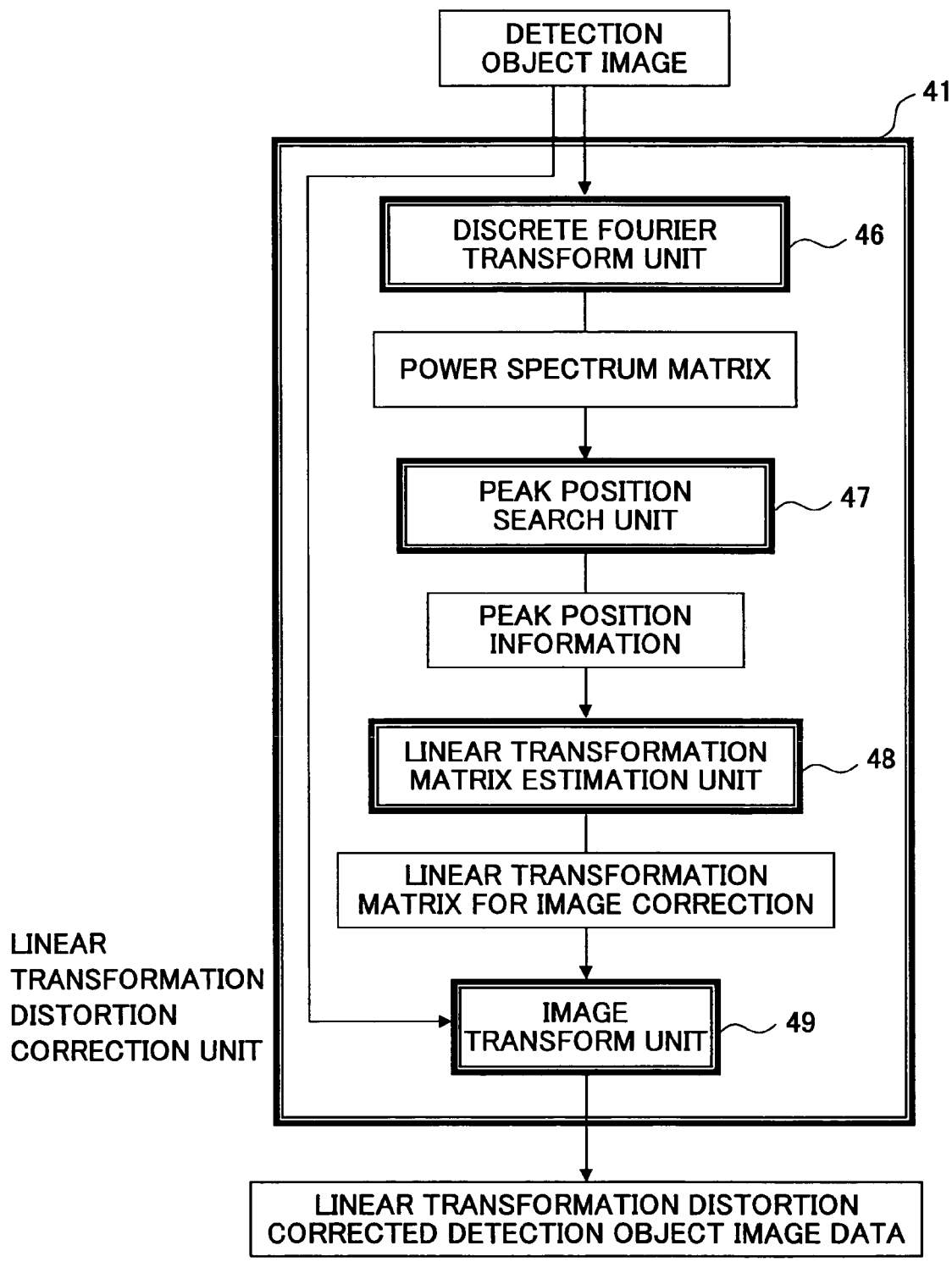
FIG. 22 is a block diagram of a linear transformation distortion correction unit 41.
Figure 23:
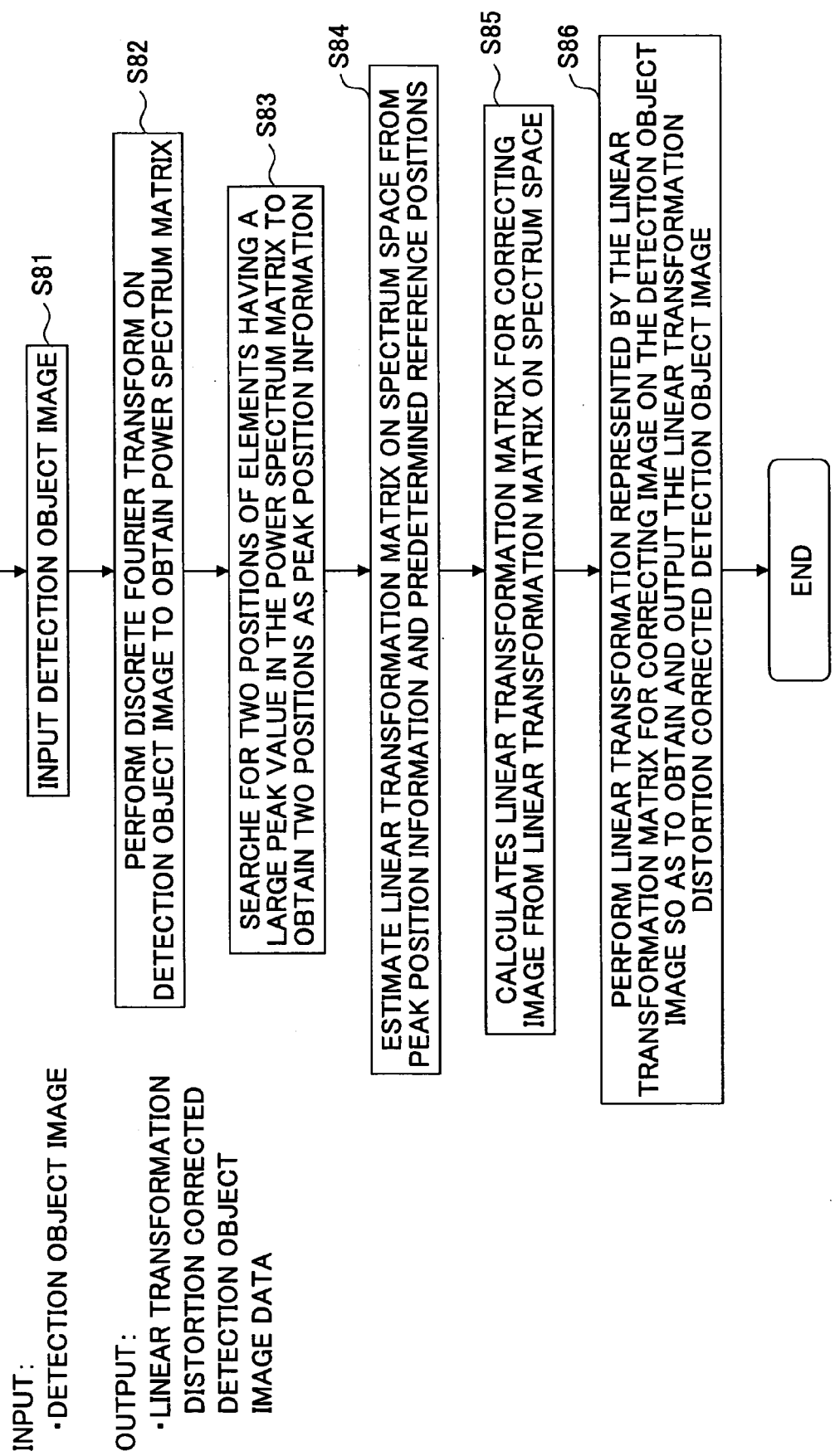
FIG. 23 is a diagram showing process flow of the linear transformation distortion correction unit 41.

FIG. 22 shows a configuration of the linear transformation distortion correction unit 41 in this embodiment, and FIG. 23 shows a process flow. As shown in FIG. 22, the linear transformation distortion correction unit 41 includes a discrete Fourier transform unit 46, a peak position search unit 47, a linear transformation matrix estimation unit 48 and an image transformation unit 49. The process flow of the linear transformation distortion correction unit 41 is described with reference to FIG. 23.

The linear transformation distortion correction unit 41 receives the detection object image (step 81). First, the discrete Fourier transform unit 46 performs two dimensional discrete Fourier transform on the detection object image to obtain a power spectrum matrix (step 82). Next, the peak position search unit 47 searches for two positions of elements having a large peak value in the power spectrum matrix to obtain the two element positions as peak position information (step 83).

Next, based on the peak position information and predetermined reference positions, the linear transformation matrix estimation unit 48 calculates a linear transformation matrix for transforming the reference positions to the peak positions (step 84), and further outputs, as an image correction linear transformation matrix, an inverse matrix of a matrix obtained by converting the linear transformation matrix on the spectrum space into a linear transformation matrix on the pixel space (step 85). Finally, the image transformation unit 49 performs image linear transformation represented by the image correction linear transformation matrix on the detection object image so as to correct the linear transformation performed on the detection object image to obtain and output the linear transformation distortion corrected detection object image data (step 86).

The principle in the process for correcting the linear transformation distortion in the detection object image by the linear transformation distortion correction unit is described in the following.

Figure 24:
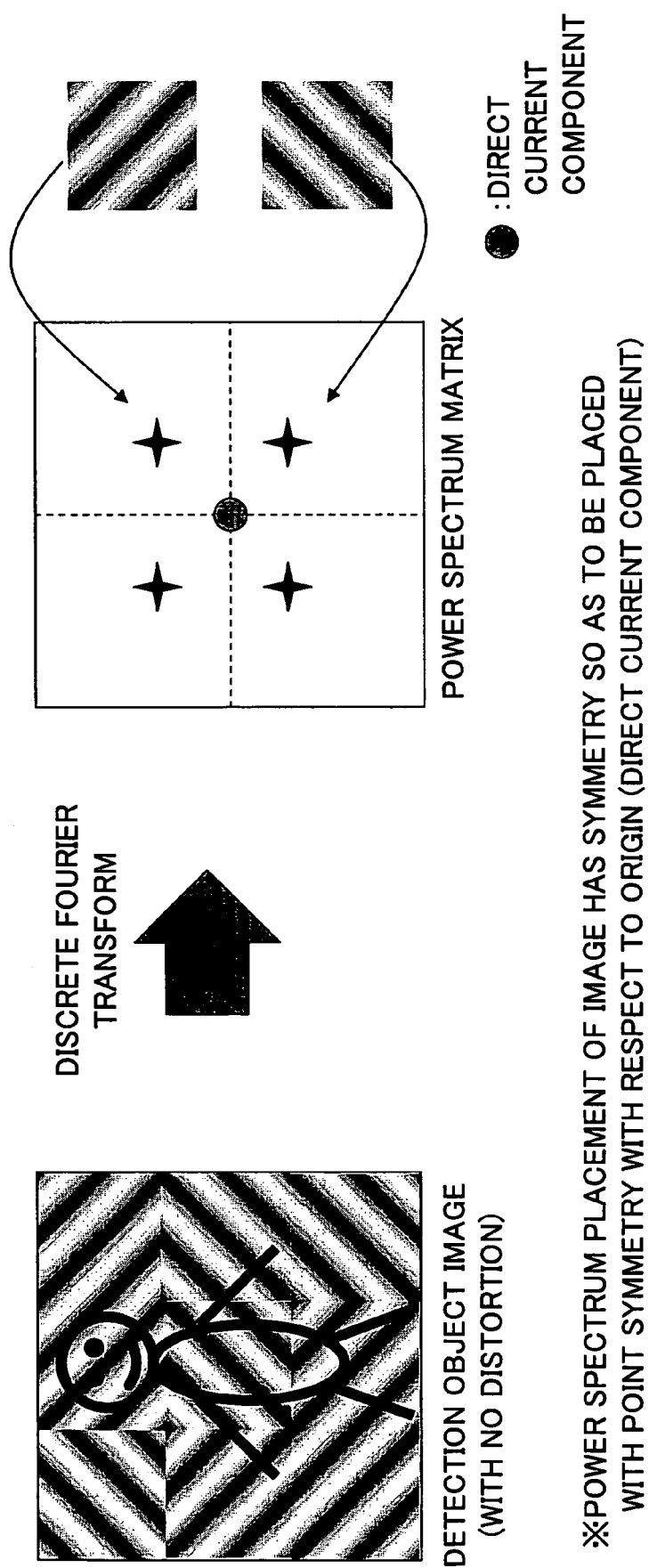
FIG. 24 is a diagram for explaining principle of processes of the linear transformation distortion correction unit 41.

When inputting the image obtained by the digital watermark embedding apparatus 10 of this embodiment as it is as the detection object image, the power spectrum obtained by performing discrete Fourier transform on the detection object image has large peaks at frequency positions corresponding to the two kinds of frequency patterns superimposed on the blocks as shown in FIG. 24. The reason is that two kinds of frequency patterns cover the whole area of the detection object image with almost equal areas between the two frequency patterns (due to spreading process) and that frequency positions of the power spectrum obtained by discrete Fourier transform for the whole area of the image is not dependent on localization of the frequency patterns, assuming that there is a fact that, in a local region in units of block, a frequency representing a frequency pattern superimposed on the block has a peak.

Figure 25:
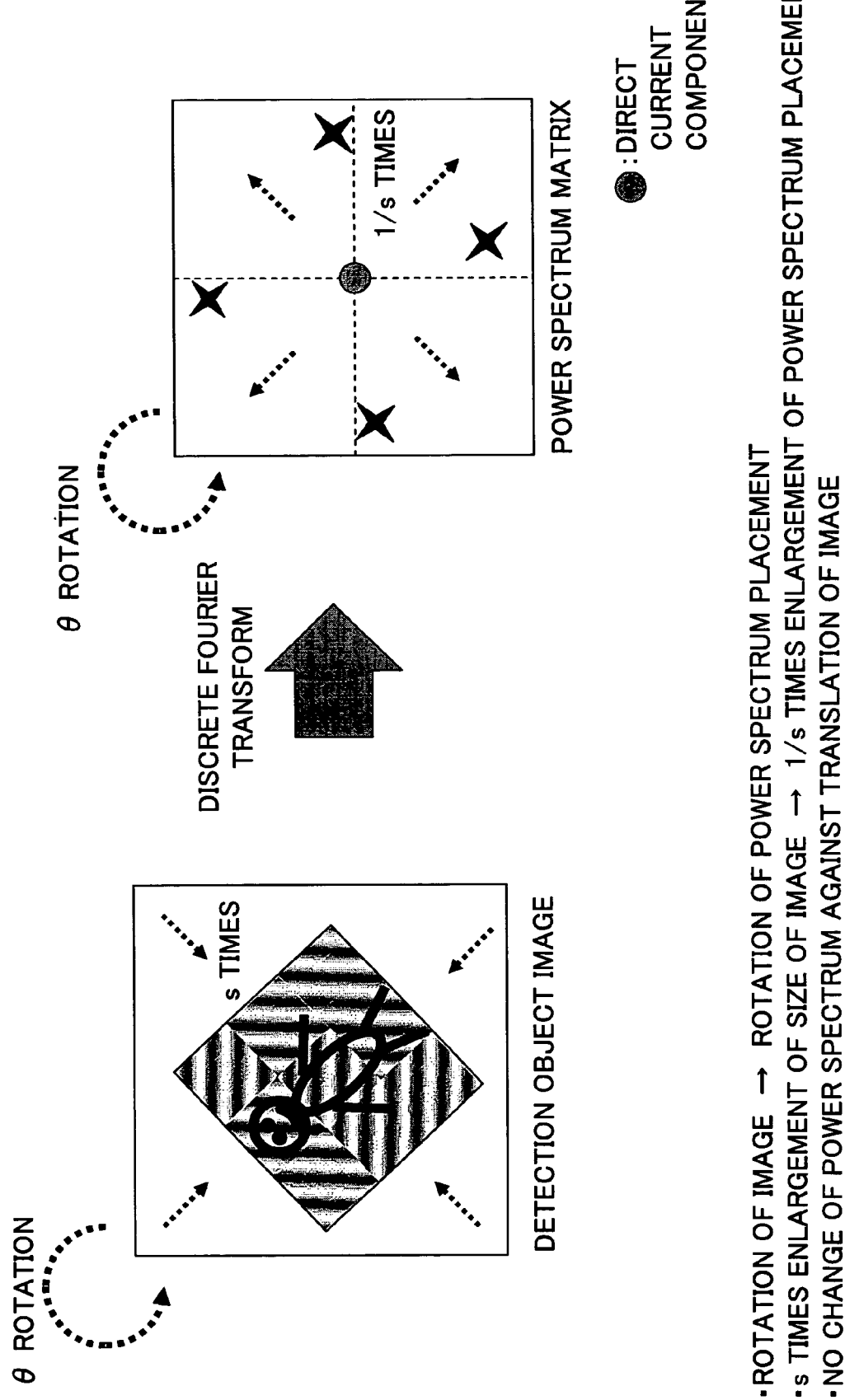
FIG. 25 is a diagram for explaining principle of processes of the linear transformation distortion correction unit 41.

Next, as shown in FIG. 25, a case where linear transformation has been performed on the detection object image is considered. In this case, as a generally well known fact, in the linear transformation performed on the detection object image, rotation component is reflected to the spectrum space as rotation of an angle the same as the rotation component, and a scaling component is reflected to the spectrum space as a reversed scaling component. For example, when linear transformation of rotation of angle $\theta$ and s times scaling is performed on the image space, linear transformation of rotation of angle $\theta$ and 1/s times scaling is caused on the spectrum space. In addition, the power spectrum has characteristics that translation on an image causes no change for the power spectrum. Based on the above-description, when linear transformation is performed in the detection object image as shown in FIG. 25, linear transformation corresponding to the linear transformation is performed for the power spectrum matrix shown in FIG. 24 so that the peak positions corresponding to the two kinds of the frequency patterns moves by the transformation.

Therefore, by detecting two peak positions in the power spectrum matrix obtained from the detection object image on which linear transformation is performed as shown in FIG. 25 and by calculating linear transformation for transforming reference positions that are peak positions on a power spectrum matrix obtained under no distortion state shown in FIG. 24 to the detected two peak positions, linear transformation on corresponding pixel space is determined so that estimation of the linear transformation parameter and correction of distortion become possible. At this time, for two reasons that power spectrum arrangement is point symmetry with respect to the origin (direct current component position) and that there is no method to distinguish between two peak points, uncertainty as to 90° by 90° rotation remains. That is, the linear transformation distortion corrected detection object image obtained by performing linear transformation distortion correction takes one of states of rotated by 0 degree, rotated by 90 degrees, rotated by 180 degrees and rotated by 270 degrees compared with the original digital watermark embedded image. But, this can be solved by performing aftermentioned 90° by 90° rotation process. In addition, although there is uncertainty of mirror image transformation of the image, this can be solved by doubly performing processes after the after-mentioned position transformation matrix estimation unit.

Next, processes of each unit in the linear transformation distortion correction unit in this embodiment is described in detail.

Figure 26:
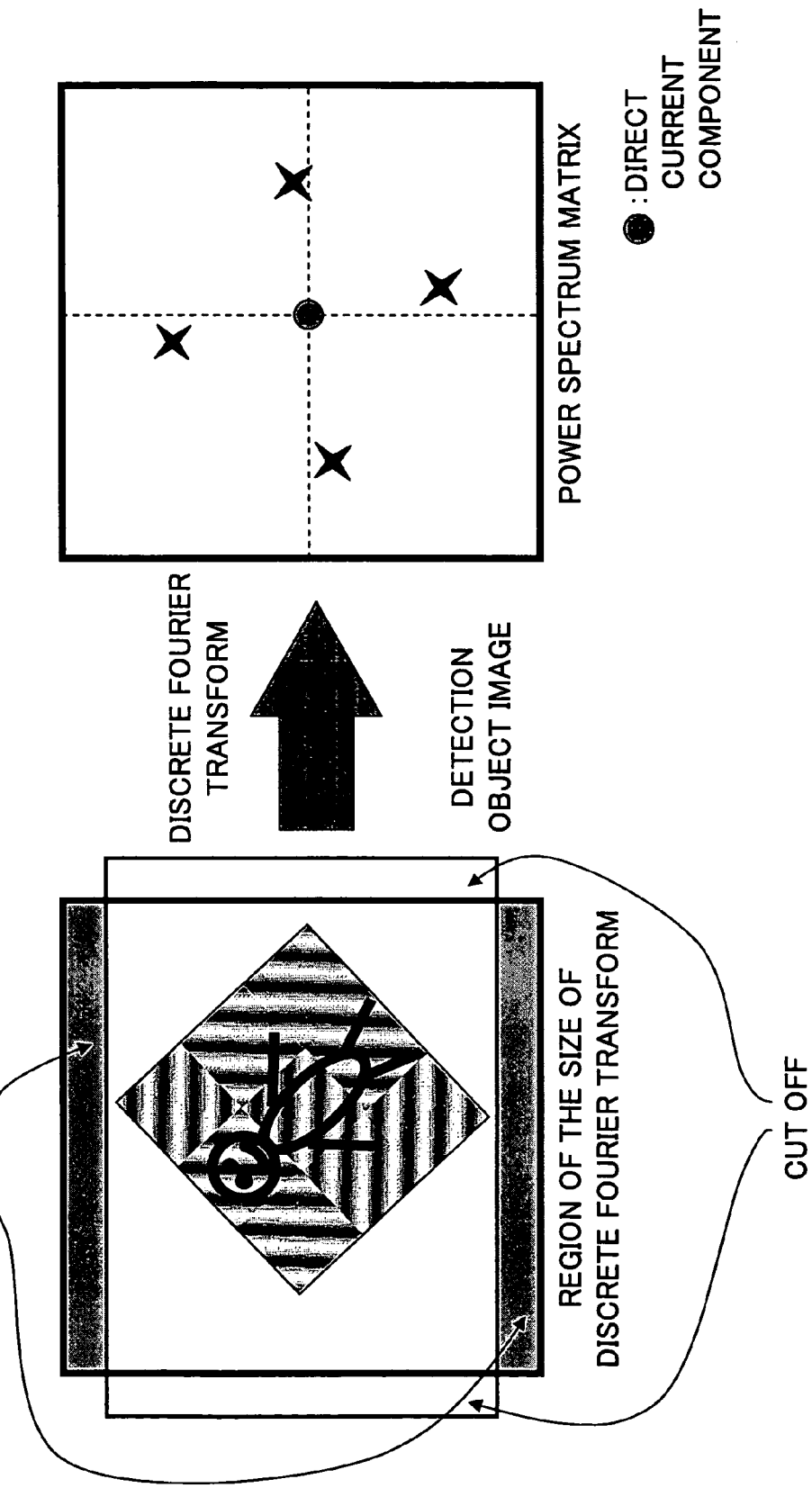
FIG. 26 is a diagram for explaining processes of a discrete Fourier transform unit 46.

FIG. 26 shows the process of the discrete Fourier transform unit 46. The discrete Fourier transform unit 46 receives the detection object image and outputs the power spectrum matrix obtained by performing discrete Fourier transformation on the detection object image. The size of the discrete Fourier transformation may be the size of the detection object image itself, or may be set such that each of vertical and horizontal sizes is a power of 2 for using FFT (fast Fourier Transform) to increase process speed. When the size of the detection object image and the size of the discrete Fourier transform are different, as shown in FIG. 26, pixels that are object of discrete Fourier transform are extracted from the center of the image, parts lying off the size of the discrete Fourier transform are discarded, and when the size of the image is less than the size of the discrete Fourier transform, the lack region is filled with a pixel value 0 or filled with an average pixel value in a partial region of the detection object region in the size of the discrete Fourier transform, for example. In addition, to increase process speed, the discrete Fourier transform may be performed after reducing the detection object image by a predetermined scaling factor, for example, reducing the detection object image to half in each of vertical and horizontal direction. In the thus obtained power spectrum matrix, four points (independent two points in consideration of symmetry) of large peak values are included according to the above-mentioned reason.

Figure 27:
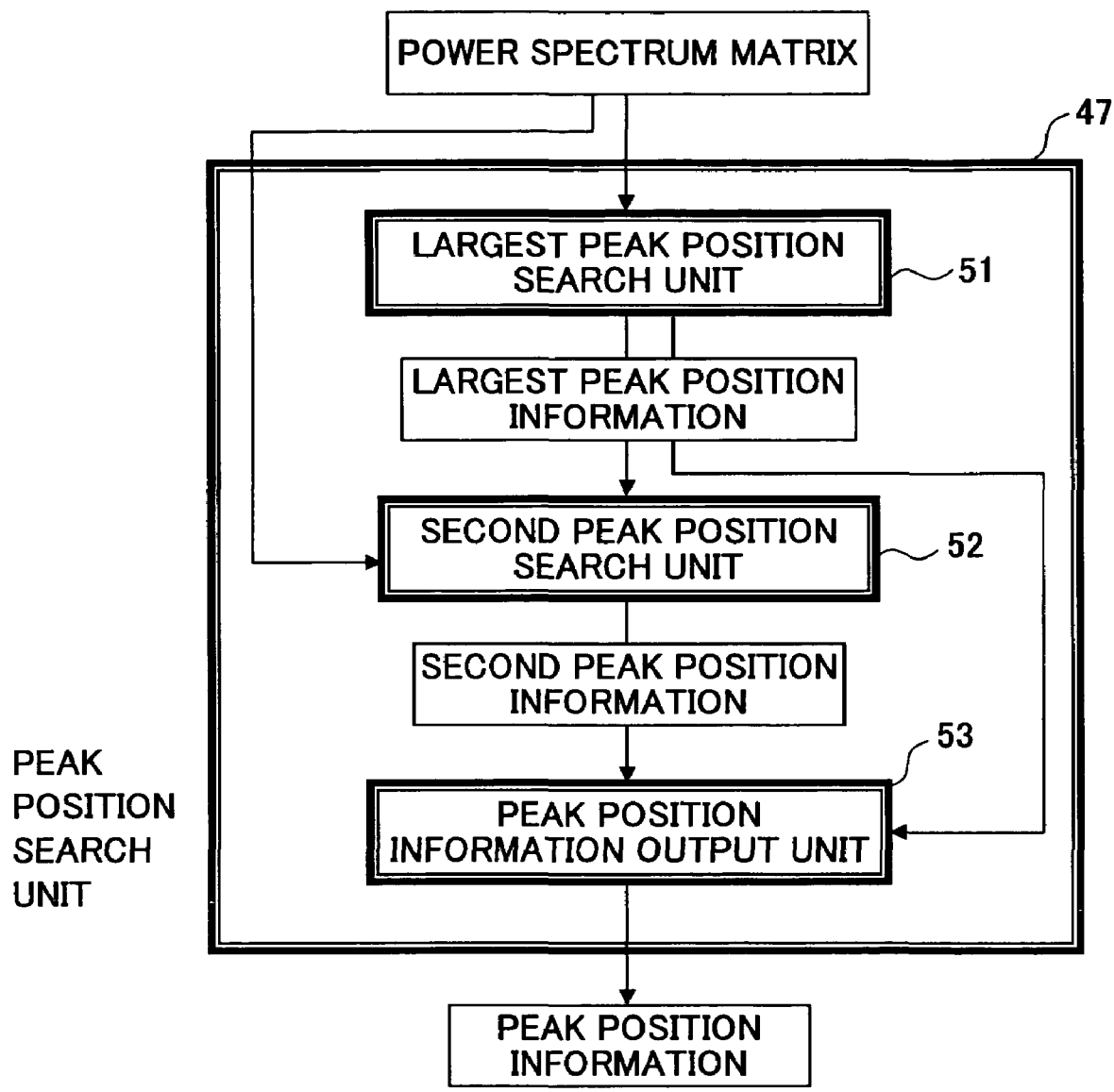
FIG. 27 is a block diagram of a peak position search unit 47.
Figure 28:
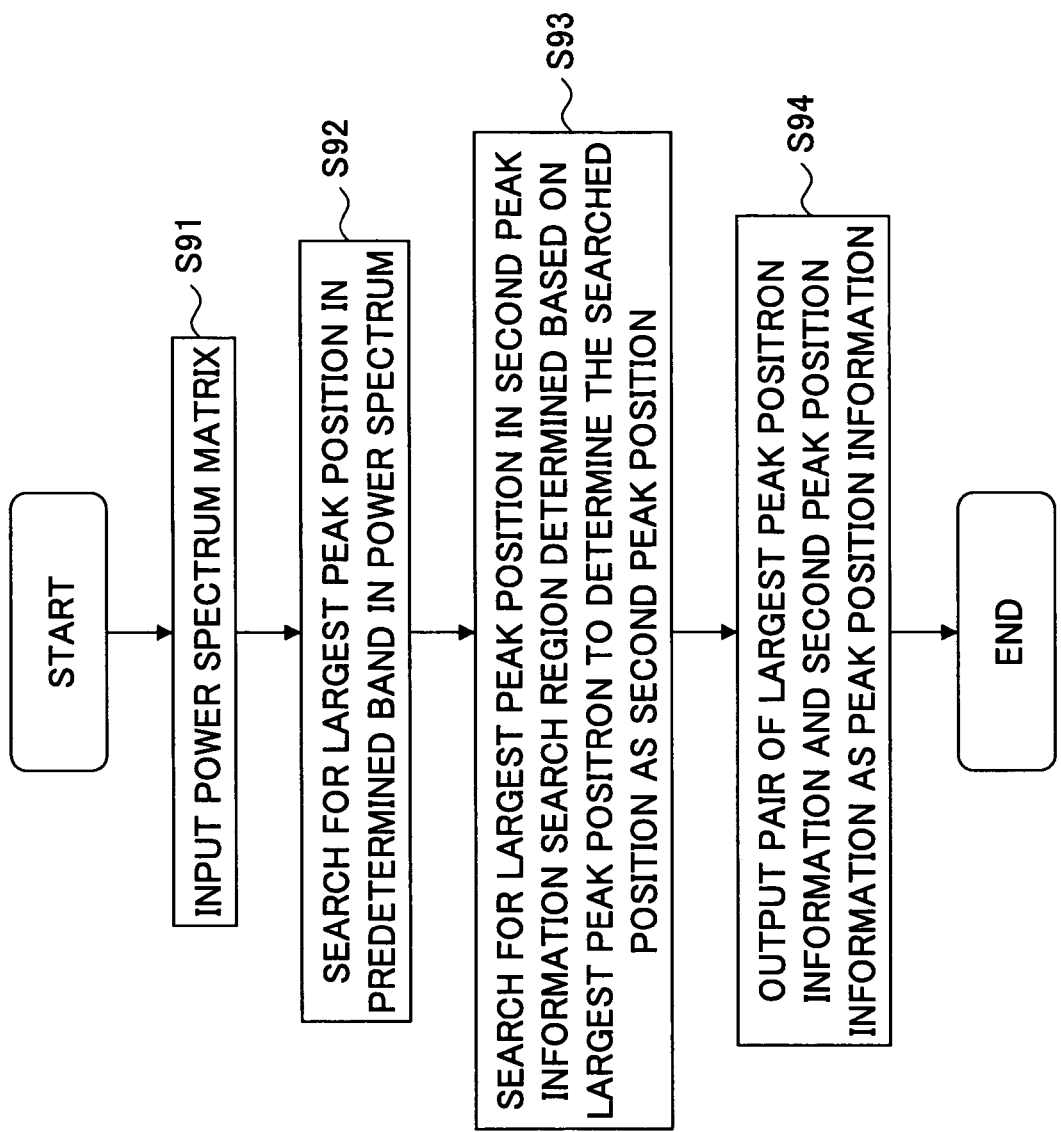
FIG. 28 is a diagram showing a process flow of the peak position search unit 47.

FIG. 27 shows a configuration of a peak position search unit 47 in this embodiment, FIG. 28 shows a process flow. As shown in FIG. 27, the peak position search unit 47 in this embodiment includes a largest peak position search unit 51, a second peak position search unit 52, and a peak position information output unit 53. In the following, the process flow is described with reference to FIG. 28.

Figure 29:
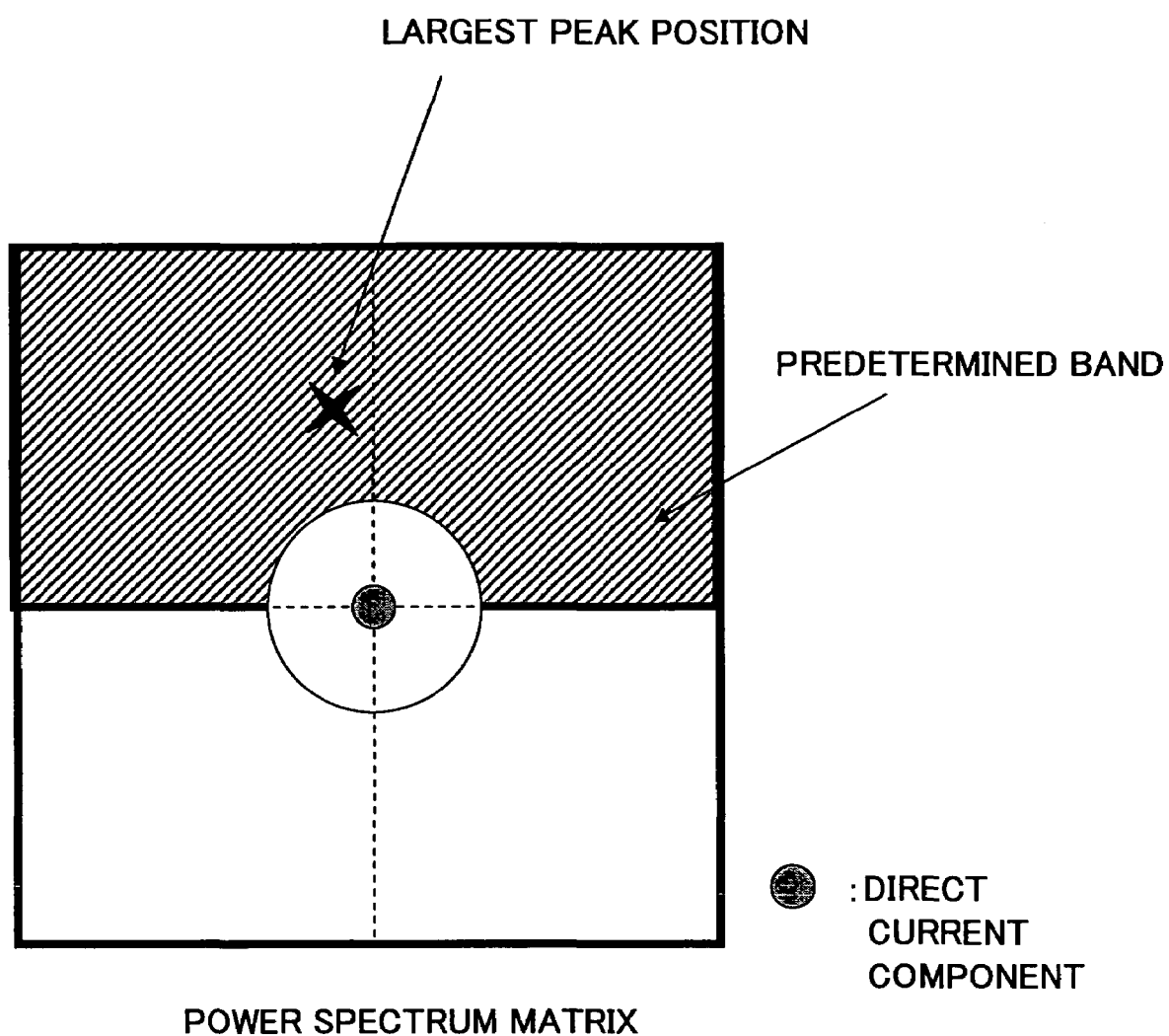
FIG. 29 is a diagram for explaining processes of the peak position search unit 47.

The peak position search unit 47 receives the power spectrum matrix (step 91). First, as shown in FIG. 29, the largest peak position search unit 51 detects, by searching, a frequency position having the largest peak value in a predetermined band in the power spectrum matrix obtained by the discrete Fourier transform unit 46 (step 92). As to determination of the band, it is selected such that low frequency band is not included. The reason for avoiding low frequency is that the largest peak position may be erroneously detected since the energy of the original image itself concentrates on the low frequency. In addition, because of symmetry of the power spectrum matrix, searching only upper half band is sufficient.

When searching for the largest peak position, a frequency position having the largest value in the predetermined band may be simply determined as the largest peak position. Alternatively, a frequency position at which a largest response value of a convolution operator such as a Laplacian filter is obtained may be determined as the largest peak position for finding a frequency position having a large power like impulse (that is, like peak) as shown in FIG. 30, for example.

Figure 30:
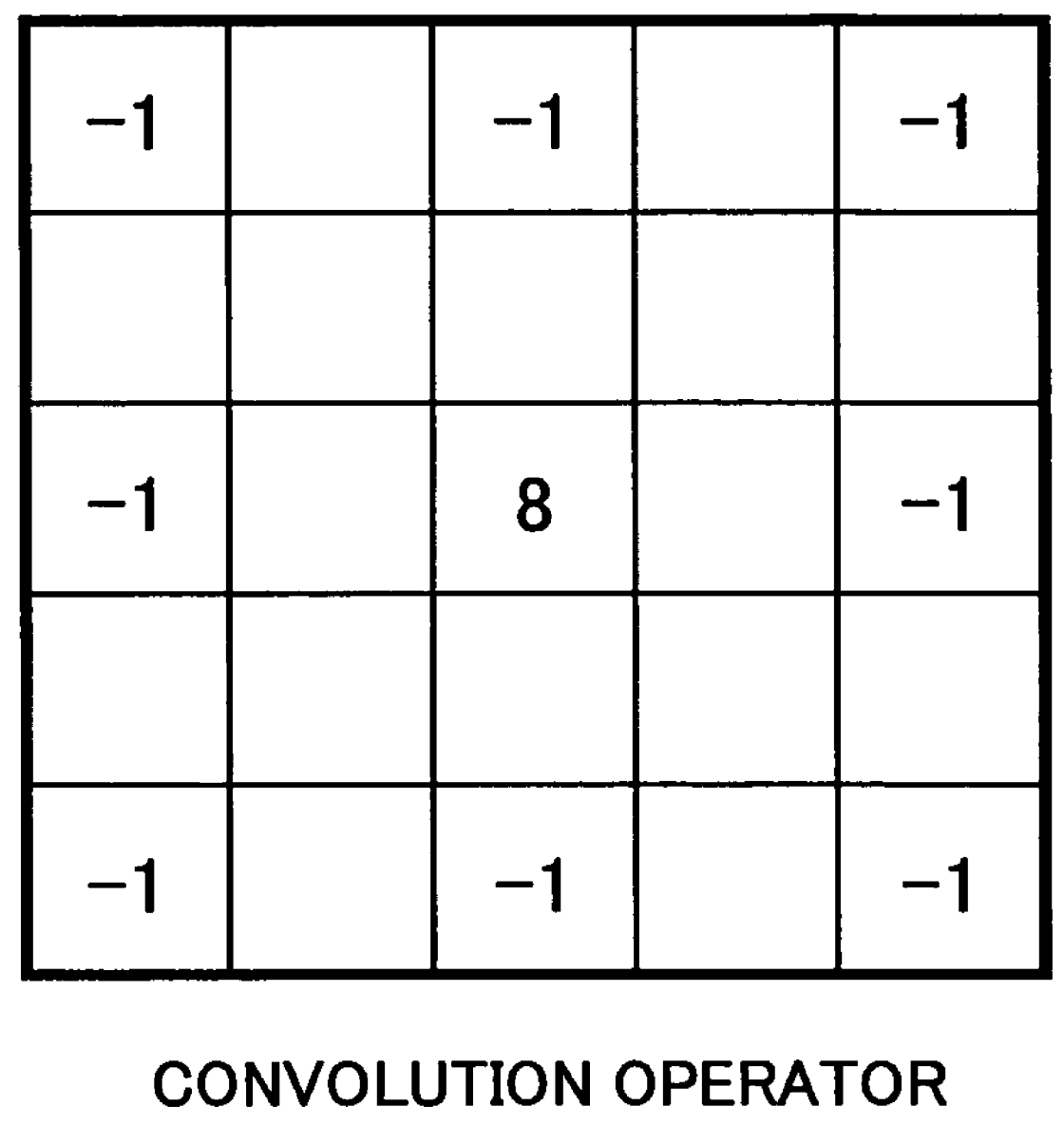

In addition, when using the convolution operator, it is better to use a sparse convolution operator shown in FIG. 30 than to use one for detecting impulse including only one point (3×3 Laplacian filter, for example) such that a peak having a range of skirts to some extent can be detected. This is because the peak appearing in the power spectrum matrix may extend to some extent due to some non-linear distortion in the detection object image. The largest peak position search unit 51 detects the largest peak position as mentioned above to output it as the largest peak position information.

Figure 31:
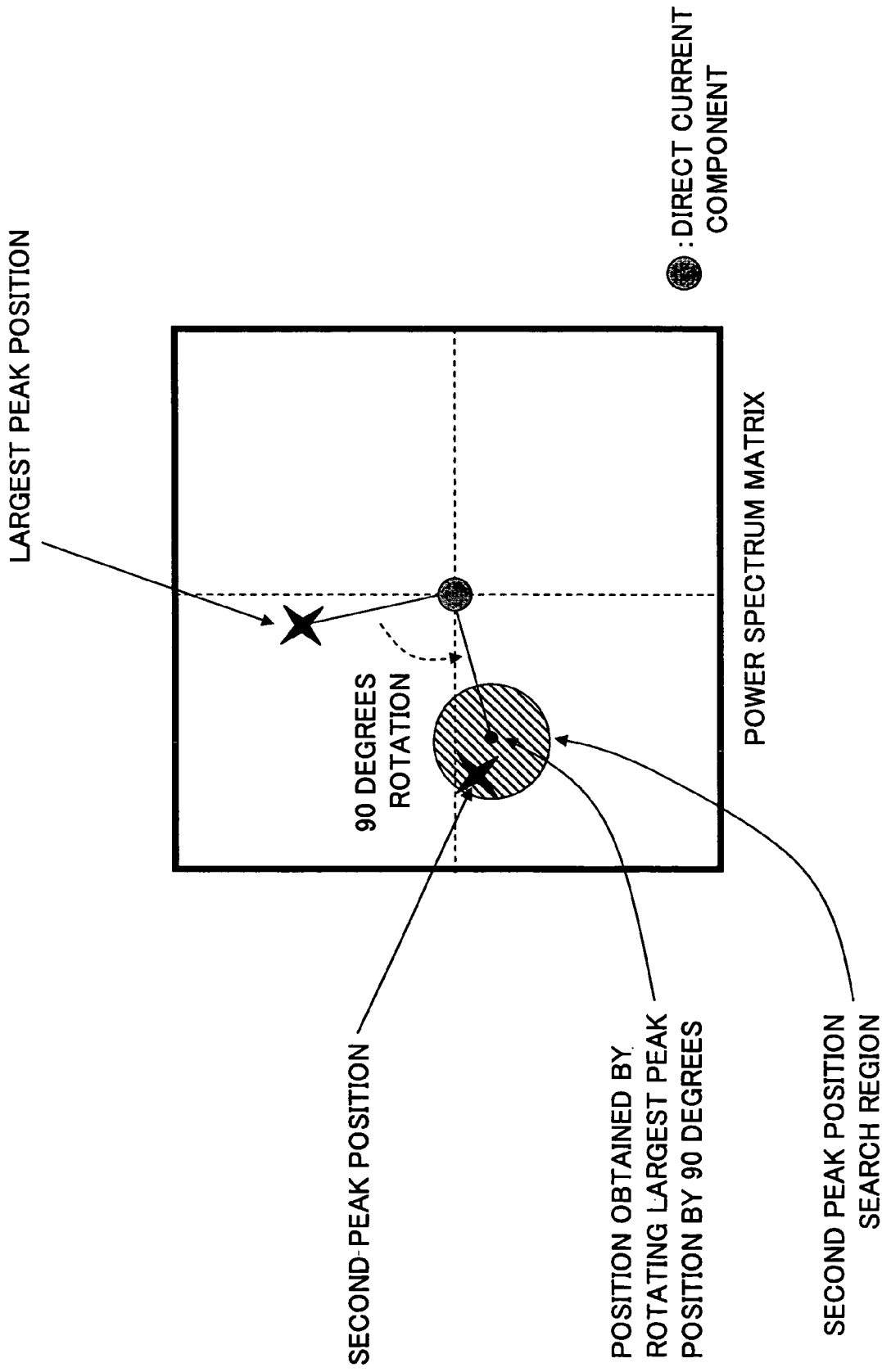
FIG. 31 is a diagram for explaining processes of the peak position search unit 47.

Next, the second peak position search unit 52 searches for a frequency position having the largest peak in a second peak position search region that is a region of a predetermined size centered on a point obtained by rotating the position indicated by the largest peak position information by 90 degrees and outputs the detected frequency position as second peak position information as shown in FIG. 31 (step 93). The reason for determining the region proximity to the point obtained by rotating the largest peak position by 90 degrees as the second peak position search region is that there are two kinds of waveform patterns of frequencies used for digital watermark detection wherein one is a pattern obtained by rotating another by 90 degrees.

In addition, the reason for searching the proximity region instead of determining the point obtained by rotating the largest peak position by 90 degrees as the second peak position is that it is considered that the peak position may be shifted from the position rotated from the largest peak position by 90 degrees due to transformation components such as aspect ratio change and a shear in linear transformation performed on the detection object image. The size of the second peak position search region is predetermined in the linear transformation distortion correction unit 41 according to the degree of corresponding aspect ratio change and the shear transformation. In addition, like the largest peak position search unit 51, when searching for the second peak position, a frequency position having the largest value in the second peak position search region may be determined to be the second peak position, or a frequency position by which a largest response value of a convolution operator as shown in FIG. 30 is obtained may be determined to be the second peak position.

Although the largest peak position information and the second peak position information are obtained in the above-mentioned way, the largest peak position and the second peal value may be determined such that the largest peak position is a position having the largest peak value and the second peak position is a point having second largest peak value in the predetermined band shown in FIG. 29, as another method.

Finally, the peak position information output unit 53 outputs a pair of the largest peak position information and the second peak position information as peak position information (step 94).

Figure 32:
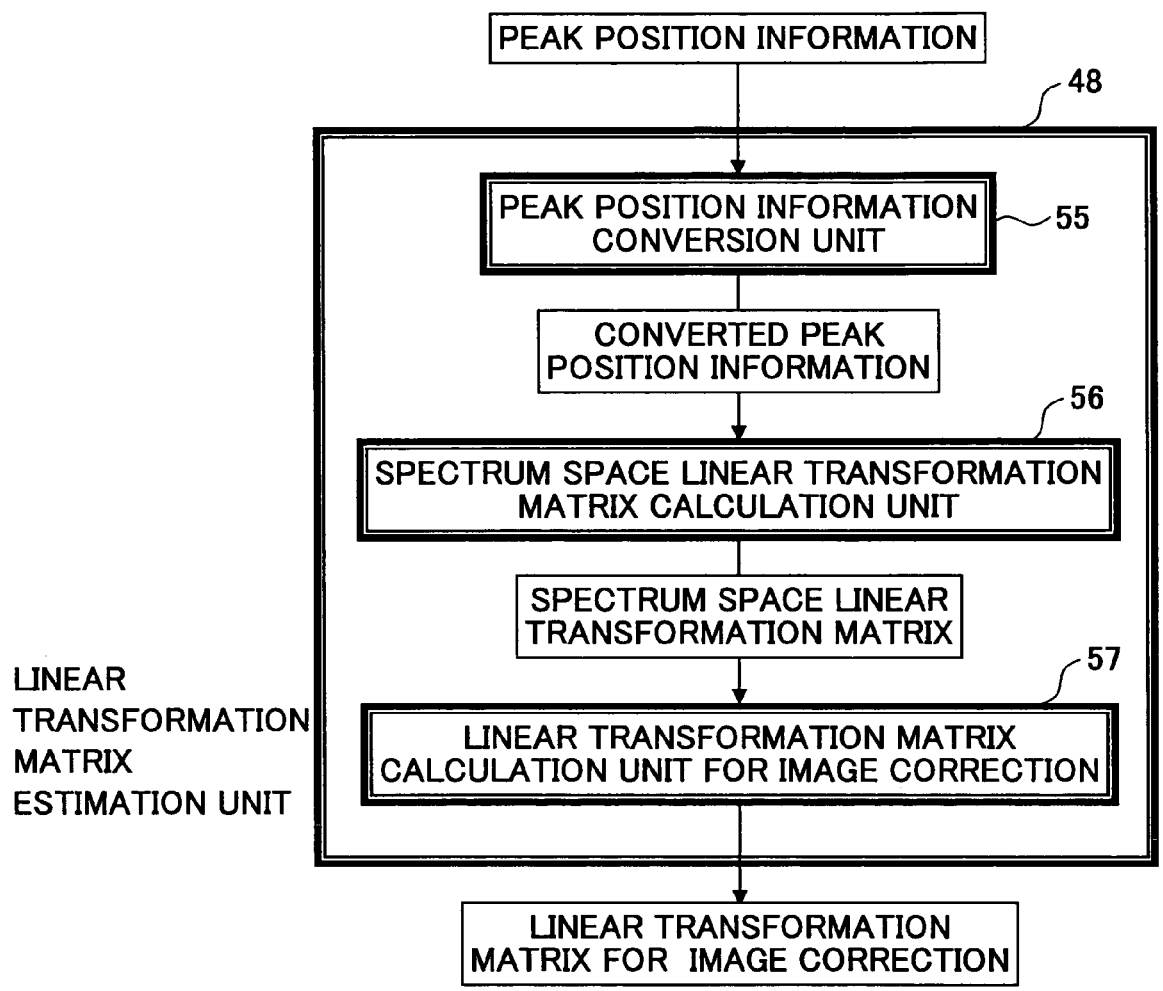
FIG. 32 is a block diagram of a linear transformation matrix estimation unit 48.
Figure 33:
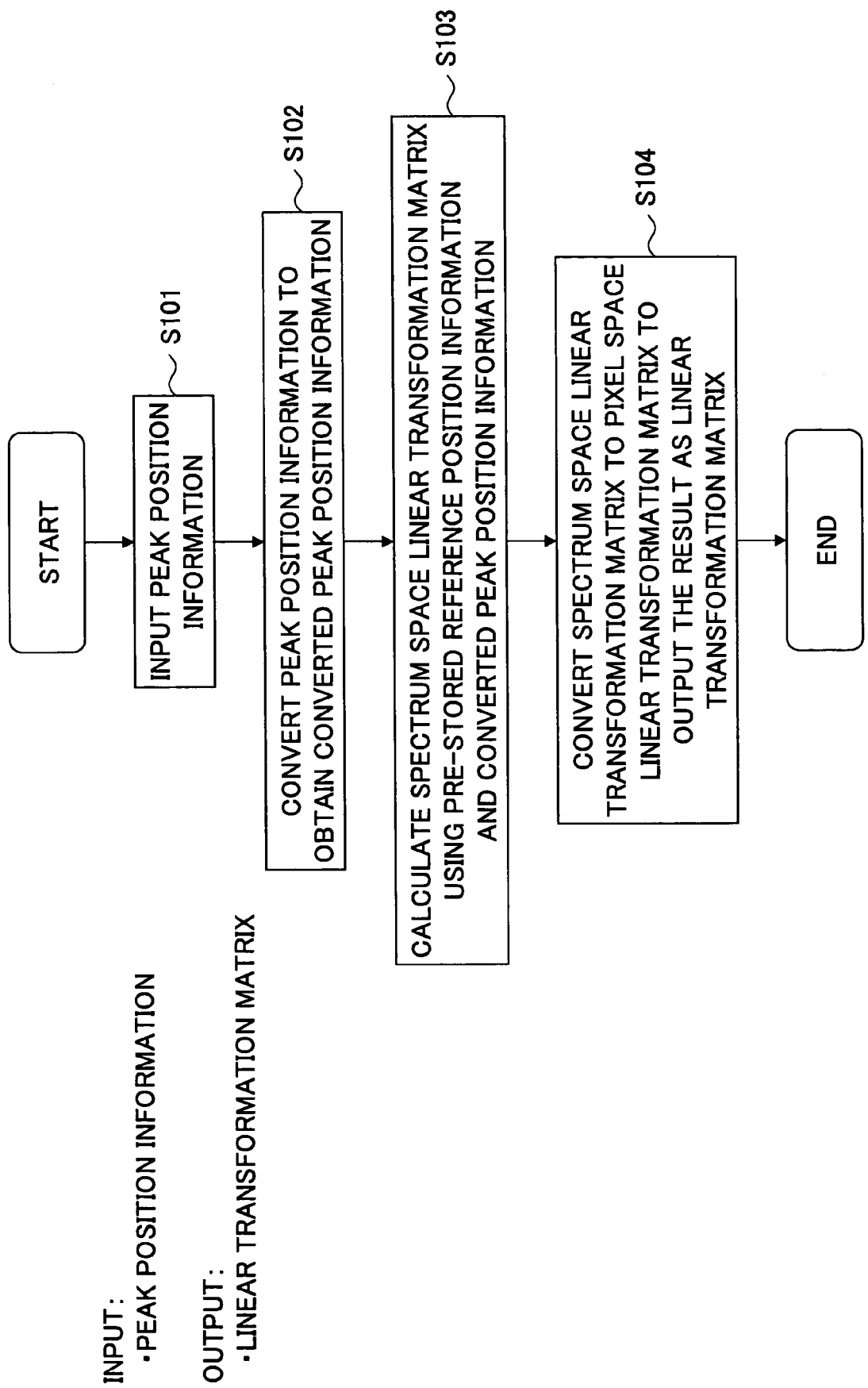
FIG. 33 is a diagram showing a process flow of a linear transformation matrix estimation unit 48.

Next, the linear transformation matrix estimation unit 48 in the linear transformation distortion correction unit 41 is described in detail. FIG. 32 shows a configuration of the linear transformation matrix estimation unit 48 and FIG. 33 shows a process flow. As shown in FIG. 32, the linear transformation matrix estimation unit 48 includes a peak position information conversion unit 55, a spectrum space linear transformation matrix calculation unit 56, and a linear transformation calculation unit 57 for image correction. The process flow of the linear transformation matrix estimation unit 48 is described with reference to FIG. 33.

The linear transformation matrix estimation unit 48 receives the peak position information obtained by the peak position search unit 47 (step 101). First, the peak position information conversion unit 55 converts the peak position information to obtain converted peak position information (step 102). Then, the spectrum space linear transform matrix calculation unit 56 calculates a spectrum space linear transformation matrix using pre-stored reference position information and the converted peak position information (step 103). Finally, the linear transformation matrix calculation unit 57 for image correction converts the spectrum space linear transformation matrix to the pixel space linear transformation matrix and outputs the result as the linear transformation matrix for image correction (step 104). In the following, processes of each unit are described in detail.

Figure 34:
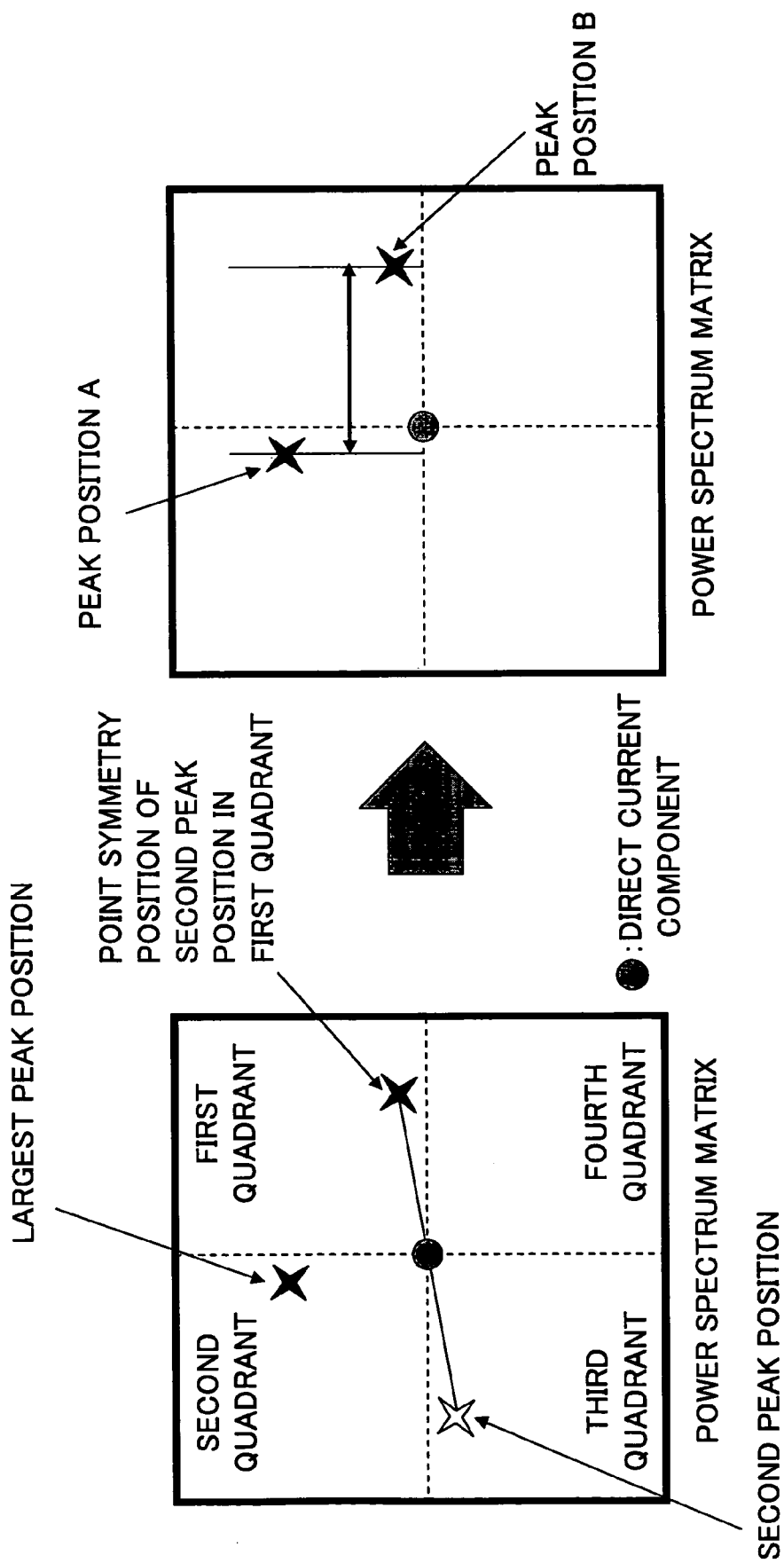
FIG. 34 is a diagram for explaining processes of a peak information conversion unit 55.

FIG. 34 shows operations of the peak position information conversion unit 55. The peak position information conversion unit 55 receives peak position information and determines whether a position on the power spectrum indicated by each of the largest peak position information and the second peak position information in the peak position information is in a first quadrant or in a second quadrant. If the position is not in the first quadrant or in the second quadrant, the peak position information conversion unit 55 converts the position information such that a point symmetric position is regarded as a new position. In FIG. 34, since the second peak position is not in the first quadrant or in the second quadrant, a point that is point symmetry of the second peak position in the peak position information is determined to be a new second peak position.

Next, as to the largest peak position and the second peak position both of which exist in the first quadrant or in the second quadrant, each name is changed such that one having smaller x direction coordinate value, that is, one located in the left side on the power spectrum matrix is named as peak position A and another is named as peak point B, so that a pair of peal position information A indicating the peak position A and peak position information B indicating the peak position B is output as converted peak position information. By also generating converted peak position information in which the definition of the peak position A and the peak position B is reversed and by doubly performing all of processes after that, support of mirror image conversion of the image can be realized.

Figure 35:
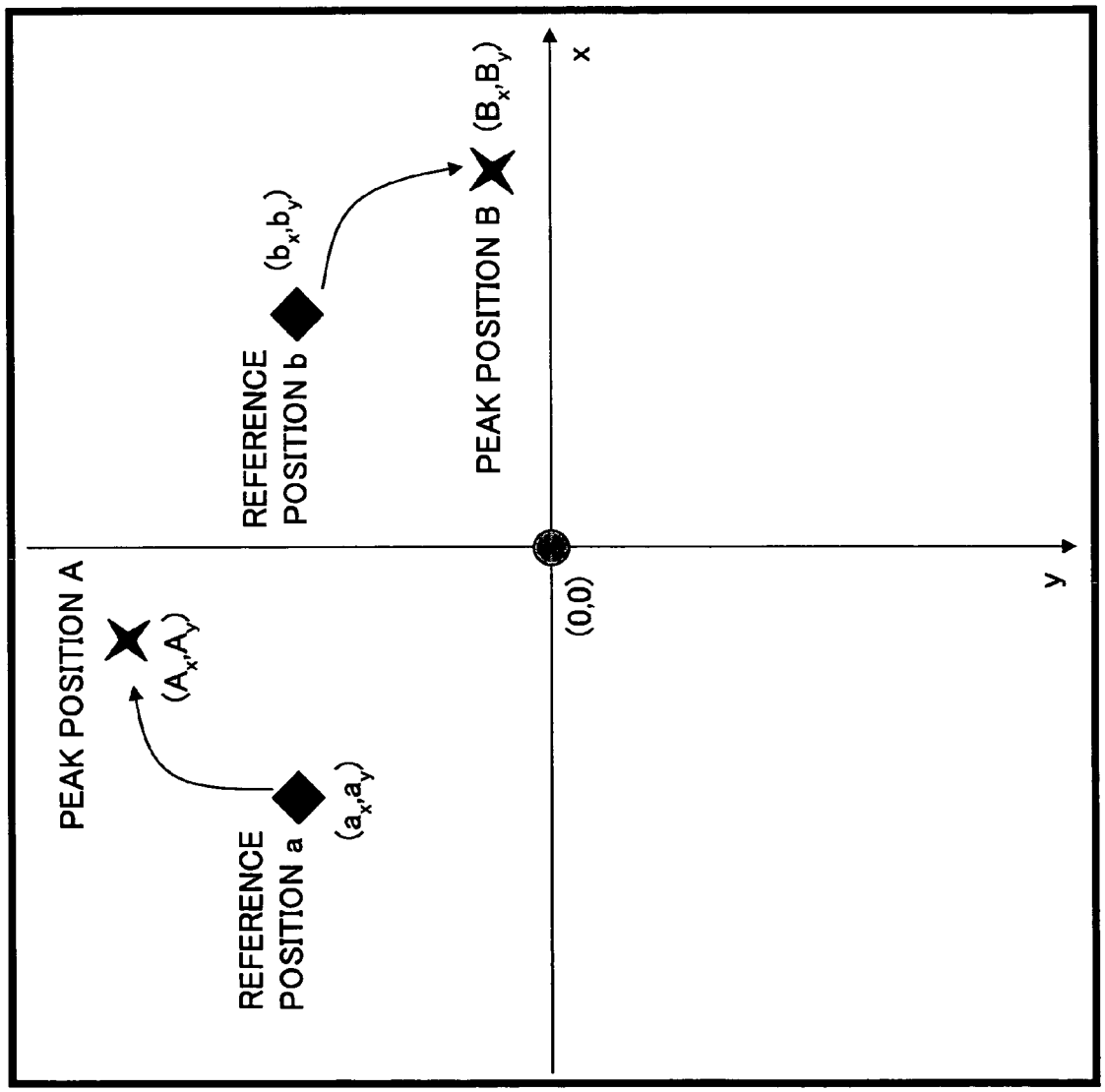
FIG. 35 is a diagram for explaining principle of a spectrum space linear transformation matrix calculation unit 56.

Next, the process of the spectrum space linear transformation matrix calculation unit 56 is described with reference to FIG. 35. The spectrum space linear transformation matrix calculation unit 56 stores beforehand peak positions obtained just after embedding the digital watermark, that is, two frequency positions corresponding to two kinds of frequency patterns used for embedding as reference position information. In the reference position information, one having smaller x direction coordinate value, that is, one located at left side on the power spectrum matrix is regarded as a reference position a and another is regarded as a reference position b. At this time, the spectrum space position conversion matrix is linear transformation for transforming the reference position a to the peak position A and transforming the reference position b to the peak position B as shown in FIG. 35, and the transformation is calculated by the following equation.

In a two-dimensional coordinate system with an origin that corresponds to the direct current component in the power spectrum matrix, assuming reference point a: $(a_x, a_y)$
reference point b: $(b_x, b_y)$
peak position A: $(A_x, A_y)$
peak position B: $(B_x, B_y)$, and assuming the spectrum space linear transformation matrix is represented by $$X = \begin{pmatrix} p & q \\ r & s \end{pmatrix} \quad \text{[equation 3]}$$

then, $$\begin{pmatrix} A_x & B_x \\ A_y & B_y \end{pmatrix} = X \begin{pmatrix} a_x & b_x \\ a_y & b_y \end{pmatrix} \quad \text{[equation 4]}$$

is obtained. By solving this, $$X = \quad \text{[equation 5]}$$
$$\begin{pmatrix} p & q \\ r & s \end{pmatrix} = 1/(a_x b_y - b_x a_y) \begin{pmatrix} A_x b_y - B_x a_y & -A_x b_x + B_x a_x \\ A_y b_y - B_y a_y & -A_y b_x + B_y a_x \end{pmatrix}$$

is obtained.

Next, operations of the linear transformation matrix calculation unit 57 for image correction is described. The linear transformation matrix calculation unit 57 for image correction receives the spectrum space linear transformation matrix. As shown in FIG. 25, relationship between linear transformation on the pixel space and linear transformation on the spectrum space is that:

scaling component is reverse transformation, and
rotation component is the same. Based on this characteristic, the pixel space linear transformation matrix the corresponding to the spectrum space linear transformation matrix is obtained. When the spectrum space linear transformation matrix is represented as $$X = \begin{pmatrix} p & q \\ r & s \end{pmatrix}, \quad \text{[equation 6]}$$

the corresponding pixel space linear transformation matrix is $$Y = 1/(ps - qr) \begin{pmatrix} s & -r \\ -q & p \end{pmatrix}. \quad \text{[equation 7]}$$

Since the linear transformation matrix for image correction to be finally obtained is an inverse matrix of the pixel space linear transformation matrix, the matrix is represented by $$Y^{-1} = \begin{pmatrix} p & r \\ q & s \end{pmatrix}. \quad \text{[equation 8]}$$

Thus, a transposed matrix of the spectrum space linear transformation matrix can be output as the linear transformation matrix for image correction.

Next, operations of the image transformation unit 49 in the linear transformation distortion correction unit 41 in the digital watermark detection apparatus 40 are described with reference to FIGS. 36 and 37.

The image transformation unit 49 receives the detection object image and the linear transformation matrix for image correction generated in the linear transformation matrix estimation unit 48, and outputs an image obtained by performing linear transformation on the detection object image as the linear transformation distortion corrected detection object image.

Figure 36:
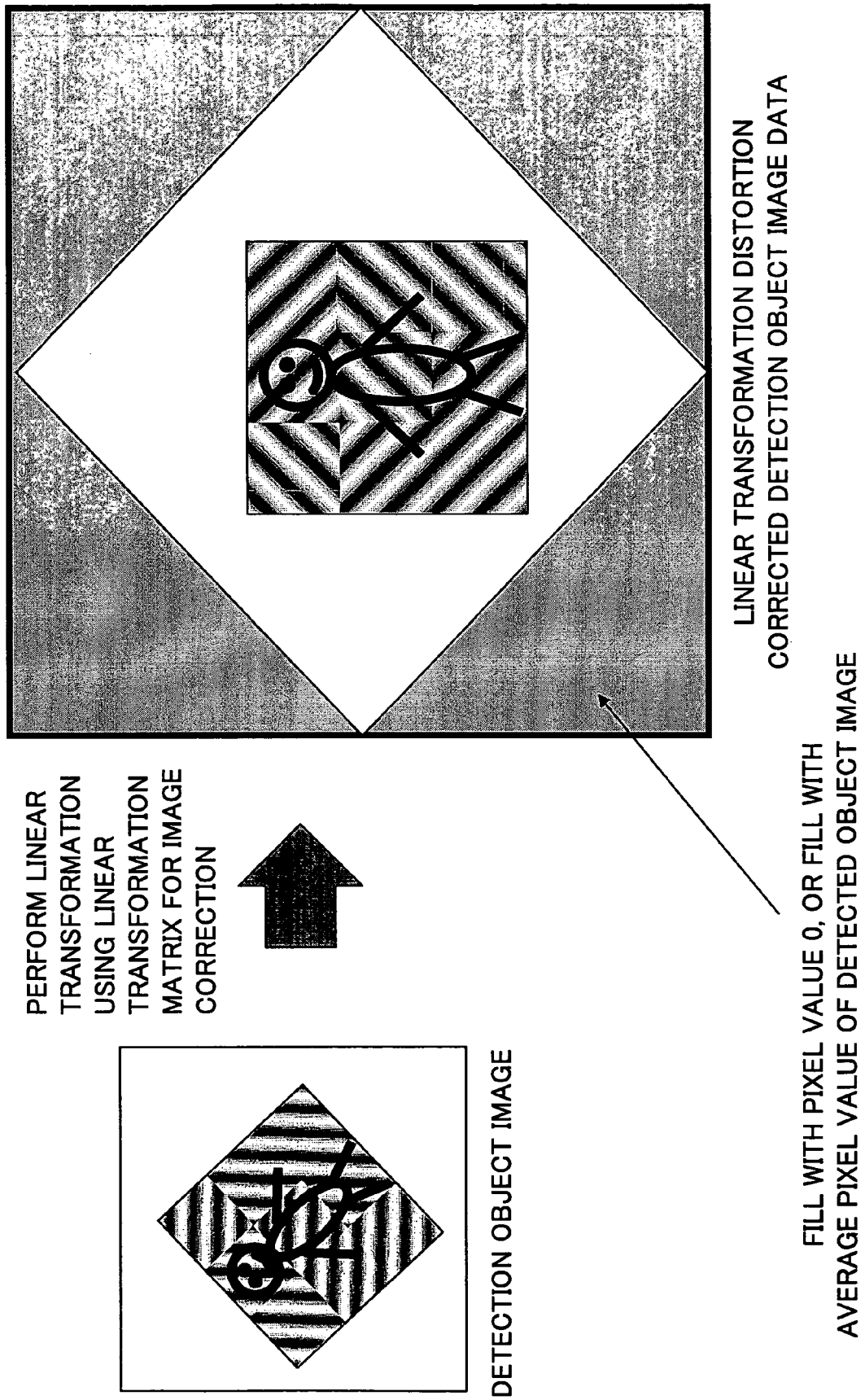
FIG. 36 is a diagram for explaining processes of an image conversion unit 49.
Figure 37:
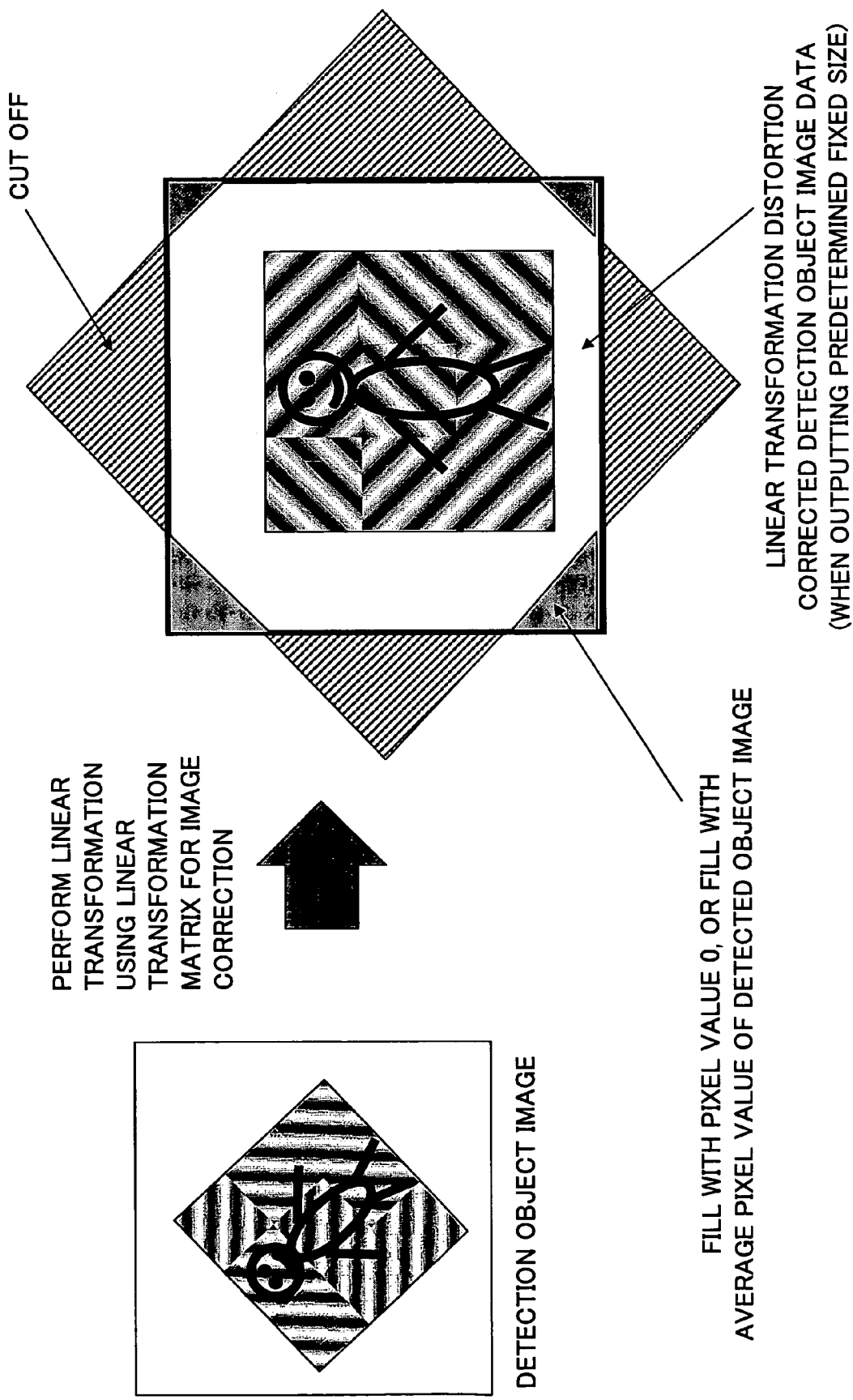
FIG. 37 is a diagram for explaining processes of the image conversion unit 49.

At this time, as shown in FIG. 36, when a region outside of the detection object image is generated due to the linear transformation, the region is filled with the pixel value 0, or the region is filled with the average pixel value of the detection object image. In addition, as shown in FIG. 37, the image size of the linear transformation distortion corrected detection object image is predetermined, a part in the detection object image lying off the fixed size is discarded, and when a region outside of the detection object image is generated, the region is filled with the pixel value 0, or the region is filled with the average pixel value of a partial region of the detection object image.

Figure 38:
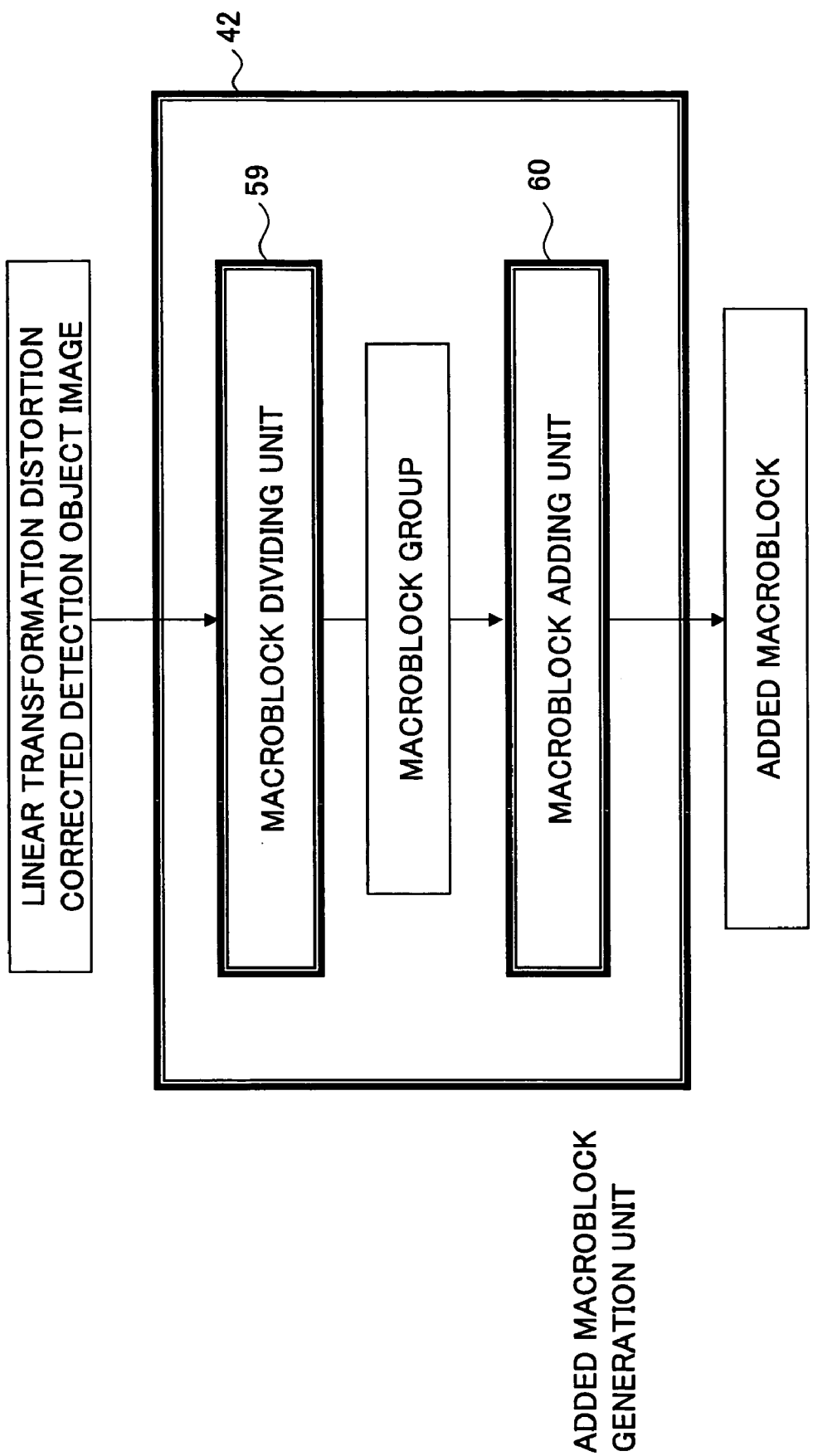
FIG. 38 is a block diagram of an added macroblock generation unit 42.
Figure 39:
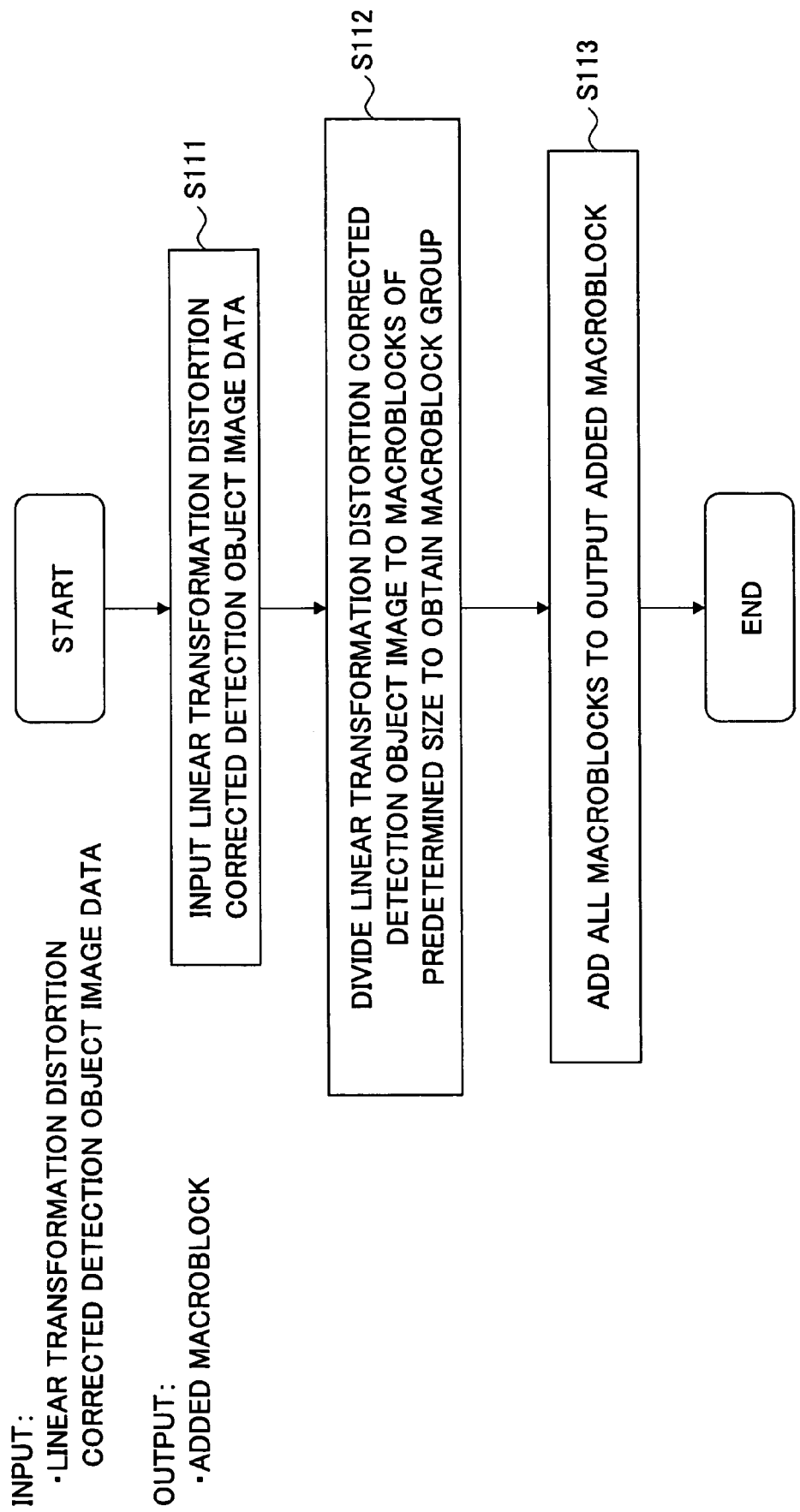
FIG. 39 is a diagram showing a process flow of the added macroblock generation unit 42.

Next, the added macroblock generation unit 42 in the digital watermark detection apparatus 40 is described. FIG. 38 shows a configuration of the added macroblock generation unit 42 in this embodiment and FIG. 39 shows a process flow.

As shown in FIG. 38, the added macroblock generation unit 42 includes a macroblock dividing unit 59 and a macroblock generation unit 60. The process flow in the added macroblock generation unit 42 is described with reference to FIG. 39.

Figure 40:
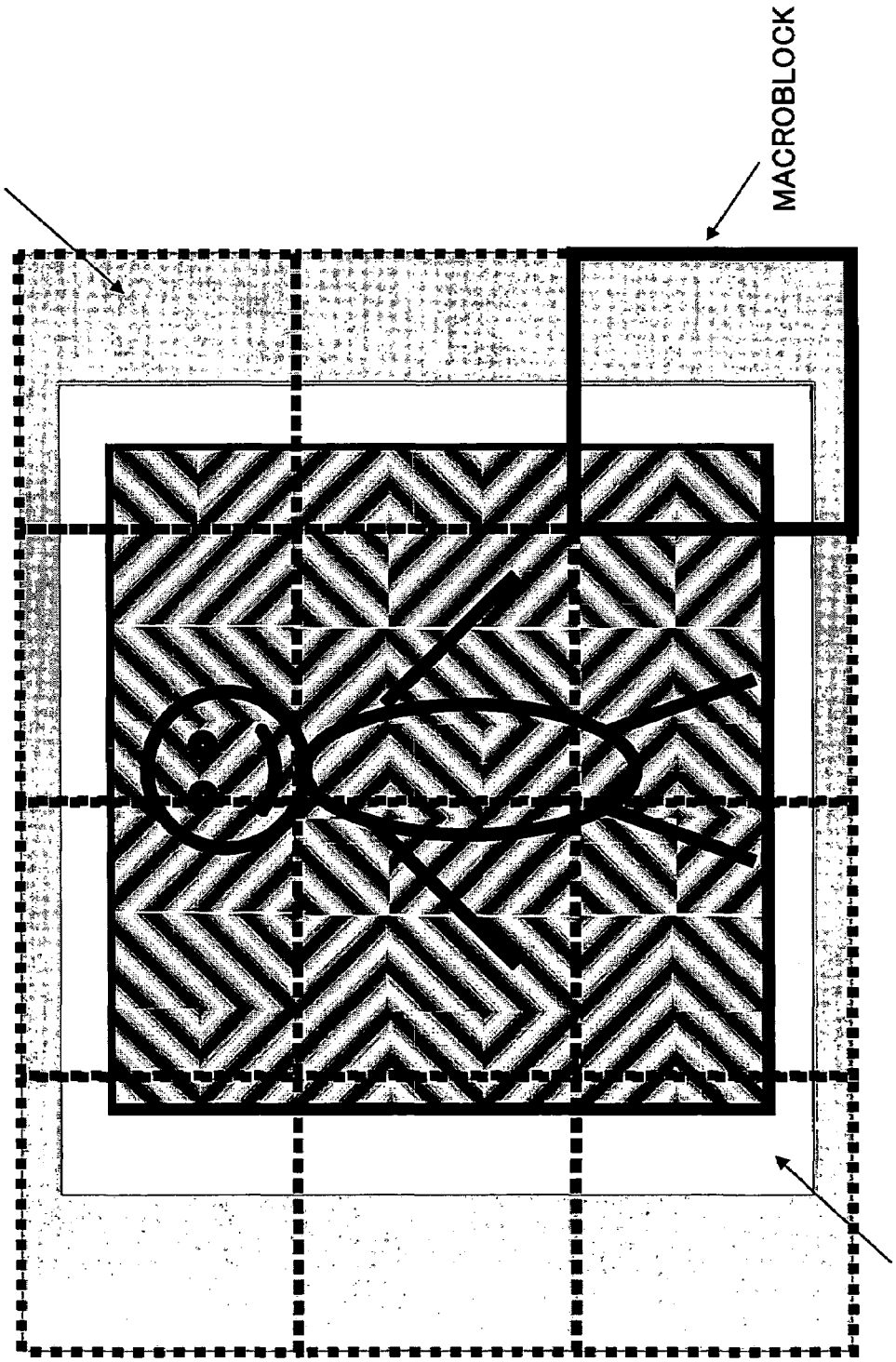
FIG. 40 is a diagram for explaining processes of the added macroblock generation unit 42.
Figure 41:
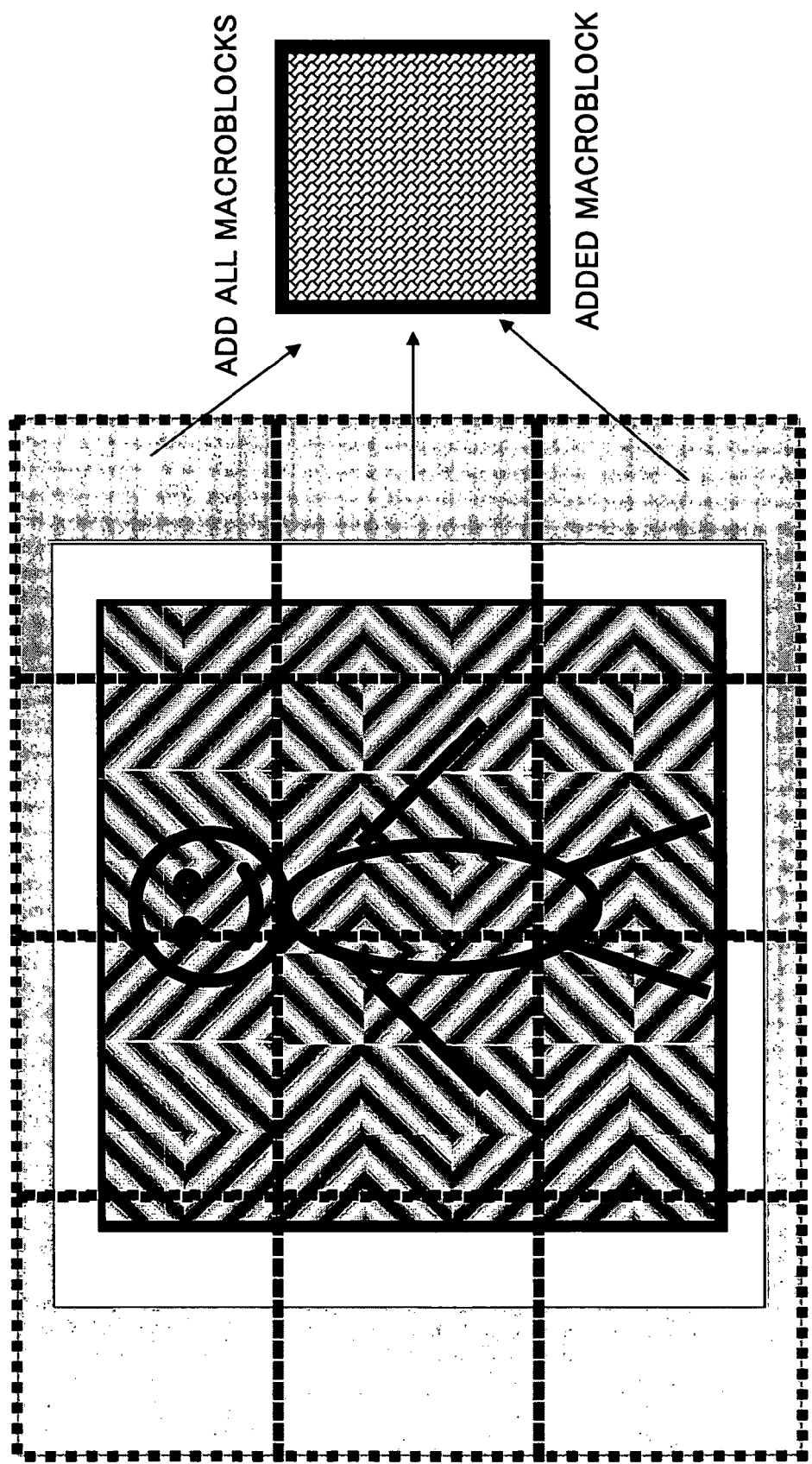
FIG. 41 is a diagram for explaining processes of the added macroblock generation unit 42.

The added macroblock generation unit 42 receives the linear transformation distortion corrected detection object image output from the linear transformation distortion correction unit 41 (step 111). First, as shown in FIG. 40, the added macroblock generation unit 42 divides the linear transformation distortion corrected detection object image into macroblocks each having a predetermined size (the same as the size when embedding) from an arbitrary position of the linear transformation distortion corrected detection object image to obtain a macroblock group (step 112). At this time, at an end of the image, for obtaining a macroblock from a pixel region smaller than the macroblock, the lack region is filled with the pixel value 0 or the region is filled with the average pixel value of the partial region of the detection object image, for example.

Next, the macroblock adding unit 60 adds all macroblocks in the macroblock group to generate and output the added macroblock (step 113).

Figure 42:
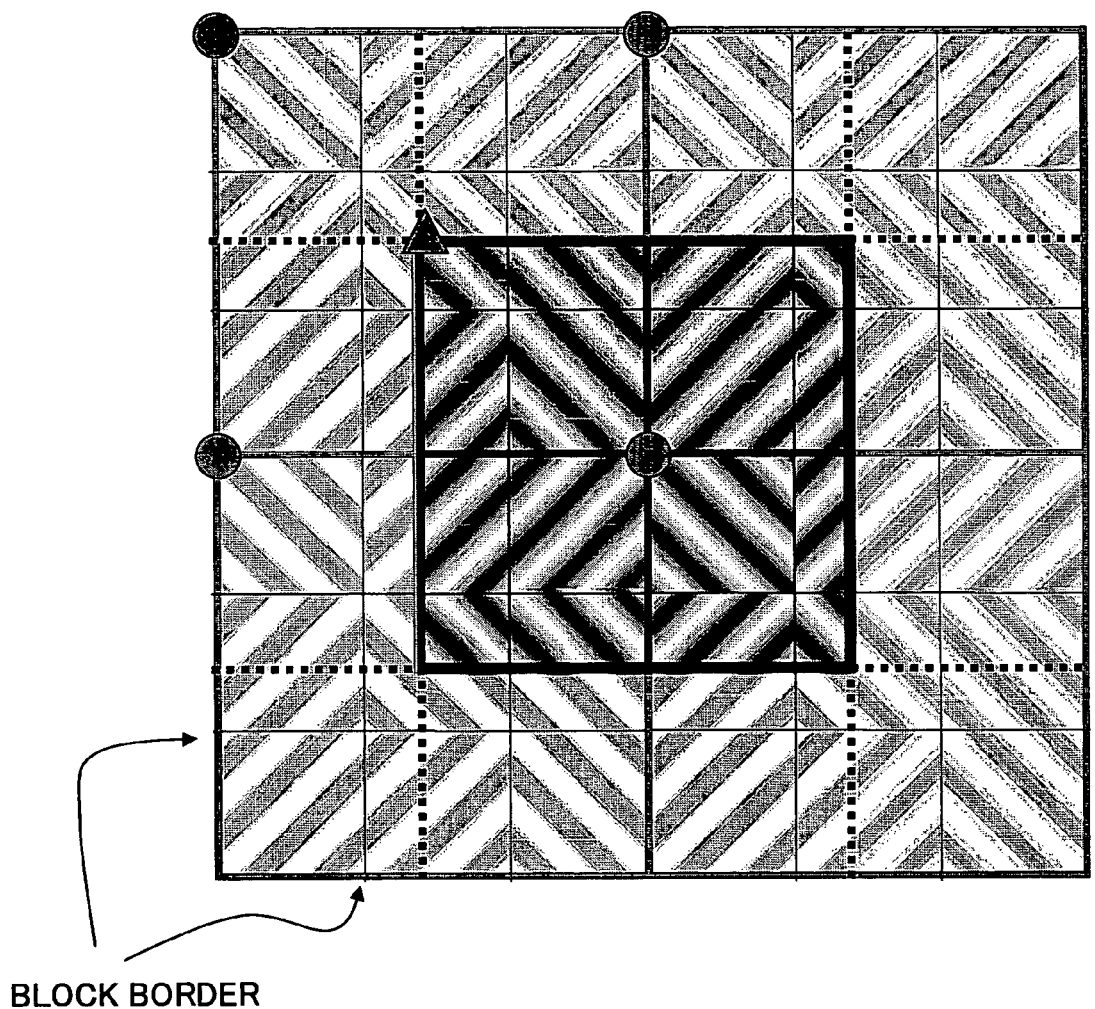
FIG. 42 is a diagram for explaining the added macroblock.

Compared with the digital watermark embedded image just after embedding, the linear transformation distortion corrected detection object image obtained by correcting the linear transformation distortion has the same scale and the same direction (regarding uncertainty of 90° by 90° rotation angle and mirror image transformation as the same), and translation is performed. Therefore, each macroblock in the macroblock group obtained by dividing the image by a size the same as the macroblock pattern tiled in the digital watermark embedding image right after embedding is a pixel region that includes macroblock patterns translated by the same amount. Therefore, on the added macroblock that is total sum of the macroblocks, position shifted macroblock patterns are accumulated to be strengthened by the added number of times of the macroblock patterns as shown in FIG. 42. In the added macroblock, the macroblock patterns at the time of embedding are included in which cyclic shift is applied to each of the macroblock patterns. Therefore, if a head position of the macroblock pattern at the time of embedding is found by coping with translation in the added macroblock, it becomes possible to detect embedded watermark information. From such a viewpoint, processes described in the following are performed. By the way, the added macroblock generation unit 42 is not indispensable. That is, a block having a size the same as the macroblock cut out as shown in FIG. 42 may be used as an input of processes after that. However, in the following description, it is assumed that the added macroblock generation unit 42 is used.

Figure 43:
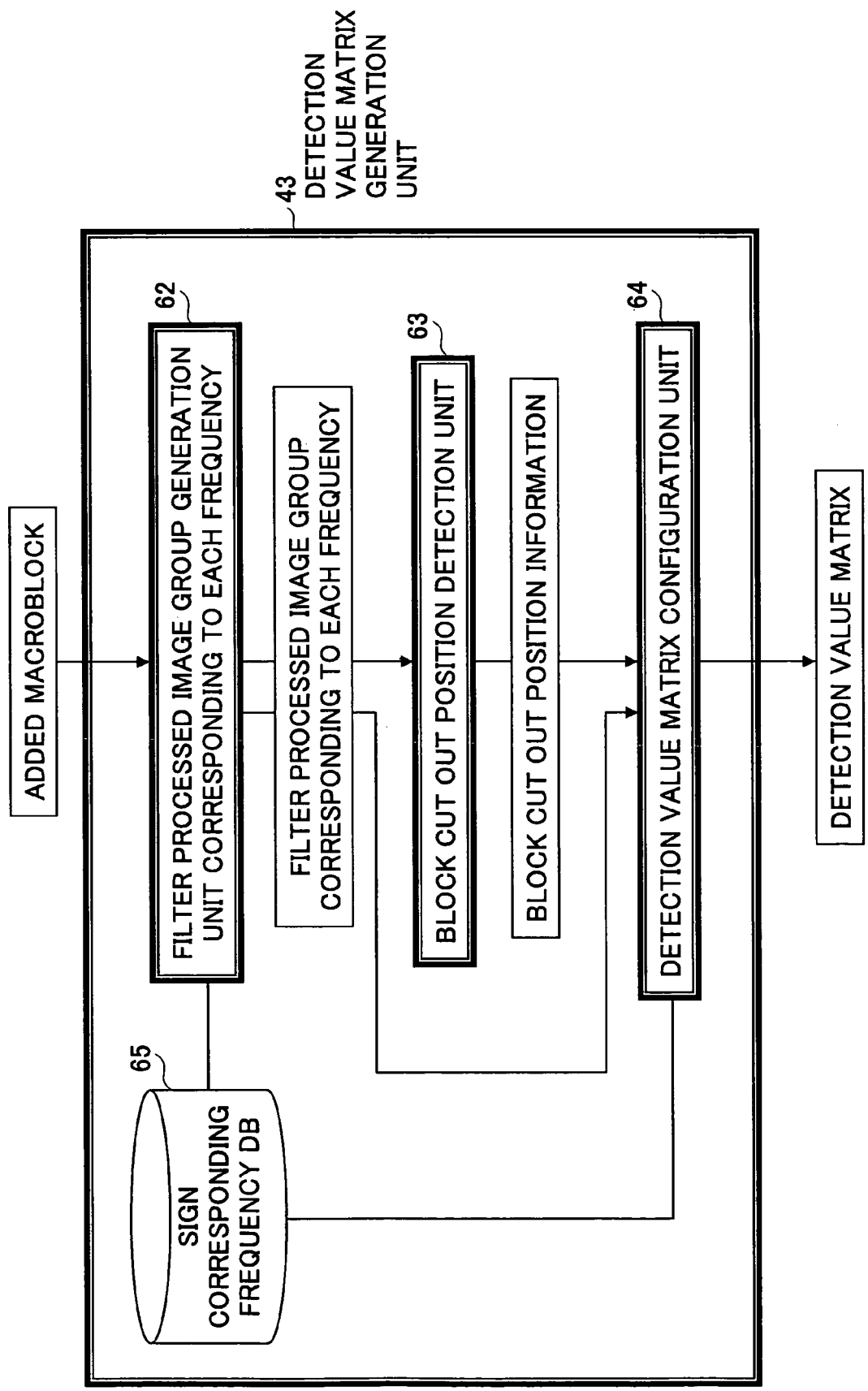
FIG. 43 is a block diagram of a detection value matrix generation unit 43.
Figure 44:
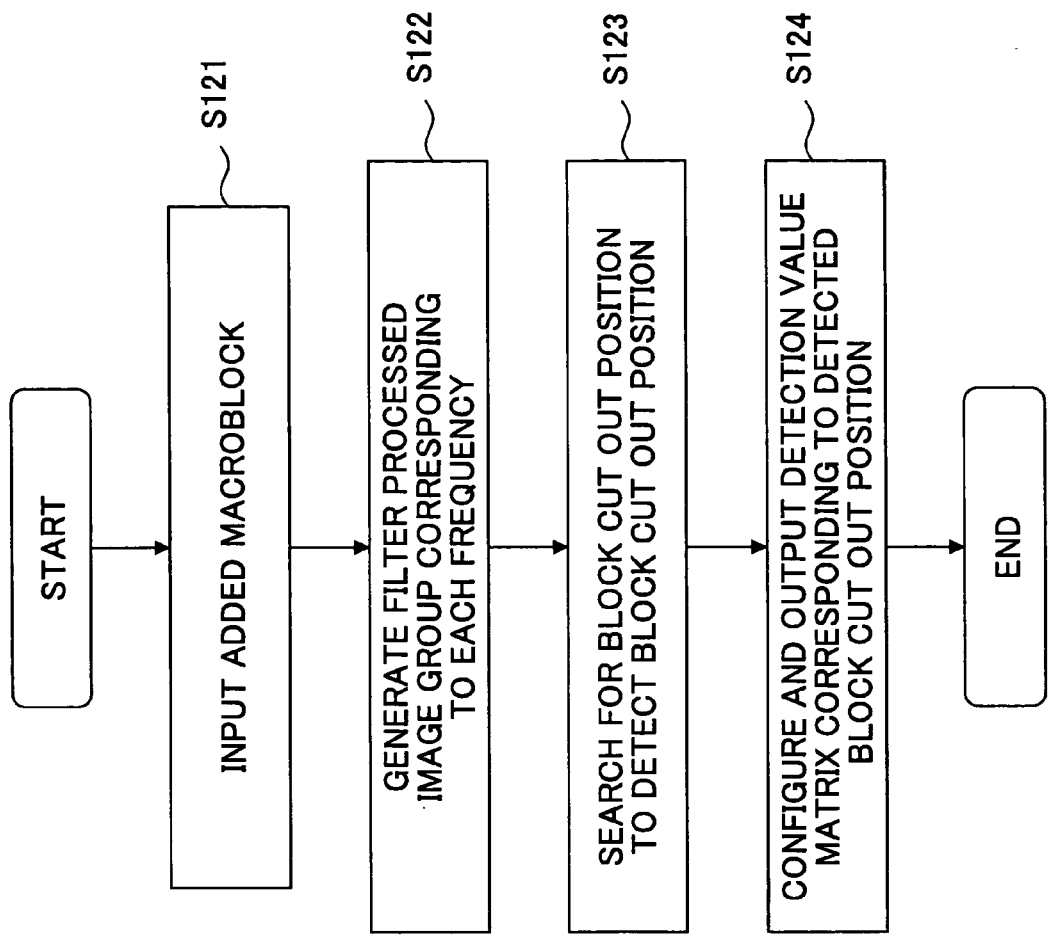
FIG. 44 is a diagram showing a process flow of the detection value matrix generation unit 43.

Next, the detection value matrix generation unit 43 in the digital watermark detection apparatus 40 in the present embodiment is described. FIG. 43 shows a configuration of the detection value matrix generation unit 43 and FIG. 44 shows a process flow. As shown in FIG. 43, the detection value matrix generation unit 43 includes a filter processed image group generation unit 62 corresponding to each frequency, a block cut out position detection unit 64, a detection value matrix configuration unit 64, and a sign corresponding frequency database 65. In the following, the process flow of the detection value matrix generation unit 43 is described with reference to FIG. 44.

The detection value matrix generation unit 43 receives the added macroblock generated by the added macroblock generation unit 42 (step 121). Then, the filter processed image group generation unit 62 corresponding to each frequency performs convolution calculation on the added macroblock using each convolution operator corresponding to each frequency registered in the sign corresponding frequency database 65 (or quantized value corresponding frequency database, database the same as one used for embedding is used. It is assumed that 2 kinds of frequencies are included.) so as to generate filter processed images the number of which is the same as the number (2) of the kinds of the frequencies, and output the images as the filter processed image group corresponding to each frequency (step 122).

Then, the block cut out position detection unit 63 searches for the block cut out position and detects the block cut out position (step 123). Finally, the detection value matrix configuration unit 64 configures a detection value matrix corresponding to the detected block cut out position and outputs it (step 124). In the following, processes of each unit are described in more detail.

Figure 45:
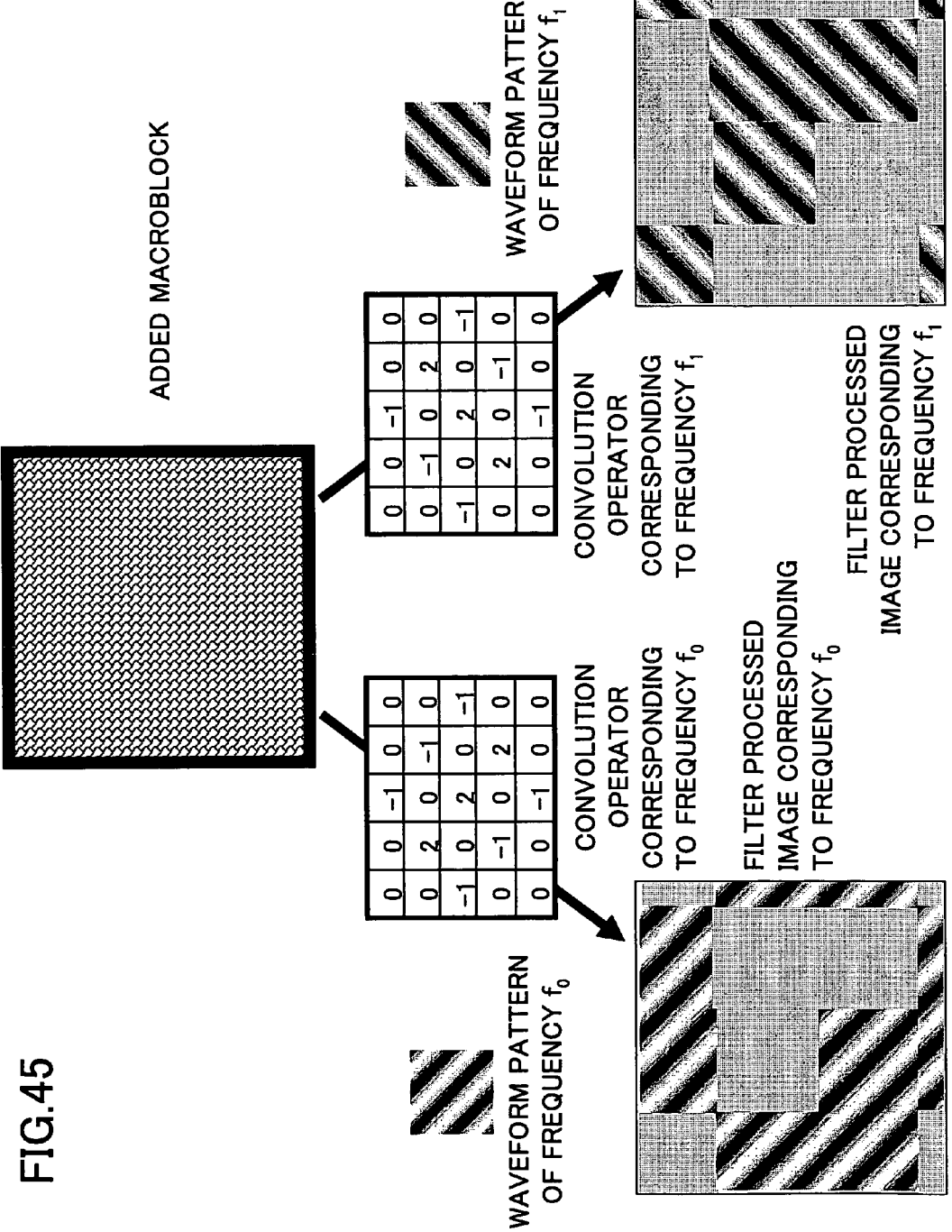
FIG. 45 is a diagram showing outline of processes of a filter processed image group generation unit corresponding to each frequency.

FIG. 45 shows outline of the process of the filter processed image group generation unit 62 corresponding to each frequency. In the example shown in FIG. 45, the predetermined frequencies are two kinds: f0 and f1, so that two filter processed images are generated. The filter processed image group generation unit 62 performs convolution calculation for each pixel of the added macroblock while scanning pixels sequentially using each convolution operator corresponding to each frequency so as to generate two filter processed images corresponding to two frequencies. At this time, as shown in FIG. 45, in a block region of the filter processed image in which frequency corresponding to the convolution operator is the same as the frequency pattern at the time of embedding, a value with a large absolute value appears. In a block region in which frequency corresponding to the convolution operator is not the same as the frequency pattern at the time of embedding, a value with a small absolute value appears (in FIG. 45, bright region indicates a plus value with a large absolute value, and dark region indicates a minus value with a large absolute value). Since the convolution calculation is regarded as partially performing correlation calculation, this is apparent considering the fact that a correlation value having a large absolute value is obtained when the patterns are the same, and that a correlation value having a small absolute value is obtained when the patterns are not the same. These two filter processed images are output as the filter processed image group corresponding to each frequency. When any pixel value cannot be referred to at an end point of the added macroblock, for example, at the time of convolution calculation, a pixel value obtained by folding the image back to opposite side like cyclic shift is referred to.

Figure 46:
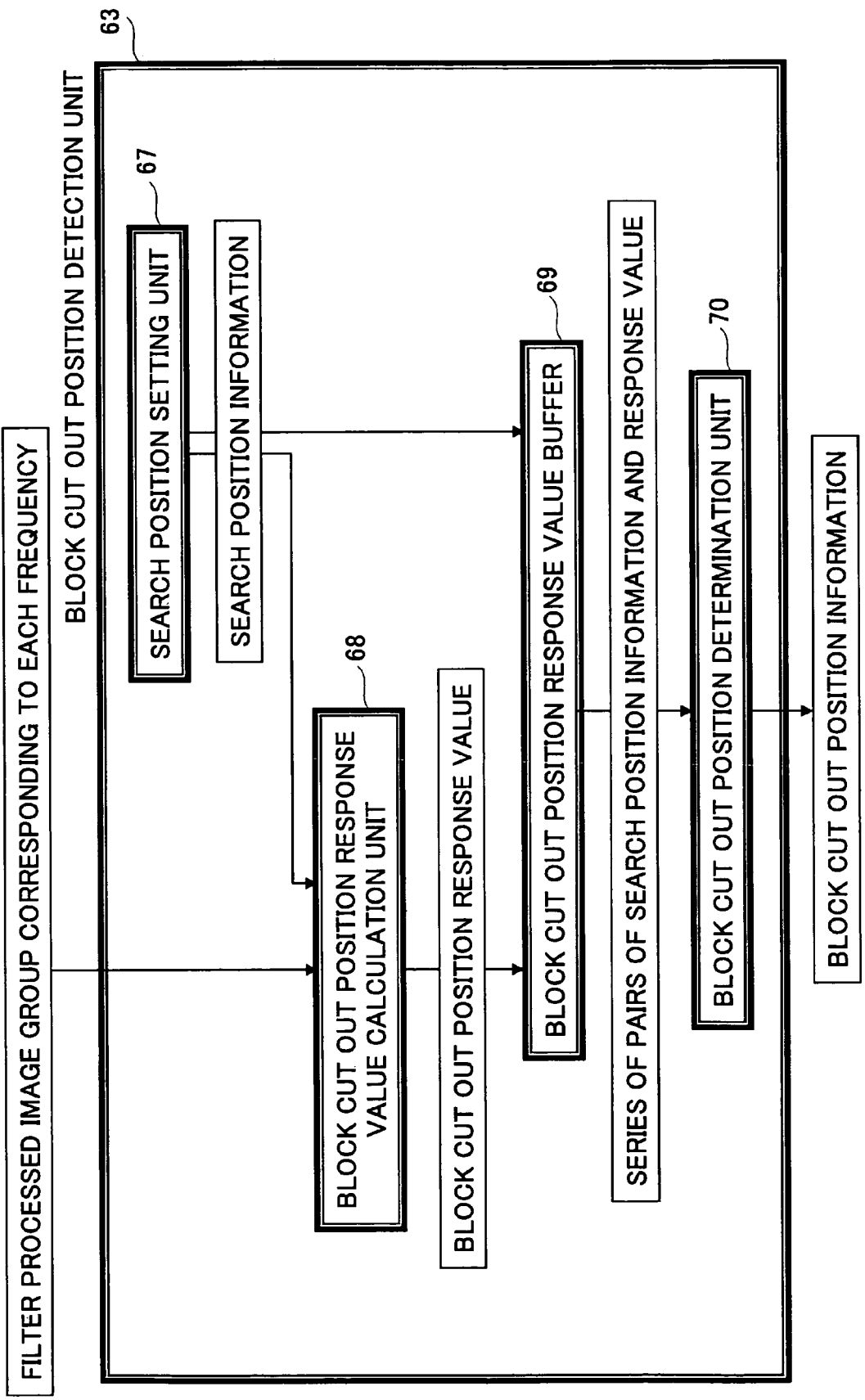
FIG. 46 is a block diagram of a block cut out position detection unit 63.
Figure 47:
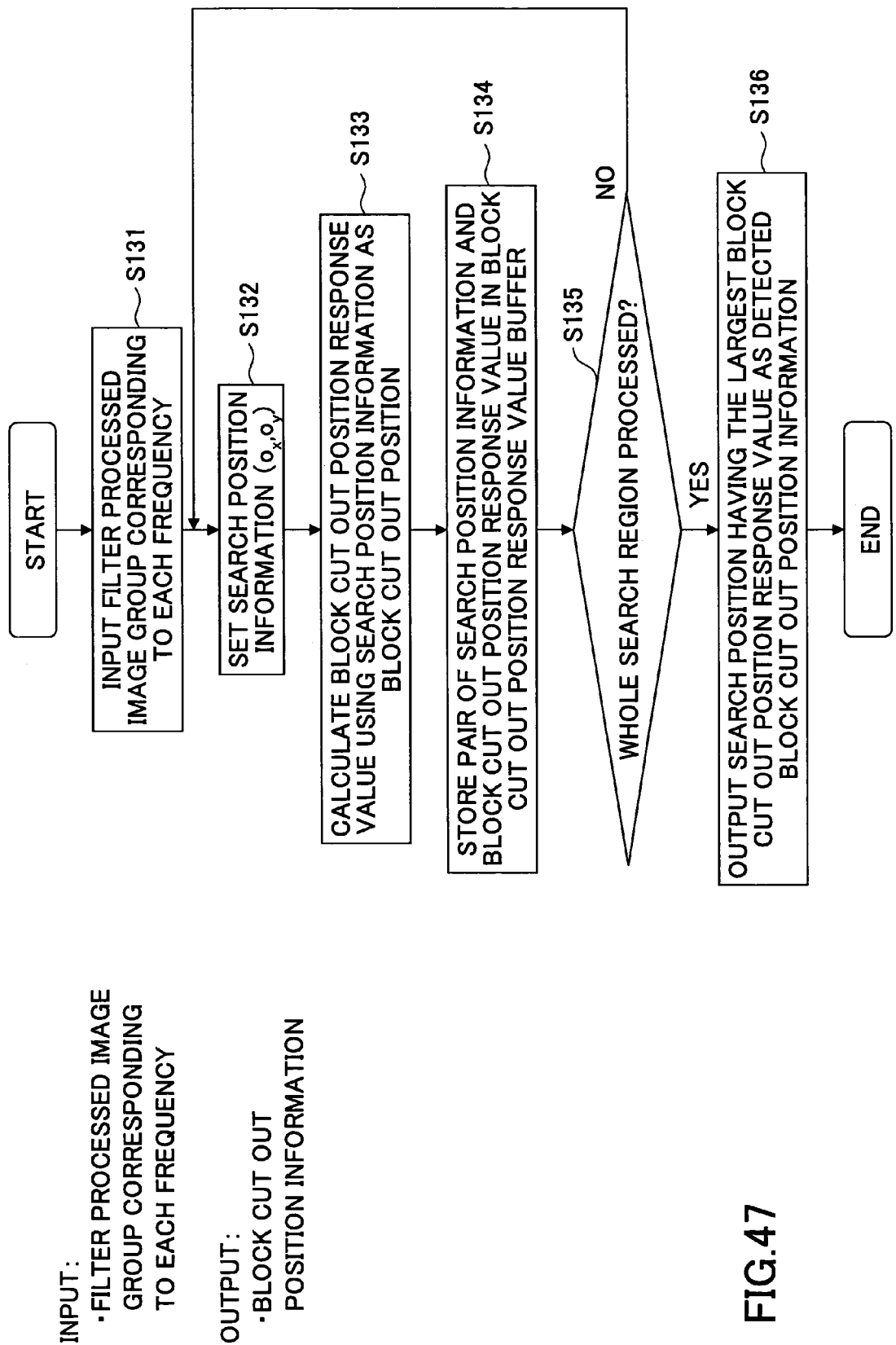
FIG. 47 is a diagram showing a process flow of a block cut out position detection unit 63.

FIG. 46 shows a configuration of the block cut out position detection unit 63, and FIG. 47 shows a process flow. As shown in FIG. 46, the block cut out position detection unit 63 includes a search position setting unit 67, a block cut out position response value calculation unit 68, a block cut out position response value buffer 69 and a block cut out position determining unit 70. In the following, the process flow in the cut out position detection unit 63 is described with reference to FIG. 47.

The block cut out position detection unit 63 receives the filter processed image group corresponding to each frequency (step 131). First, the search position setting unit 67 generates search position information $(o_x, o_y)$ in a predetermined search region (step 132). Next, the block cut out position response value calculation unit 68 obtains a block cut out position response value assuming that the coordinates indicated by the search position information are the block cut out position (step 133). The obtained block cut out position response value is stored in a block cut out position response value buffer with corresponding position information as a pair (step 134). This process is performed for every search position included in the predetermined search region (step 135). Finally, the block cut out position determination unit 70 outputs search position information having the largest block cut out position response value as detected block cut out position information (step 136).

Figure 48:
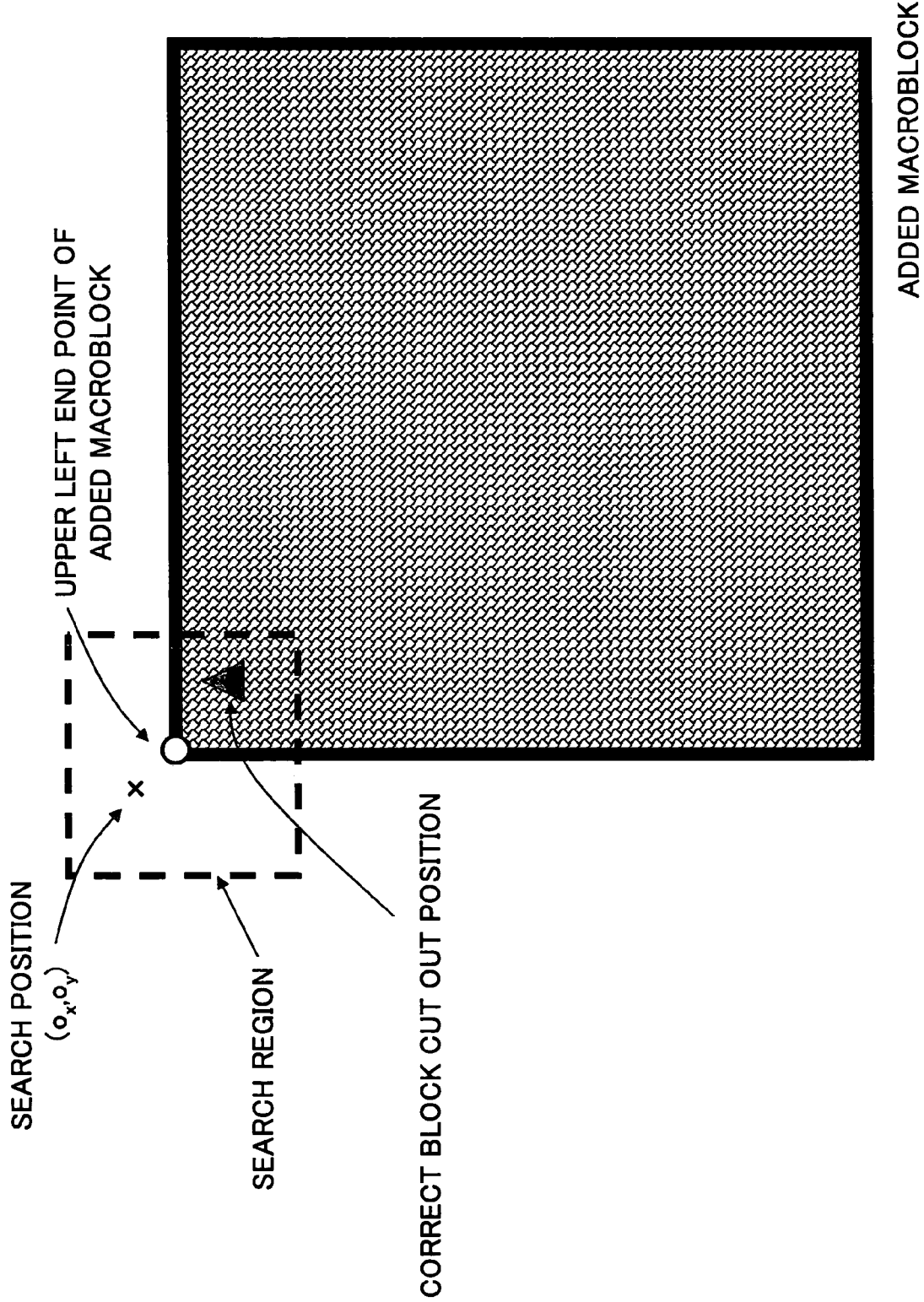
FIG. 48 is a diagram for explaining search position information.

FIG. 48 shows an example of the search position information. The search region is a neighborhood having a size in which an upper left end point of the added macroblock is the center of the neighborhood (wherein the upper left end point is also an upper left end point of each image of the filter processed image group corresponding to each frequency since the size of the image is the same as that of each of the filter processed image group corresponding to each frequency), and coordinates $(o_x, o_y)$ included in the neighborhood are sequentially selected as search position information. For example, the search range is a block size rectangle region centered on an upper left point of the added macroblock. Even when the block cut out position of the added macroblock at the time of input is shifted to some extent from the upper left point of the added macroblock, if a correct block cut out position exists in the neighborhood, the correct block cut out position can be detected by using a response value calculation method in which the block cut out position response value becomes a value larger than any other search positions when the search position agrees with the correct block cut out position. In addition, by using the above-mentioned search range, the correct block cut out position is always included as a point in the search range, so that the correct block cut out position can be detected by searching with reliability. From this viewpoint, following processes are performed.

Figure 49:
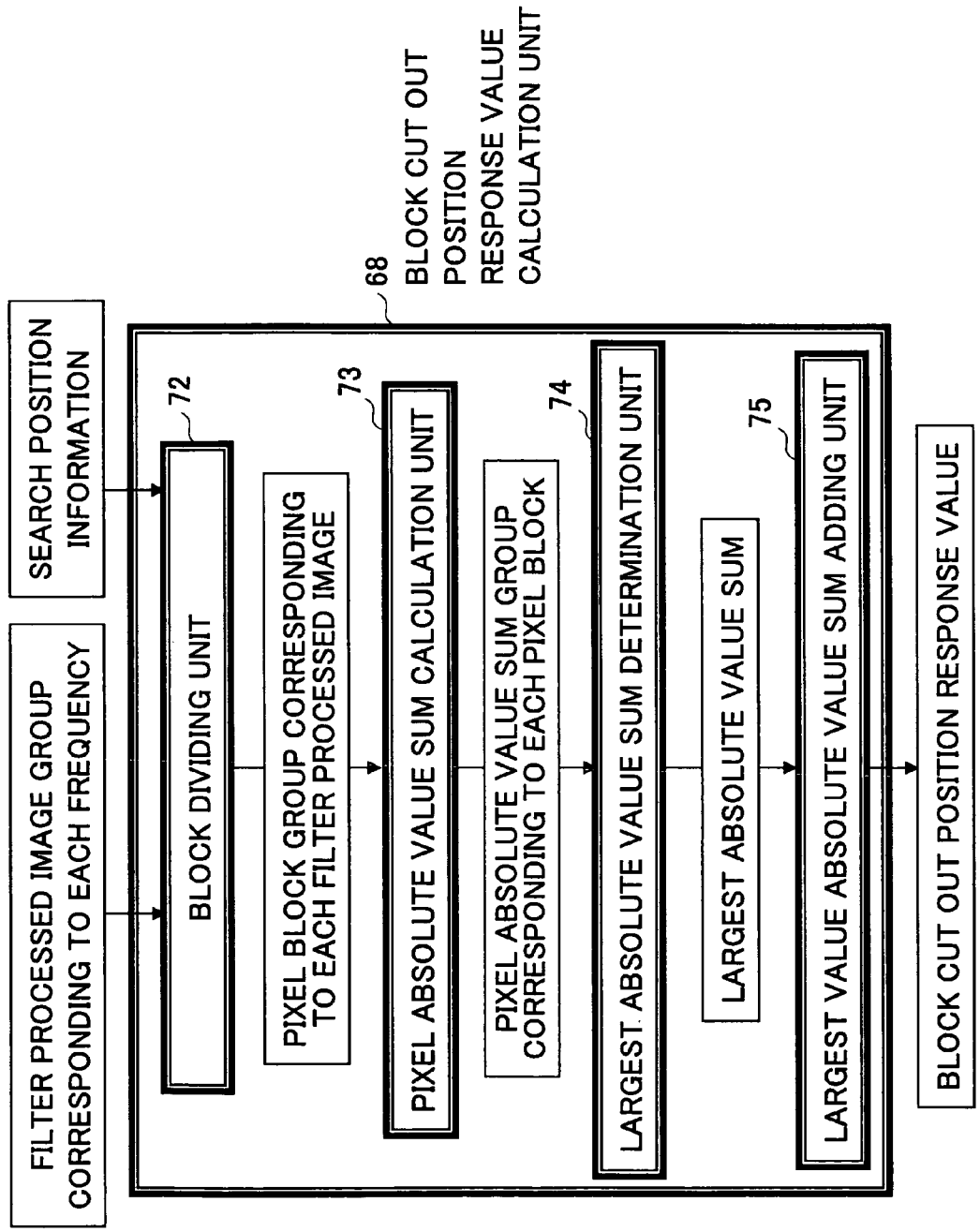
FIG. 49 is a block diagram of a block cut out position response value calculation unit 68.
Figure 50:
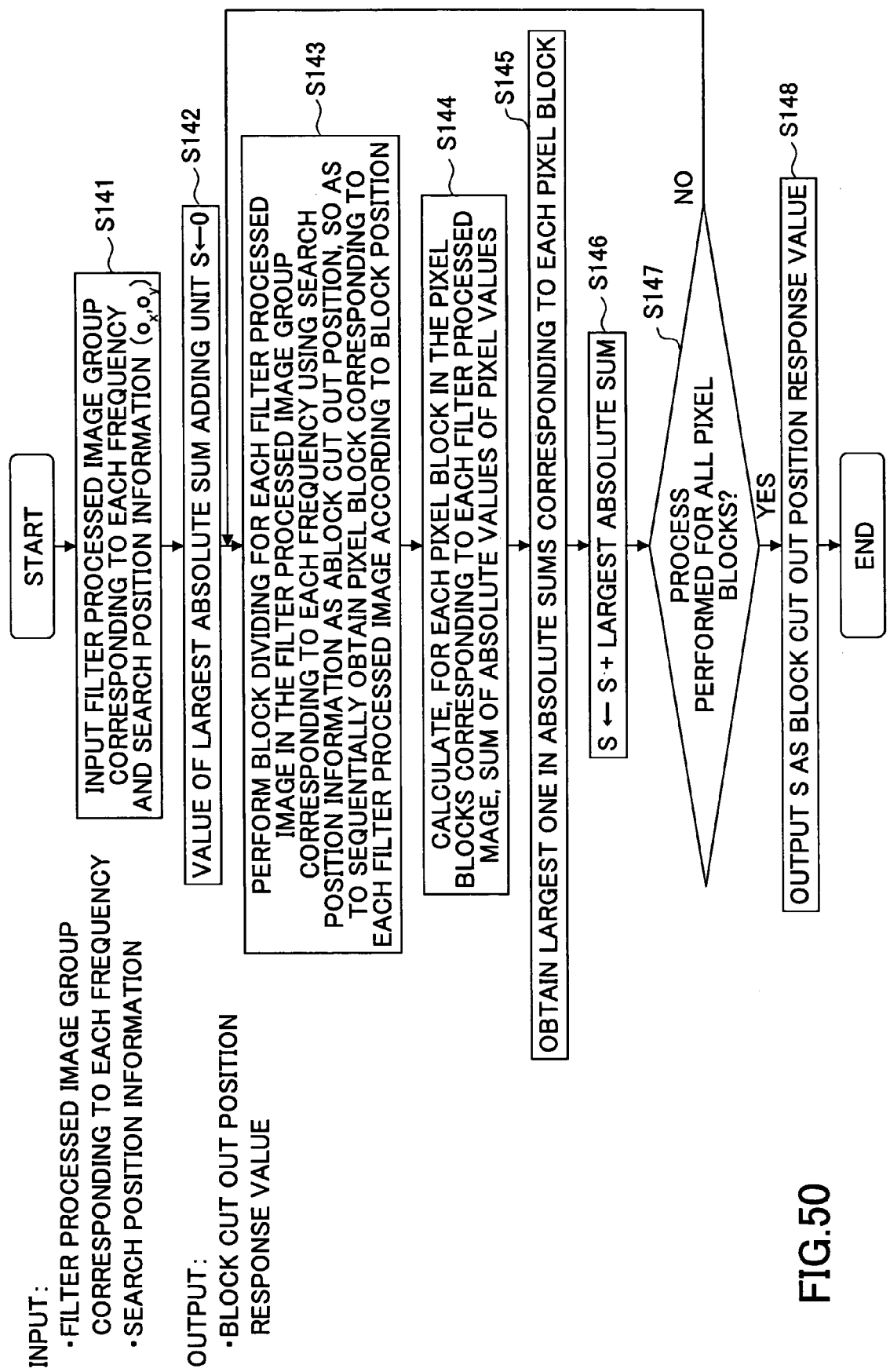
FIG. 50 is a diagram for explaining a process flow of the block cut out position response value calculation unit 68.

FIG. 49 shows a configuration of the block cut out position response value calculation unit 68, and FIG. 50 shows a process flow. As shown in FIG. 49, the block cut out position response value calculation unit 68 includes a block dividing unit 72, a pixel absolute value sum calculation unit 73, a largest value absolute value sum determination unit 74 and a largest value absolute value sum adding unit 75. The process flow of is described with reference to FIG. 50.

The block cut out position response value calculation unit 68 receives the filter processed image group corresponding to each frequency and search position information (step 141). In addition, the value of the largest value absolute value sum adding unit 73 is initialized to 0 (step 142).

The block dividing unit 72 performs block dividing for each filter processed image in the filter processed image group corresponding to each frequency using the coordinates indicated by the search position information as a block cut out position, so as to sequentially obtain pixel blocks of each filter processed image locating at the same block position (step 143).

Next, the pixel absolute value sum calculation unit 73 calculates, for each pixel block in the pixel blocks locating at the same block position and corresponding to each filter processed image, a sum of absolute values of pixel values in the pixel block to obtain a pixel absolute value sum group corresponding to each pixel block (step 144). Next, the largest value absolute value sum determination unit 74 selects one having a largest value from the pixel absolute value sum group corresponding to each pixel block so as to obtain the value as a largest absolute value sum (step 145). Finally, the largest value absolute value sum adding unit 75 adds the largest absolute value sum to S that has 0 as an initial value (step 146). Processes from the pixel absolute value sum calculation unit 73 to the largest absolute value sum adding unit 75 are repeatedly performed for each pixel block group corresponding to each filter processed image obtained in the block dividing. Then, S that is obtained by the above-mentioned processes is output as a block cut out position response value (step 147, step 148).

Next, processes in each unit in the block cut out position response value calculation unit 68 are described in more detail.

Figure 51:
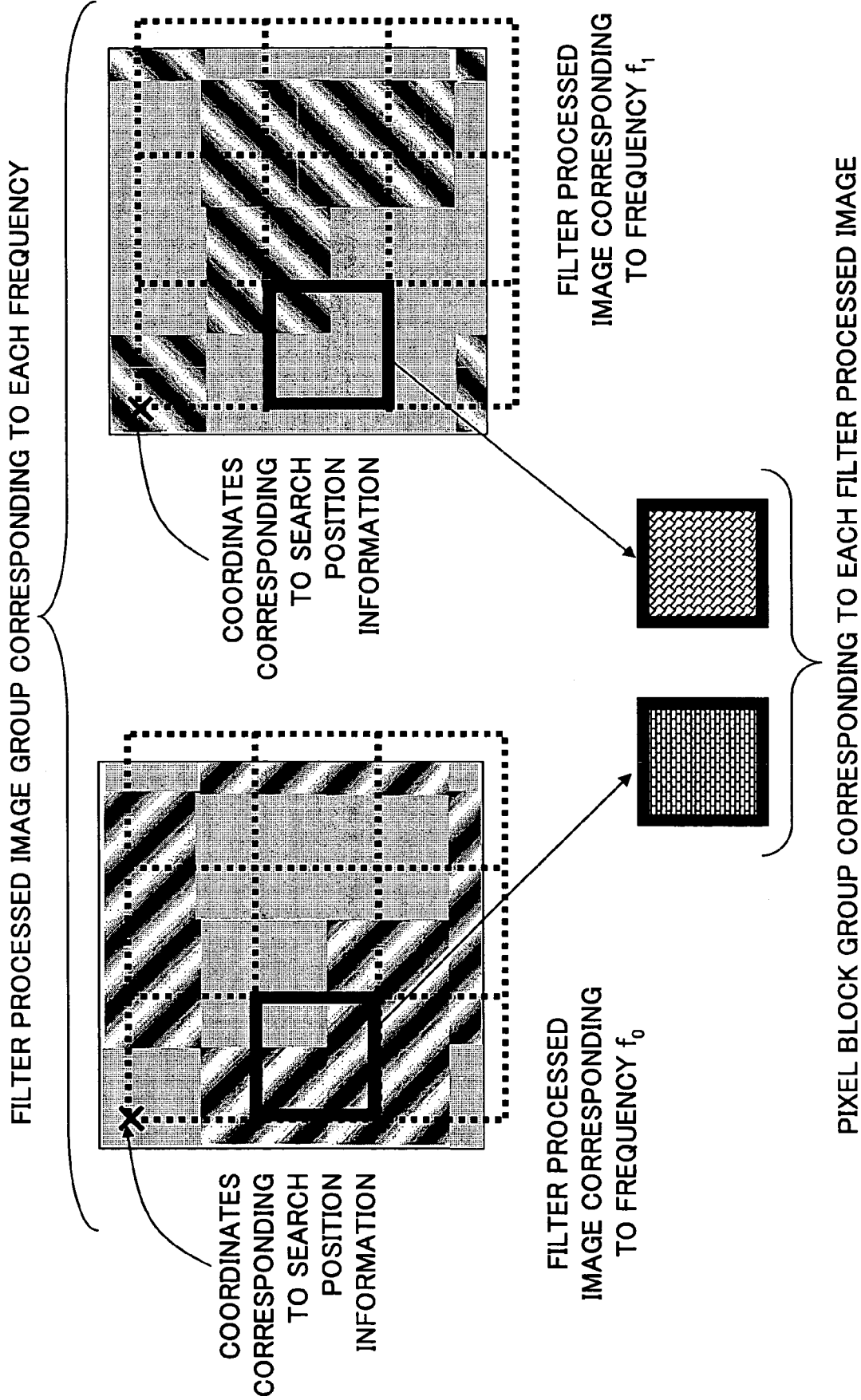
FIG. 51 is a diagram for explaining processes of a block dividing unit 72.

First, the block dividing unit 72 is described. FIG. 51 is a diagram for explaining the process of the block dividing unit 72.

Figure 52:
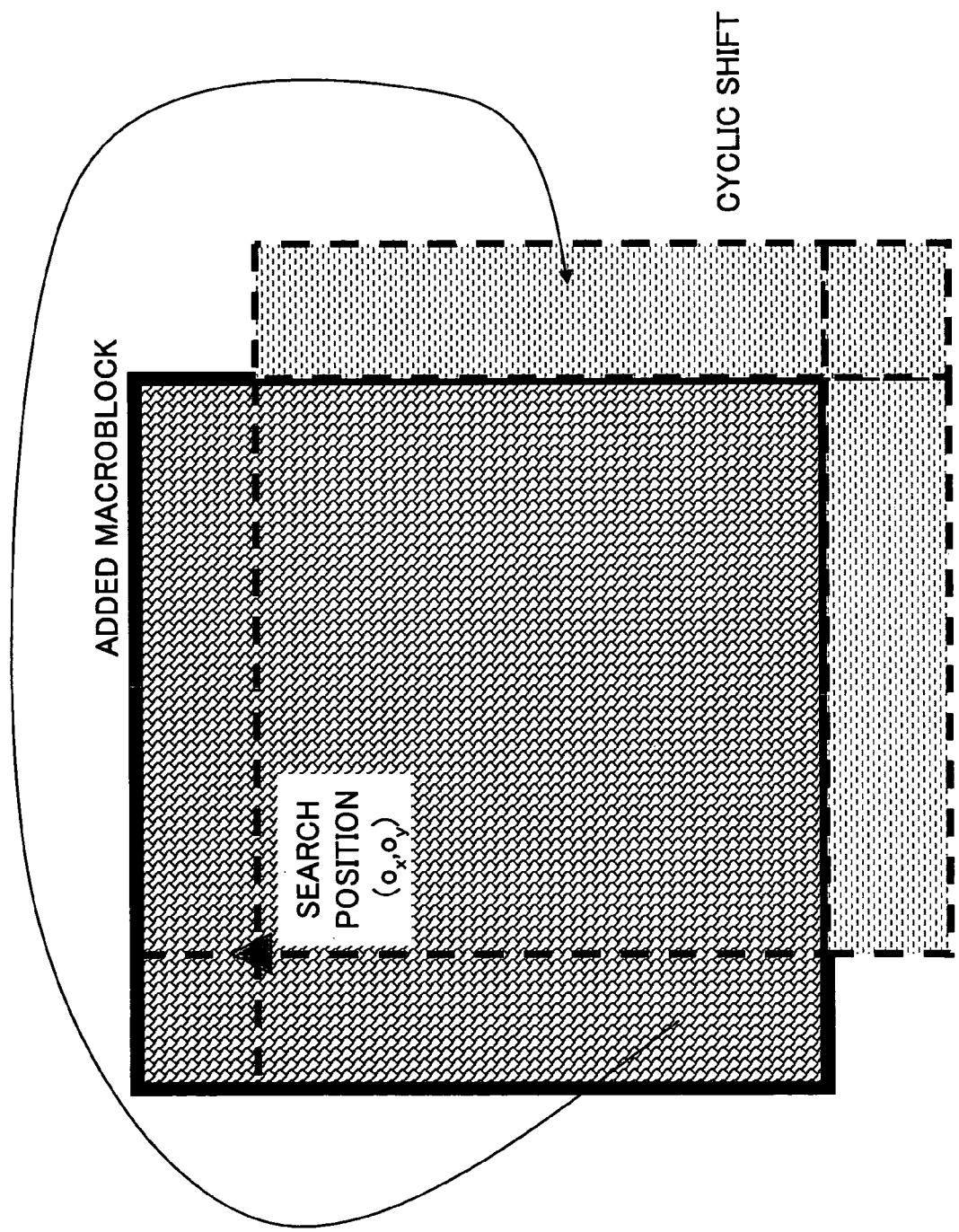
FIG. 52 is a diagram for explaining processes of the block dividing unit 72.

The block dividing unit 72 receives the filter processed image group corresponding to each frequency and search position information, and performs block dividing for each filter processed image in the filter processed image group corresponding to each frequency using the coordinates indicated by the search position information as a block cut out position, so as to sequentially output pixel blocks located at the same block position and corresponding to each filter processed image. The size of each pixel block is a size of a block obtained by dividing each filter processed image (having the same size) by a predetermined number of blocks. In a case where a pixel outside of the image size should be referred to when performing block dividing based on the coordinates indicated by the search position information, a pixel value obtained by folding the image back to opposite side of the added macroblock is referred to as shown in FIG. 52, namely, the pixel value is obtained by so called cyclic shift.

FIG. 53 is a diagram for explaining the operation of the pixel absolute value sum calculation unit 73. The pixel absolute value sum calculation unit 73 receives the pixel block group corresponding to each filter processed image, calculates total sum of absolute values of pixel values for each pixel block so as to output the results as a pixel absolute value sum group corresponding to each pixel block. This process corresponds to calculating energy of the frequency that is associated with the pixel block when generating each pixel block. When plural frequencies are associated with a sign or a quantized value at the time of embedding, sum of absolute value sums (energy) corresponding to the plural frequencies is regarded as an absolute value sum corresponding to the plural frequencies. In this specification and the claims, meaning of the term "absolute value sum" includes "added value of the plural absolute value sums corresponding to plural frequencies" as mentioned above unless otherwise specified.

Figure 54:
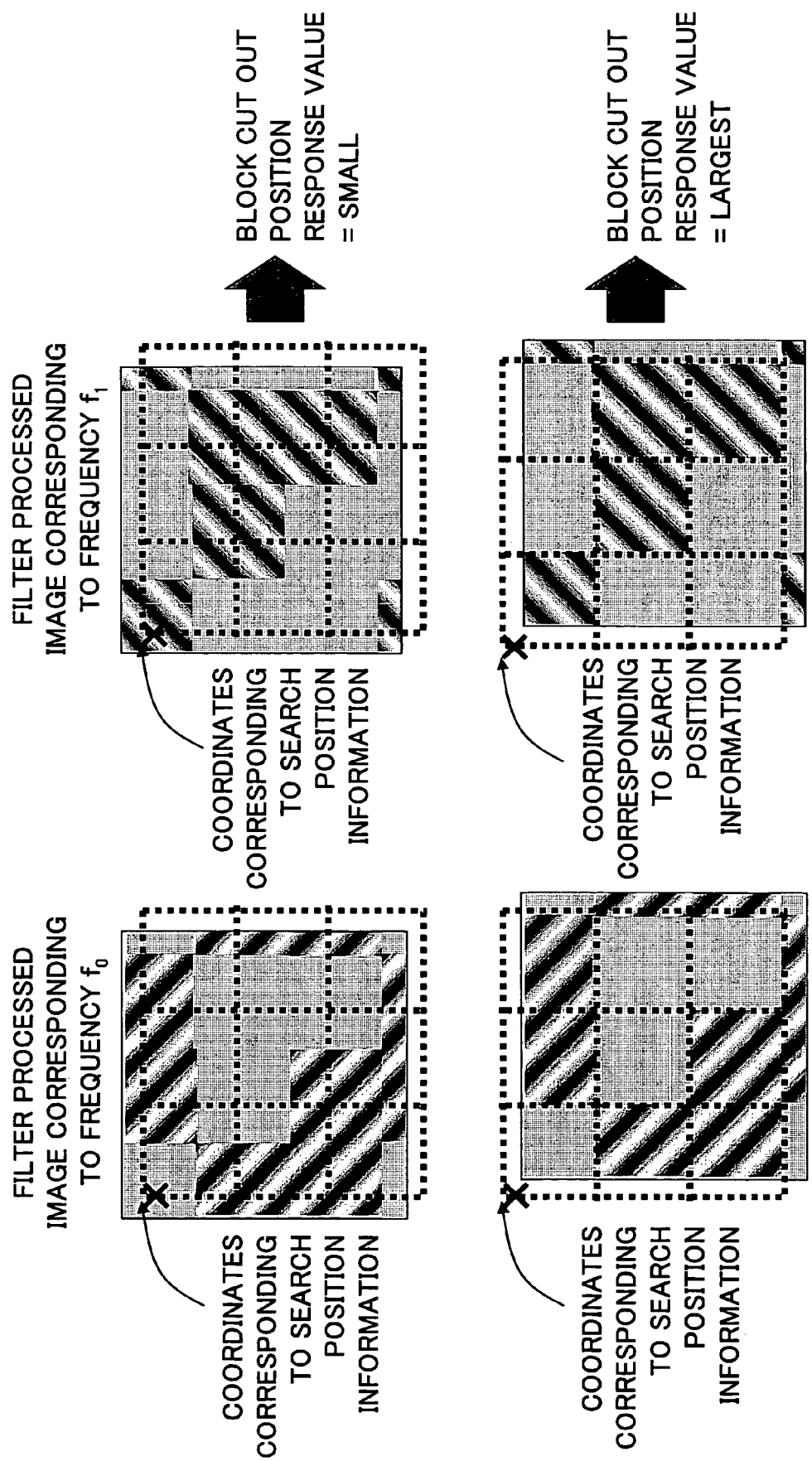
FIG. 54 is a diagram for explaining operations of the block cut out position response value calculation unit 68.

Next, the reason why the block cut out position response value calculation unit 68 outputs the large value when the coordinates indicated by the search position information is a correct block cut out position is described. When performing block cut out as shown in the upper figure in FIG. 54, if the search position information indicates a position that is shifted from a correct block dividing position, each pixel block obtained by cutting out the image is shifted from block dividing positions at the time of digital watermark embedding. Thus, the cut out pixel block includes a pixel region other than the frequency pattern superimposed at the time of embedding. Therefore, the energy of the superimposed frequency becomes smaller than that in a case where the block is correctly cut out as shown in the figure below. That is, when the coordinates indicated by the search position information indicate a correct block cut out position, the block cut out position response value becomes the largest value.

Figure 55:
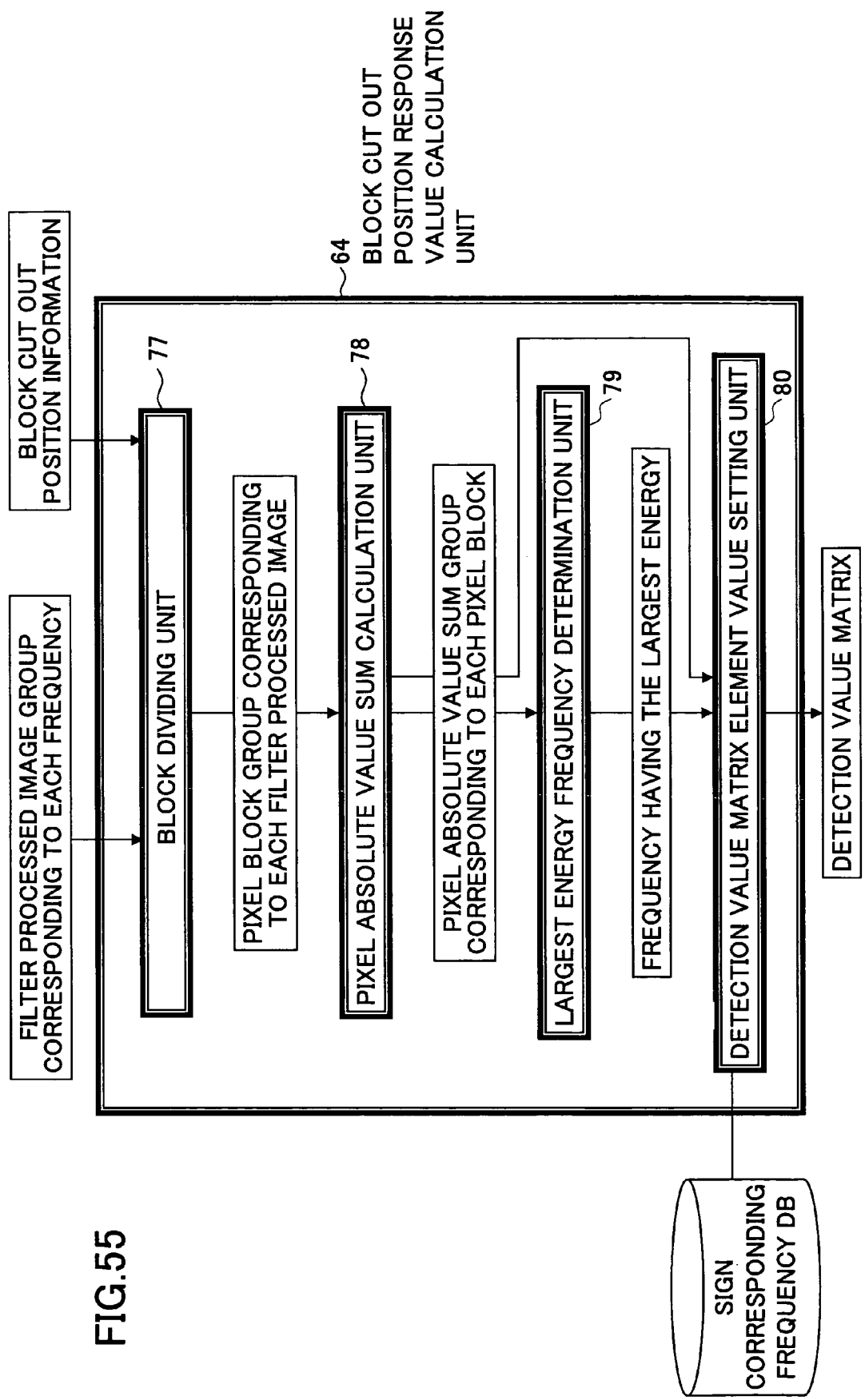
FIG. 55 is a block diagram of a detection value matrix configuration unit 64.
Figure 56:
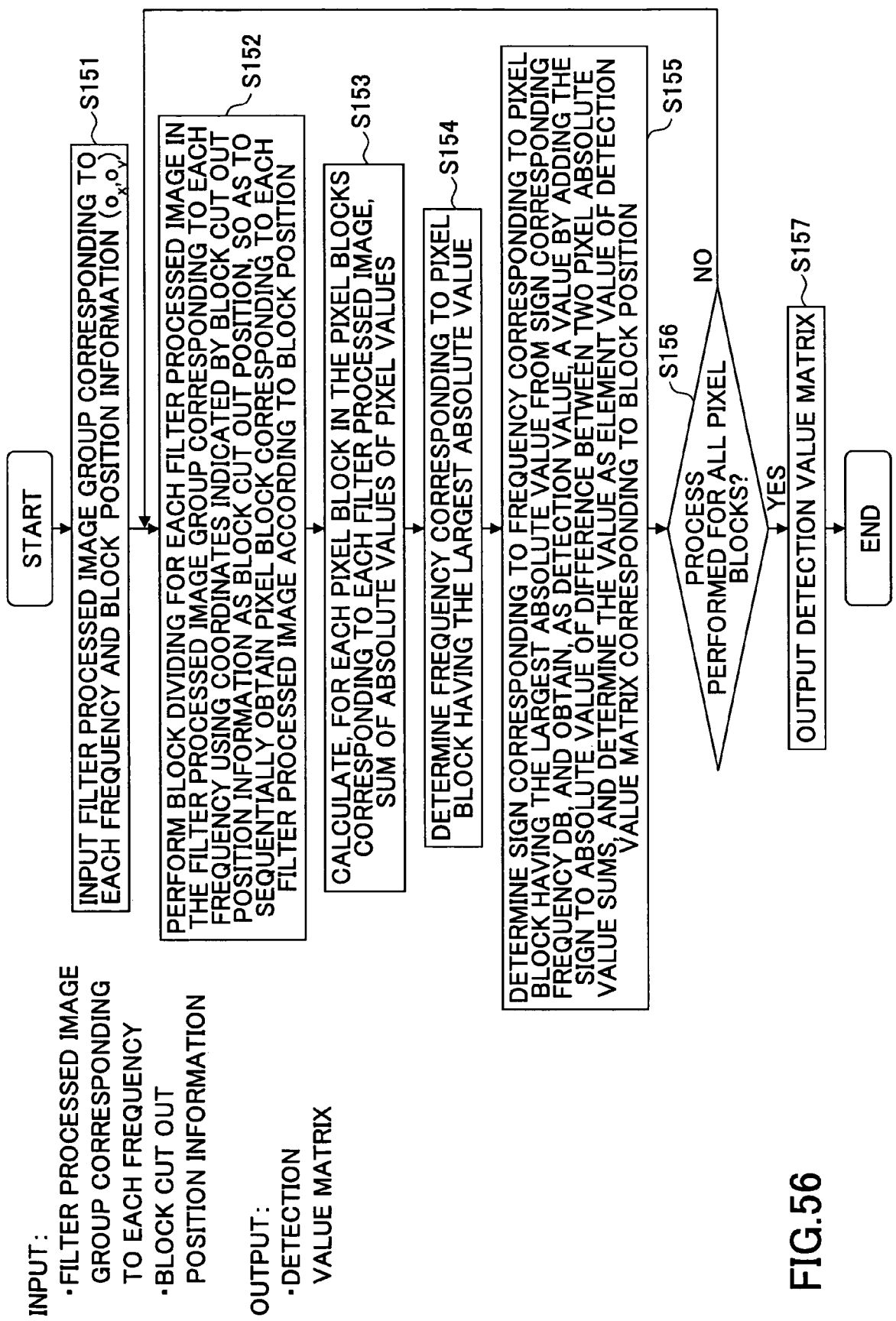
FIG. 56 is a diagram showing a process flow of the detection value matrix configuration unit 64.

Next, the detection value matrix configuration unit 64 in the detection value matrix generation unit 43 of the digital watermark detection apparatus 40 is described. FIG. 55 shows a configuration of the detection value matrix configuration unit 64 and FIG. 56 shows a process flow. As shown in FIG. 55, the detection value matrix configuration unit 64 includes a block dividing unit 77, a pixel absolute value sum calculation unit 78, a largest energy frequency determination unit 79, and a detection value matrix element value setting unit 80. The process flow of the detection value matrix configuration unit 64 is described with reference to FIG. 56.

The detection value matrix configuration unit 64 receives the filter processed image group corresponding to each frequency and the block cut out position information (step 151). The block dividing unit 77 performs block dividing for each filter processed image in the filter processed image group corresponding to each frequency using the coordinates indicated by the block cut out position information, so as to sequentially obtain pixel blocks locating at the same block position and corresponding to each filter processed image (step 152).

Next, the pixel absolute value sum calculation unit 78 receives the pixel block group corresponding to each filter processed image, calculates, for each pixel block in the pixel block group, a sum of absolute values of pixel values in the pixel block to output results as a pixel absolute value group corresponding to each pixel block (step 153). The processes of the block dividing unit 77 and the pixel absolute value sum calculation unit 78 in the detection value matrix configuration unit 64 are the same as the block dividing unit 72 and the pixel absolute value sum calculation unit 73 in the block cut out position response value calculation unit 68. Next, the largest energy frequency determination unit 79 determines a filter processed image associated with a frequency from which the pixel block that has the largest value in the pixel absolute value sum group is obtained (step 284) and outputs the corresponding frequency as a frequency having the largest energy (step 154).

Finally, the detection value matrix element value setting unit 80 determines a sign corresponding to the frequency having the largest energy from the sign corresponding frequency database 144, obtains an absolute value of a difference between two pixel absolute value sums (since there are two frequencies) so as to obtain a value, as a detection value, by adding the sign to the absolute value of the difference between two pixel absolute value sums and set the detection value as an element value corresponding to the block position in the detection value matrix (step 155). Alternatively, the element value may be obtained as a value obtained by subtracting a pixel absolute value sum corresponding to a frequency corresponding to– from a pixel absolute value sum corresponding to a frequency corresponding to +. In addition, after determining the sign corresponding to the frequency having the largest energy from the sign corresponding frequency database, the element value may be determined as a value by adding the sign to the largest pixel absolute value sum. In addition, the element value may be a value obtained by adding 1 to the sign. Further, when adopting the method in which embedding is performed by using the before-mentioned quantized value corresponding frequency database, the element value may be determined as a quantized value corresponding to the frequency having the largest energy.

The processes performed from the pixel absolute value sum calculation unit 78 to the detection value matrix element value setting unit 80 are repeatedly performed for every block position (step 156) and the results are output as the detection value matrix (step 157).

Figure 57:
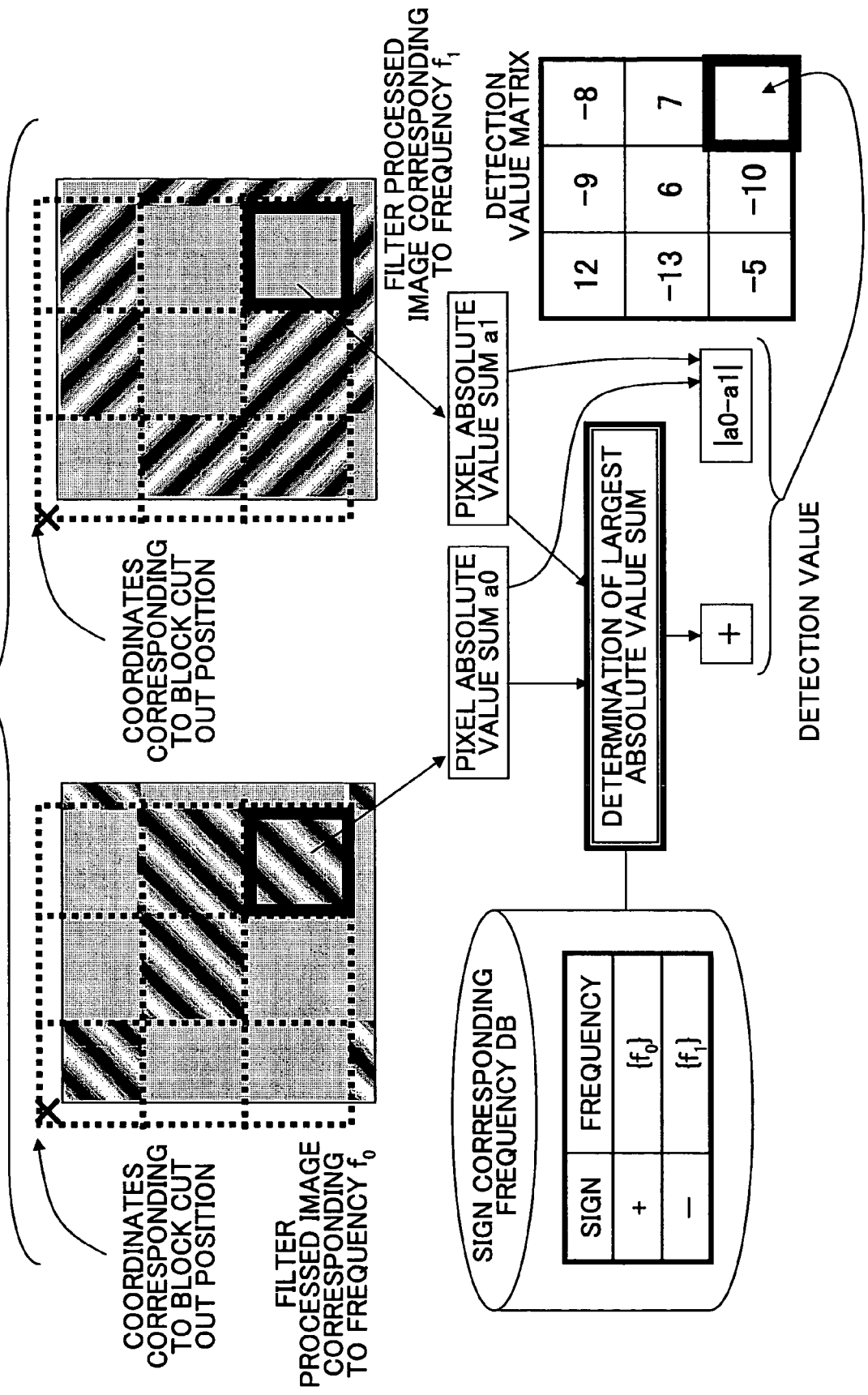
FIG. 57 is a diagram for explaining processes of the detection value matrix configuration unit 64.

The process flow of the detection value matrix configuration unit 64 is described more concretely with reference to FIG. 57. The detection value matrix configuration unit 64 divides each filter processed image in the filter processed image group corresponding to each frequency to blocks using coordinates corresponding to the block cut out position information as a block cut out position to generate a pixel block group corresponding to each filter processed image. Then, for each block position, the detection value matrix configuration unit 64 obtains an absolute value sum (a0 and a1 in FIG. 57) of pixel values for each pixel block in the pixel block group so as to determine which frequency is associated with the pixel block having the largest pixel absolute sum (a0>a1 in FIG. 57) to obtain the frequency as the largest energy frequency. Then, the detection value matrix configuration unit 64 determines a sign ("+" in FIG. 56 since a0>a1) corresponding to the largest energy frequency from the sign corresponding frequency database, and obtains an absolute value (|a0–a1| in FIG. 57) of a difference between the two pixel absolute value sum and obtains a value by adding the sign to the absolute value ("+|a0–a1|" in FIG. 57) as a detection value so as to set the detection value as an element value corresponding to a block position in the detection value matrix.

Figure 58:
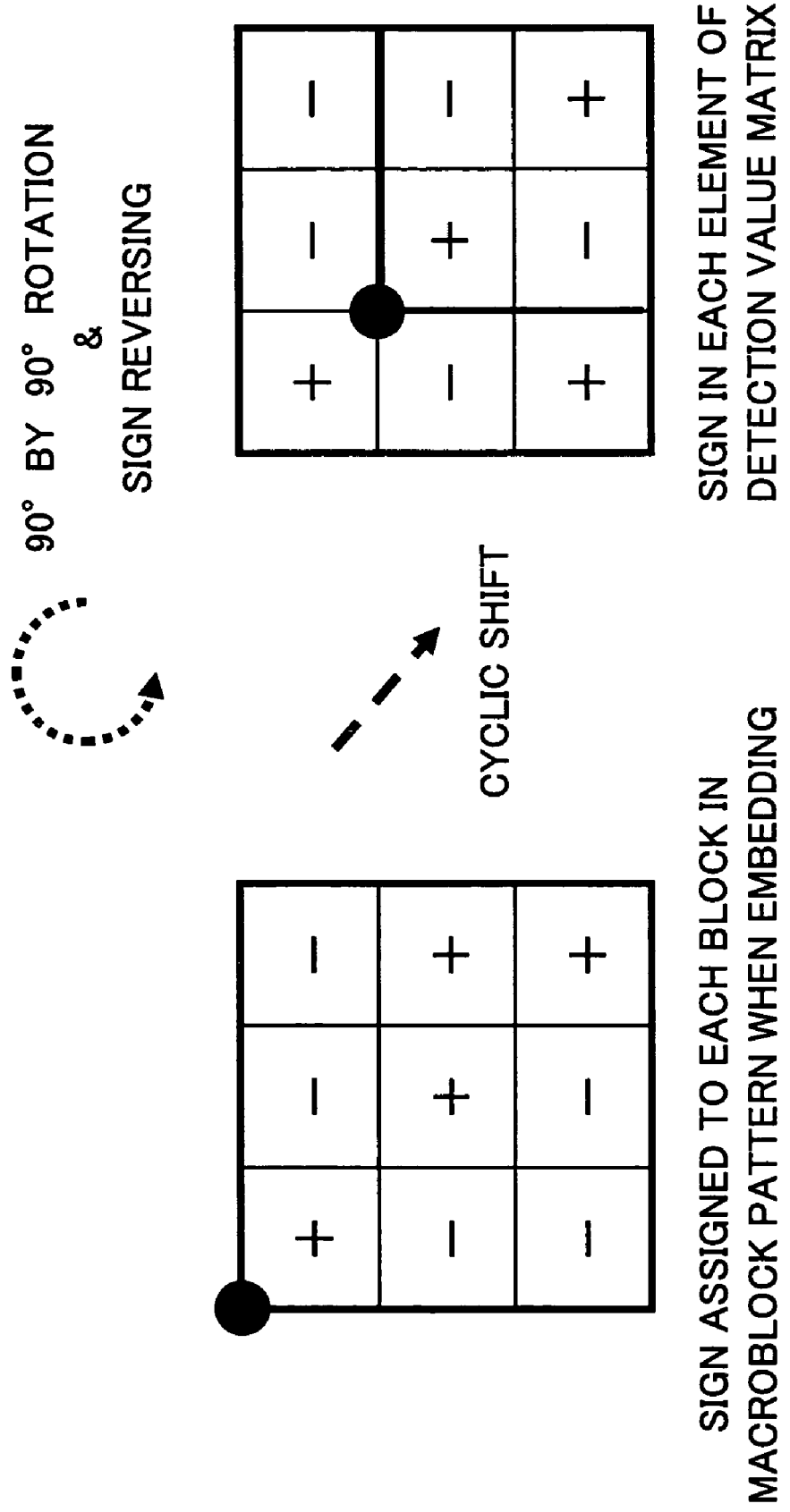
FIG. 58 is a diagram for explaining the detection value matrix.

The detection value matrix obtained in the above-mentioned way is described with reference to FIG. 58. The left figure of the FIG. 58 indicates signs of term values of embedding series corresponding to each block in the macroblock pattern generated at the time of embedding, and the right figure indicates signs of each element of the detection value matrix obtained in the above-mentioned way. The detection value matrix generation unit 43 detects the block cut out position and cuts out blocks from the block cut out position to generate the detection value matrix. Therefore, between the added macroblock and the macroblock pattern at the time of embedding, although translation amount is synchronized in each block, there is uncertainty in translation of arrangement of blocks, that is, there is uncertainty in translation of arrangement of elements in the detection value matrix. A circle mark in the figure indicates a head position of arrangement of blocks in the macroblock pattern generated at the time of embedding. However, in the detection value matrix, since the arrangement of the elements is translated, an element position in the detection value matrix corresponds to the original head position, so that the detection value matrix as a whole is in a state in which cyclic shift is performed on the arrangement of the elements with respect to the head position. In addition, at the same time, 90° by 90° rotation component that is an uncertainty component in the linear transformation distortion correction unit 41 remains.

If the uncertainty components can be addressed, embedded watermark information can be correctly detected finally. The watermark information despreading unit 44 of this embodiment is configured from this viewpoint. In the following, the watermark information despreading unit 44 of this embodiment is described.

Figure 59:
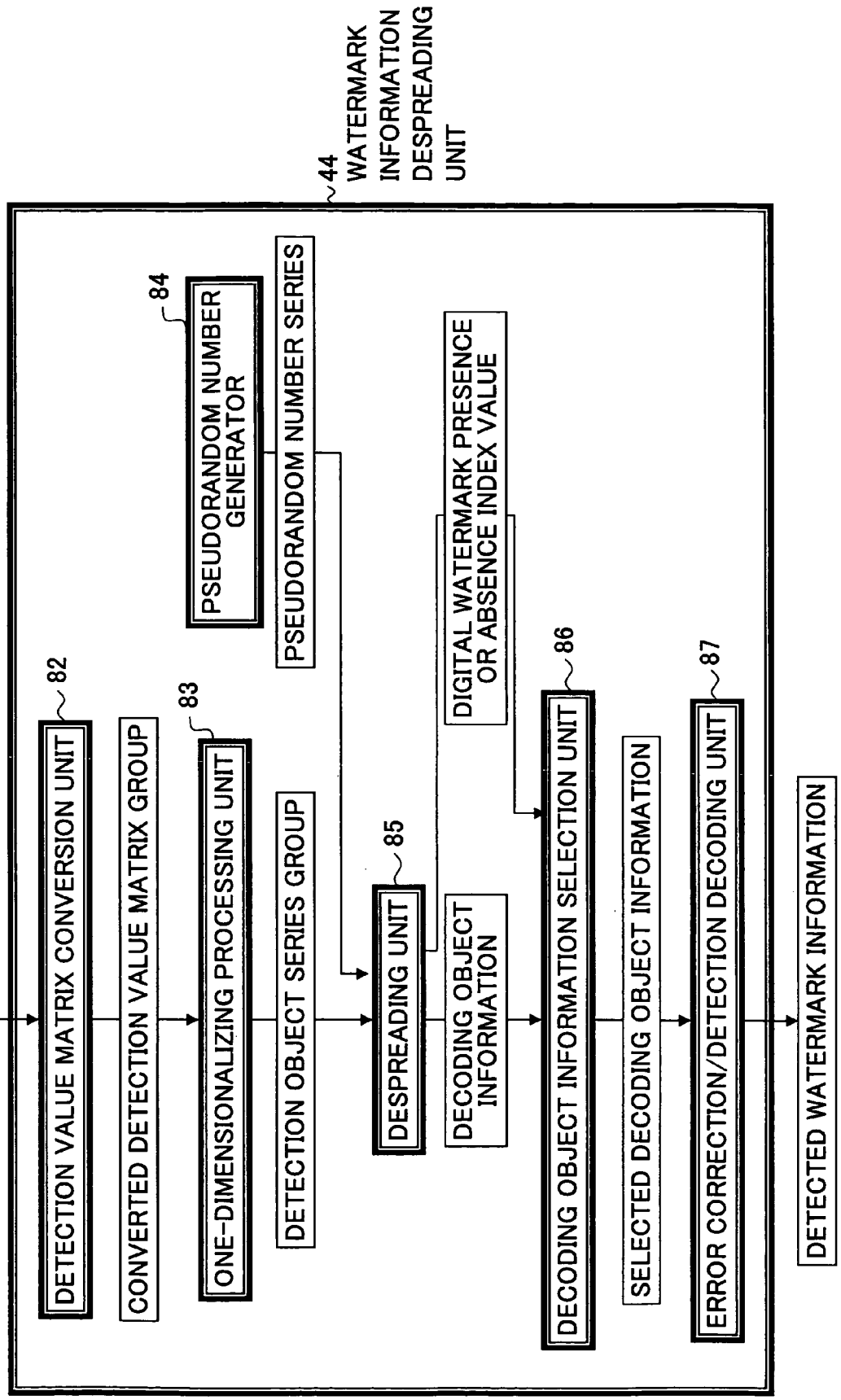
FIG. 59 is a block diagram of a watermark information despreading unit 44.
Figure 60:
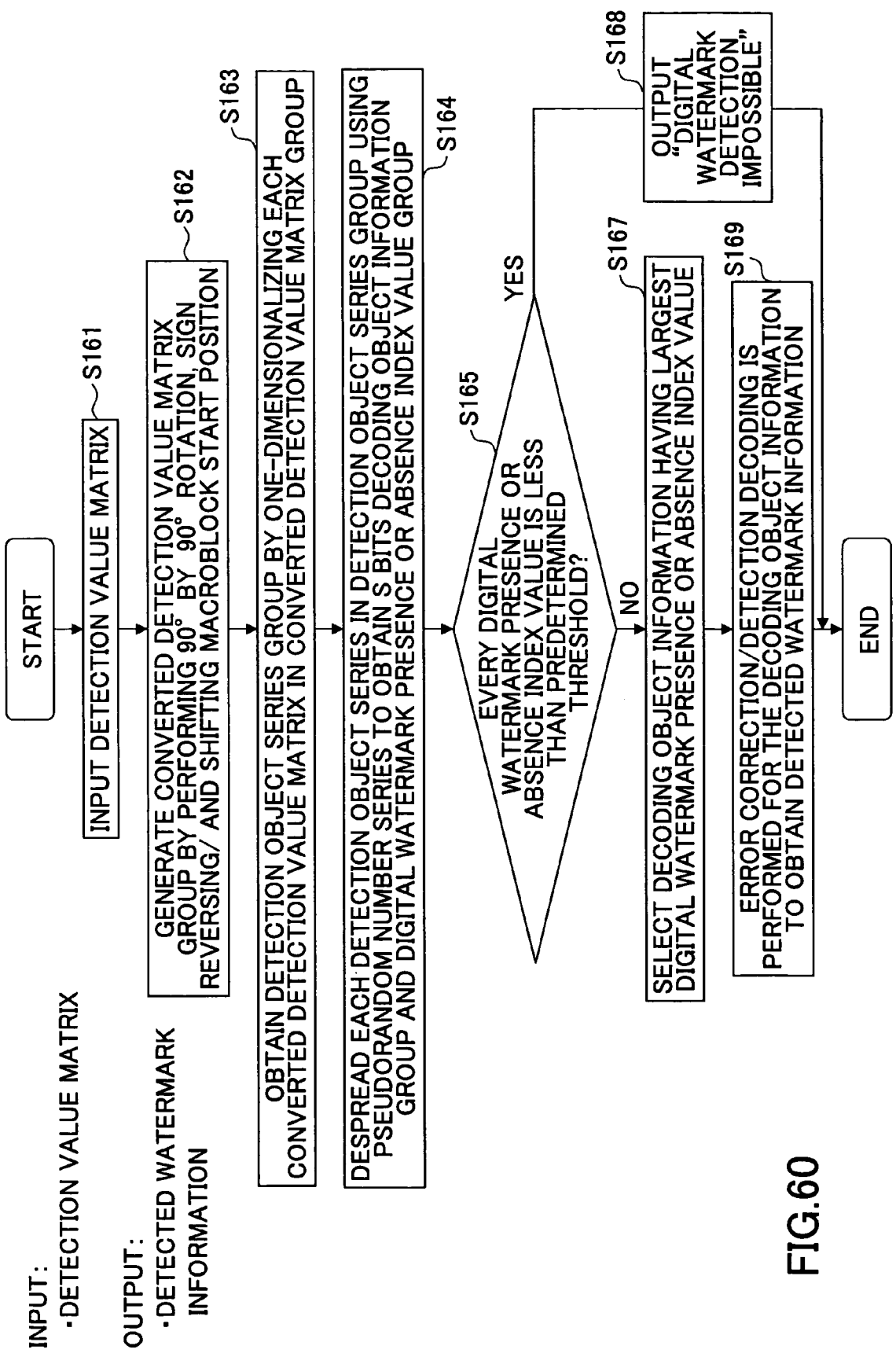
FIG. 60 is a diagram showing a process flow of the watermark information despreading unit 44.

FIG. 59 shows a configuration of a watermark information despreading unit 44 in this embodiment, and FIG. 60 shows a process flow. As shown in FIG. 59, the watermark information despreading unit 44 in the this embodiment includes a detection value matrix conversion unit 82, an one-dimensionalizing process unit 83, a pseudorandom number generation unit 84, a despreading unit 85, a decoding object information selection unit 86 and an error correction/detection decoding unit 87. The process flow of the watermark information despreading unit 44 is described with reference to FIG. 60 in the following.

The watermark information despreading unit 44 receives the detection value matrix generated in the detection value matrix generation unit 43 (step 161). First, the detection value matrix conversion unit 82 generates a converted detection value matrix group obtained by converting the detection value matrix by performing 90° by 90° rotation/sign reversing and by changing the parameter of the macroblock start position (step 162). Next, the one-dimensionalizing process unit 83 one-dimensionalizes each converted detection value matrix in the converted detection value matrix group to obtain detection object series group (step 163).

Next, the despreading unit 85 receives the pseudorandom number series generated by the pseudorandom generator 84 and the detection object series group, and performs despreading on each detection object series in the detection object series group using the pseudorandom number series to obtain decoding object information group and digital watermark presence or absence index value group (step 164).

Next, if every digital watermark presence or absence index value is less than a predetermined threshold, the decoding object information selection unit 86 outputs digital watermark detection impossible as an output of the watermark information despreading unit and ends the process (step 168), if not, decoding object information having a largest digital watermark presence or absence index is selected (step 167).

Finally, the error correction/detection decoding unit 87 performs error correction/detection decoding on the selected decoding object information to obtain detected watermark information (step 169). At this time, when an error is detected in the decoding object information, if the error is correctable, correction is performed and detected watermark information is output. If uncorrectable error is detected, digital watermark detection impossible is output.

In the following, each unit of the watermark information despreading unit 44 is described in more detail.

Figure 61:
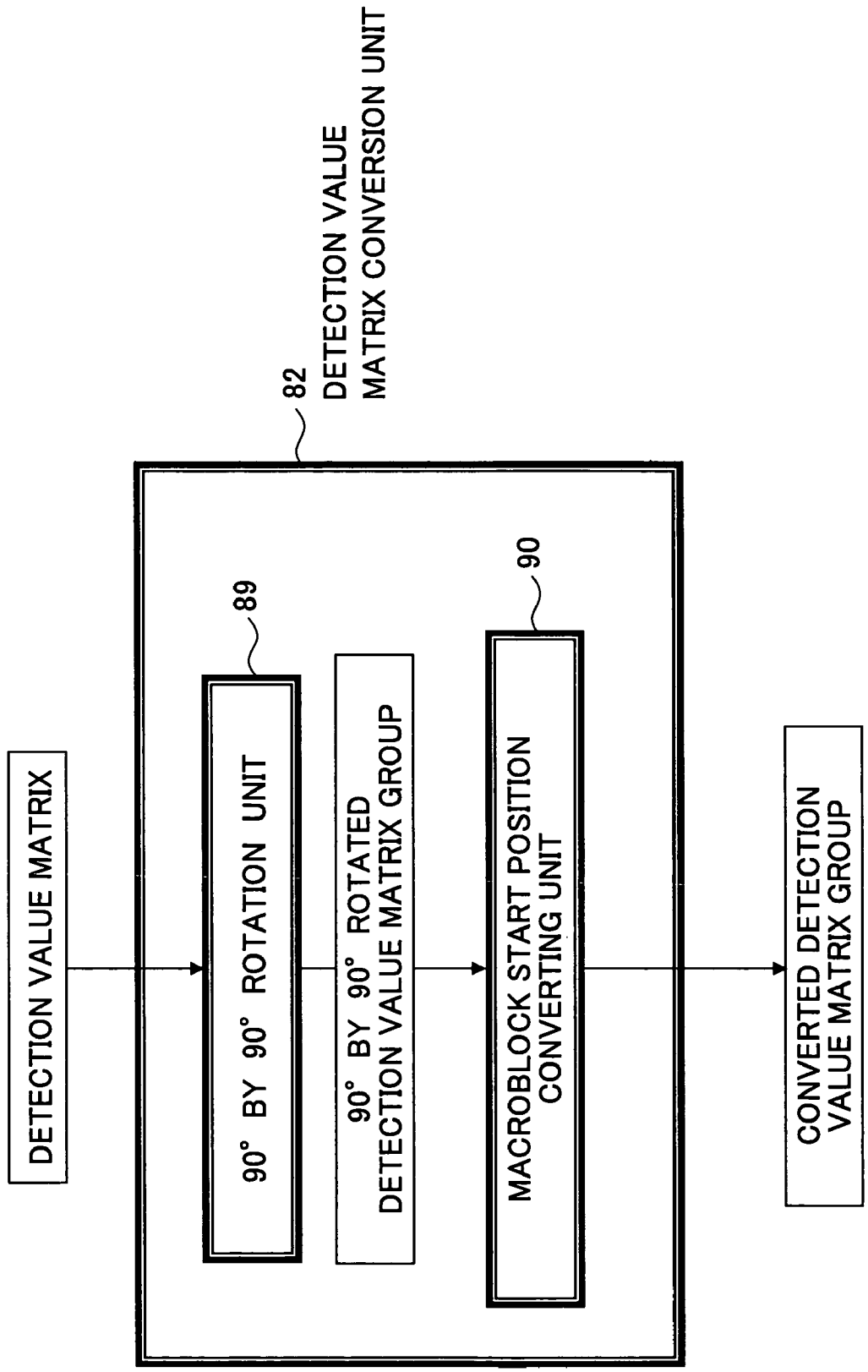
FIG. 61 is a block diagram of a detection value matrix conversion unit 82.
Figure 62:
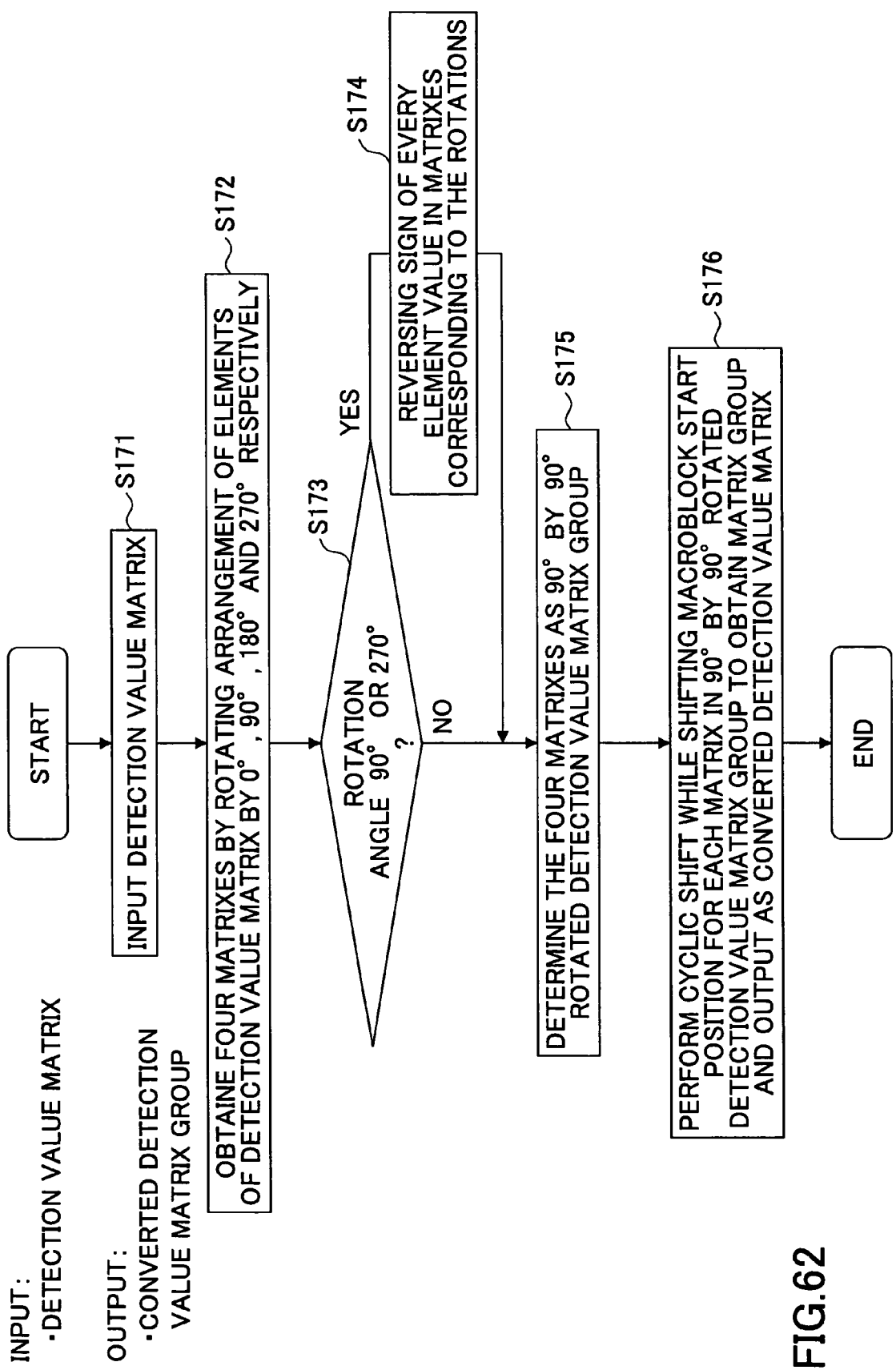
FIG. 62 is a diagram showing a process flow of the detection value matrix conversion unit 82.

FIG. 61 shows a configuration of the detection value matrix conversion unit 82 in this embodiment, and FIG. 62 shows a process flow. As shown in FIG. 61, the detection value matrix conversion unit 82 includes a 90° by 90° rotation unit 89 and a macroblock start position conversion unit 90.

Figure 63:
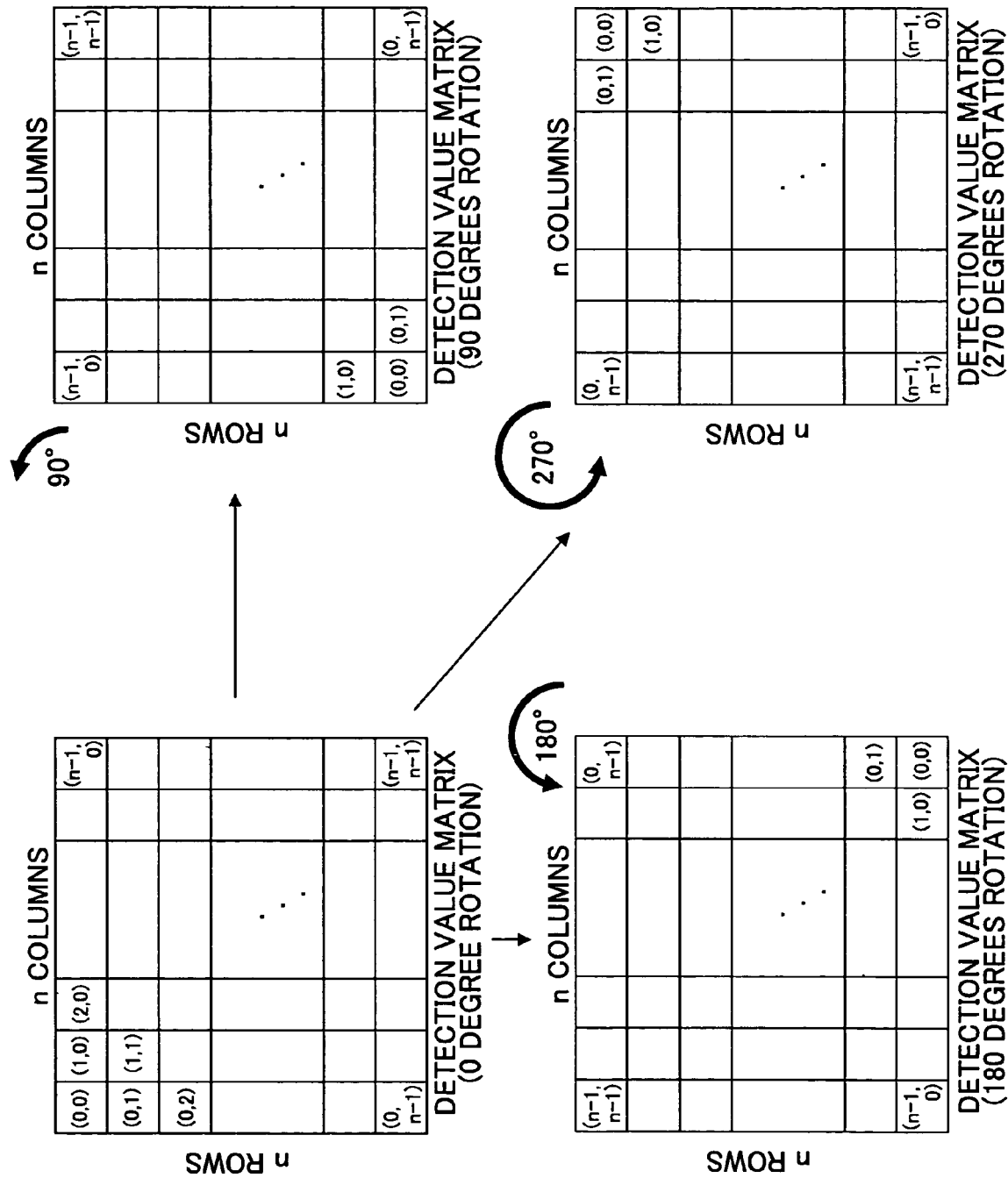
FIG. 63 is a diagram for explaining processes of a 90° by 90° rotation unit 89.
Figure 64:
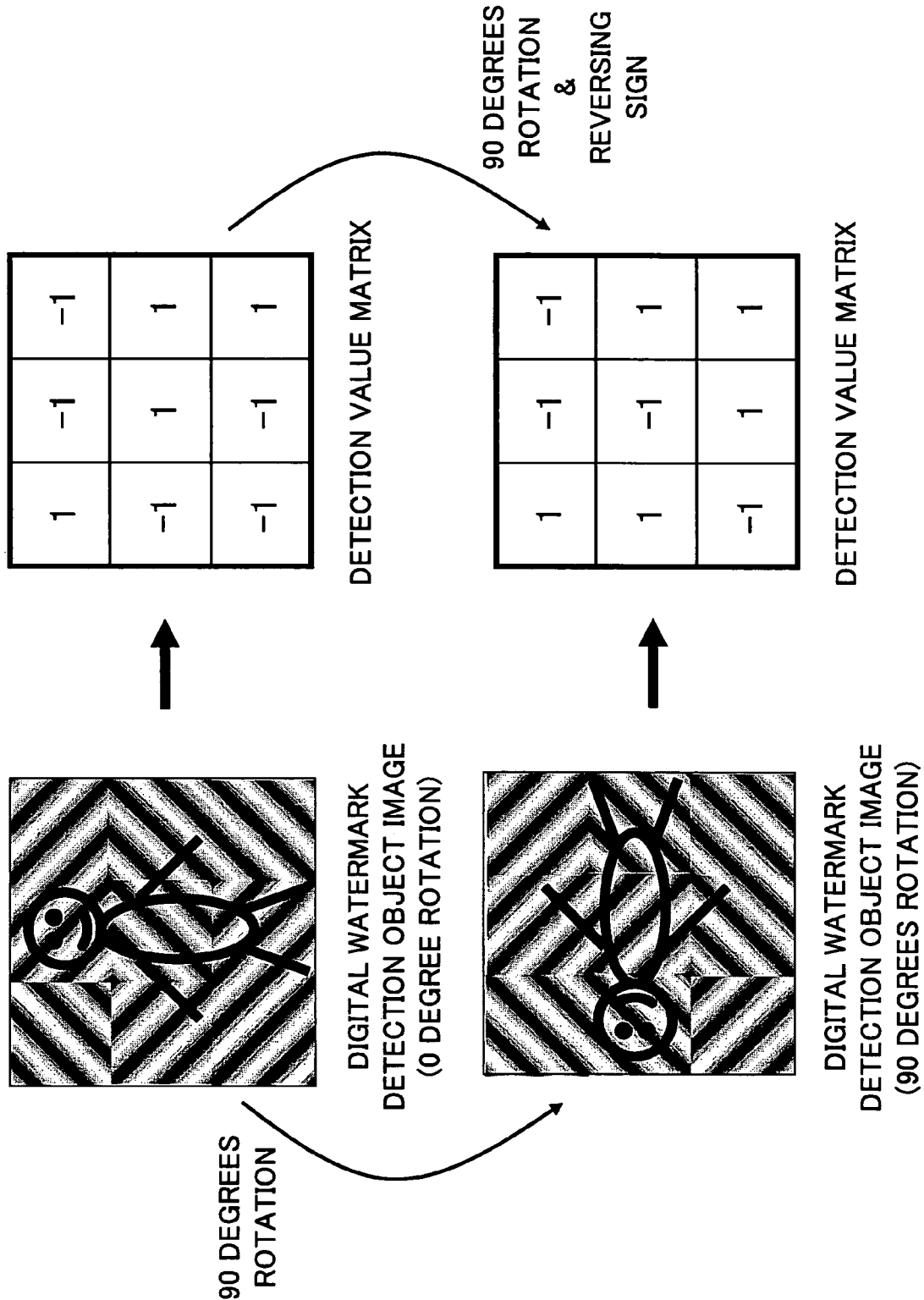
FIG. 64 is a diagram for explaining processes of the 90° by 90° rotation unit 89.

As shown in FIG. 62, the detection value matrix conversion unit 82 receives the detection value matrix (step 171). First, as shown in FIG. 63, the 90° by 90° rotation unit 89 obtains four matrixes by rotating arrangement of elements of the detection value matrix by 0 degrees, 90 degrees, 180 degrees and 270 degrees respectively (step 172). Next, among the four matrixes, signs of all element values of matrixes corresponding to 90 degree rotation and 270 degree rotation respectively are reversed. The reason is, as shown in FIG. 64, that, when the image is rotated by 90 degrees or 270 degrees, the waveform pattern at the time of embedding is reversed so that the sign of the detection value obtained by the image is reversed. By performing the above process, the four matrixes are obtained as a rotated detection value matrix group (step 175).

Figure 65:
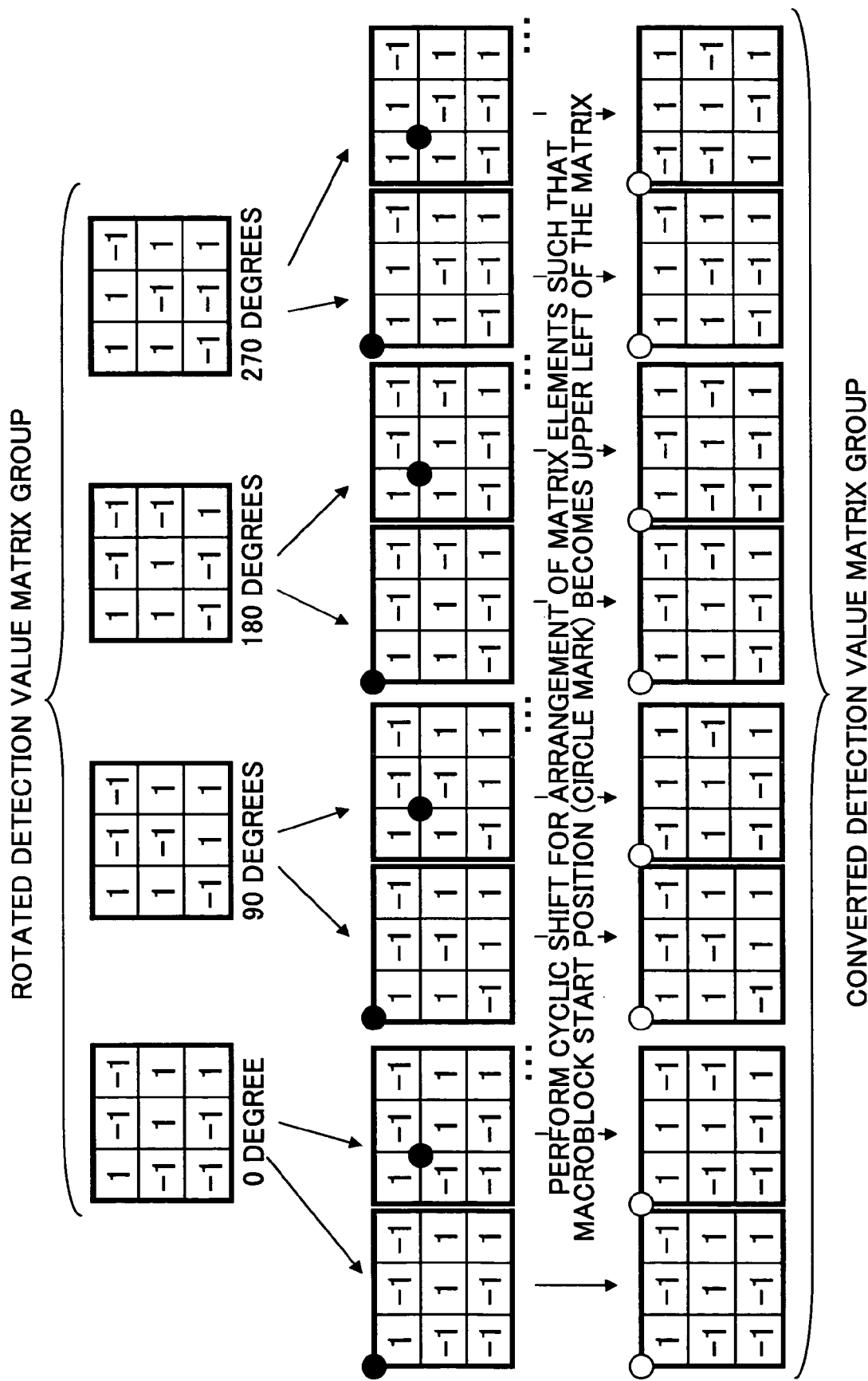
FIG. 65 is a diagram for explaining processes of a macroblock start position conversion unit 90.

Next, as shown in FIG. 65, the macroblock start position conversion unit 90 performs cyclic shift, for each rotated detection value matrix in the rotated detection value matrix group, such that, assuming that the macroblock start position is each element position of the matrix, the element position is moved to an upper left position of the matrix, so as to sequentially obtain matrixes in which the cyclic shift is performed and determine all of the obtained matrixes as the converted detection value matrix group (step 176). Assuming the detection value matrix is a n×n matrix, the converted detection value matrix group includes $4n^2$ converted detection value matrixes in total.

Figure 66:
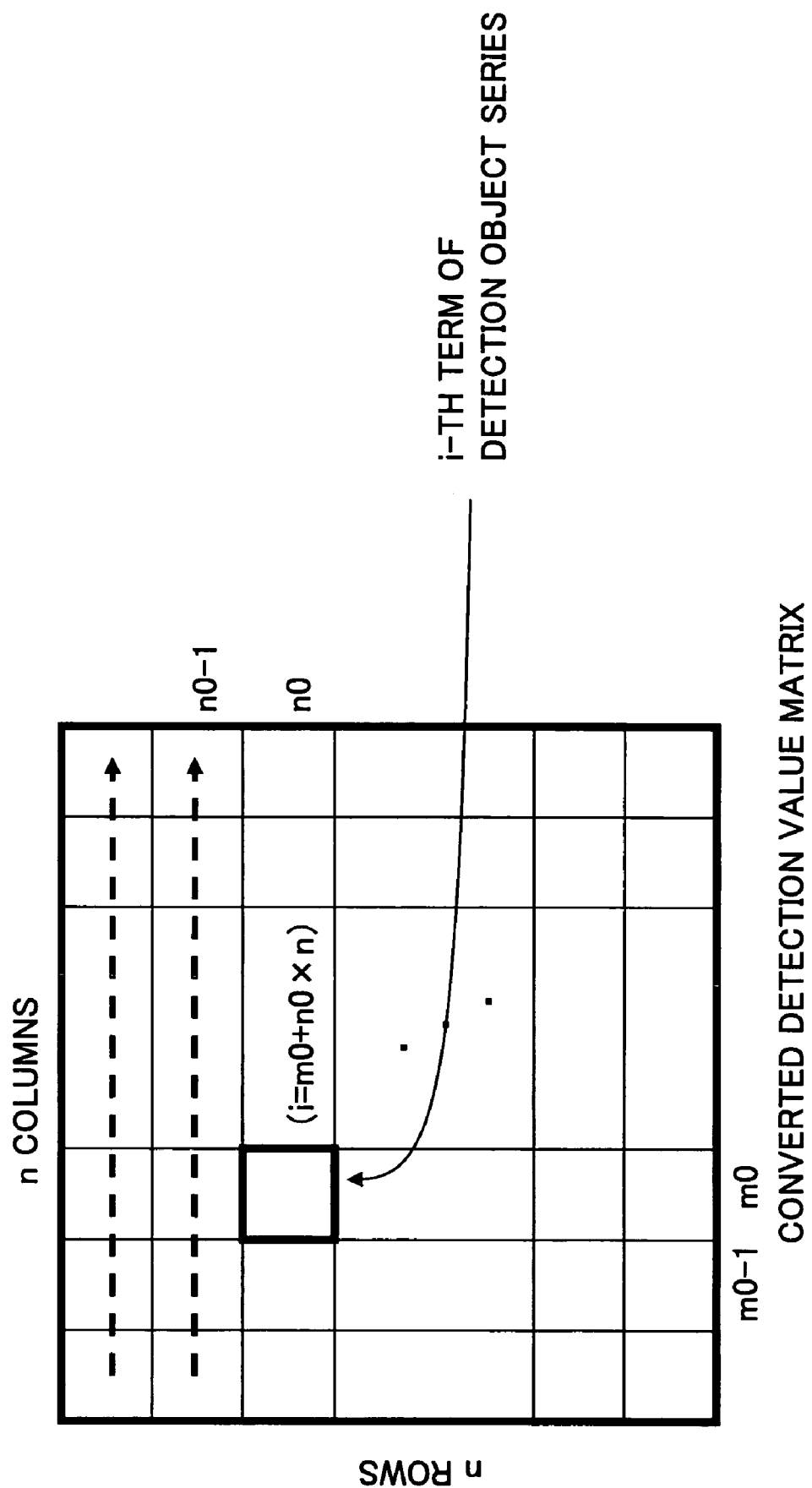
FIG. 66 is a diagram for explaining processes of a one-dimensionalizing unit 83.

Next, the process of the one-dimensionalizing process unit 83 in the watermark information despreading unit 44 in this embodiment is described with reference to FIG. 66. The one-dimensionalizing process unit 83 receives the converted detection value matrix group, and, for each converted detection value matrix, one-dimensionalizes elements of the matrix by using a rule the same as in the macroblock setting unit 19 at the time of embedding to obtain detection object series. After the detection object series is obtained from every converted detection value matrix, these are output as a detection object series group.

Next, the despreading unit 85 in this embodiment is described in the following. The despreading unit 85 receives the detection object series group and pseudorandom number series generated in the pseudorandom generator 84. The pseudorandom number series is generated by using the pseudorandom generator the same as one in the digital watermark embedding apparatus 10. The despreading unit 85 performs despreading on each detection object series in the detection object series group to obtain decoding object information.

As a concrete despreading method, following methods corresponding to spreading methods at the time of embedding can be used:

(A) When the detection object series is $\{d_i\}$ (i=0~mn−1) and the pseudorandom number series is $\{r_i\}$ (i=0~mn−1), the decoding object information (S bits) $\{c_k\}$ (k=0~S−1) is obtained in the following way, $Cor_k$ is obtained by $$Cor_k = (\Sigma_{(i=0\sim mn-1)\cap(i\%S=k)}(d_i \times r_i))/SQRT(\Sigma_{(i=0\sim mn-1)\cap(i\%S=k)}d_i^2)(k=0\sim S-1)$$

and the bit value is determined in the following way:

$$Cor_k \geq 0 \rightarrow c_k = \text{``1''}$$

$$Cor_k < 0 \rightarrow c_k = \text{``0''}$$

wherein $r_i$ is a random number series in which $r_i=1$ or −1. In addition, x % y is a surplus when dividing x by y, and SQRT(•) indicates square root.

(B) When the detection object series is $\{d_i\}$ (i=0~mn−1) and two types of pseudorandom number series are generated which are $\{r1_i\}$ (i=0~mn−1) and $\{r2_i\}$ (i=0~mn−1) respectively, the decoding object information (S bits) $\{c_k\}$ (k=0~S−1) is obtained in the following way. First, an array $\{p_i\}$ used for permutation is generated using $\{r1_i\}$ in the same way in embedding.

Next, $Cor_k$ is obtained by $$Cor_k = (\Sigma_{(i=0 \sim mn-1) \cap (pi\%S=k)}(d_{pi} \times r2_{pi}))/SQRT$$
$$(\Sigma_{(i=0 \sim mn-1) \cap (i\%S=k)}d_{pi}^2)(k=0 \sim S-1)$$

and the bit value is determined in the following way:

$$Cor_k >= 0 \rightarrow c_k = \text{"1"}$$

$$Cor_k < 0 \rightarrow c_k = \text{"0"}$$

wherein $r2_i$ is a random number series in which $r_i=1$ or $-1$. In addition, x % y is a surplus when dividing x by y, and SQRT(•) indicates square root.

(C) When the detection object series is $\{d_i\}$ (i=0~mn−1) and the pseudorandom number series is $\{r_i\}$ (i=0~mn−1), the decoding object information (S bits) $\{c_k\}$ (k=0~S−1) is obtained in the following way.

$Cor_k$ is obtained by $$Cor_k = (\Sigma_{(i=0 \sim mn-1)}(d_i \times r_{(i+k)\%mn}))/SQRT(\Sigma_{(i=0 \sim mn-1)}d_i^2)$$
$$(k=0 \sim S-1)$$

and the bit value is determined in the following way:

$$Cor_k >= 0 \rightarrow c_k = \text{"1"}$$

$$Cor_k < 0 \rightarrow c_k = \text{"0"}$$

wherein $r_i$ is a random number series in which $r_i=1$ or $-1$. In addition, x % y is a surplus when dividing x by y, and SQRT(•) indicates square root.

The despreading unit 85 generates digital watermark presence or absence index value with the decoding object information. This value is an index value indicating detected signal strength of the decoding object information obtained by despreading. In the examples of the above-mentioned (A), (B) and (C), the digital watermark presence or absence index value E is calculated in the following way, for example.

$$E = \Sigma_{(k=0 \sim S-1)}|Cor_k|$$

The reason why the digital watermark presence or absence index value functions effectively is described with reference to FIG. 67. (1) in FIG. 67 shows values of $Cor_k$ when digital watermark detection is properly performed. (2) shows values of $Cor_k$ when digital watermark detection is not properly performed for reasons such as that digital watermark is not embedded and that a detection object image having distortion too large to detect the digital watermark signal is provided. As shown in FIG. 67, when the watermark can be properly detected, since correlation between random number series used for embedding and detection object series obtained from the detection object image is high, the absolute value of each of $Cor_k$ becomes large. On the other hand, when detection is not properly performed, the absolute value of each of $Cor_k$ becomes small. In the despreading examples (A), (B) and (C) in this embodiment, since correlation with the random number series is always calculated after normalizing the norm of the detection object series, the evaluation can be performed with the same criterion for different detection object images and for different watermark information. As mentioned above, as shown in the right side of FIG. 67, the digital watermark presence or absence index value E that is absolute value sum of $Cor_k$ becomes a large value for the case of (1), and becomes a small value for the case of (2). Therefore, as mentioned later, by using a predetermined threshold α, it can be determined whether digital watermark detection can be correctly performed. In a case where a partial error is corrected in the detected watermark information using the error correction code, generally there is a risk that erroneous correction (correct to wrong code) may occur when error exceeding correction ability occurs in the error correction code. However, as mentioned later, the problem of the erroneous correction can be avoided by combining with threshold determination of the digital watermark presence or absence index value.

The despreading unit 85 outputs all of the decoding object information obtained in the above-mentioned way together as a decoding object information group, and all of the digital watermark presence or absence index values together as a digital watermark presence or absence index value group.

In the following, the decoding object information selection unit 86 in this embodiment is described. The decoding object information selection unit 86 receives the decoding object information group and the digital watermark presence or absence index value group, and performs threshold determination using a predetermined threshold on each digital watermark presence or absence index value in the digital watermark presence or absence index value group. When every digital watermark presence or absence index value is less than the threshold, digital watermark detection impossible is output as an output of the watermark information despreading unit and the process ends. When at least one digital watermark presence or absence index value equal to or greater than the threshold exists, a largest digital watermark presence or absence index value is specified, and decoding object information corresponding to the largest digital watermark presence or absence index value is selected from the decoding object information group, and the decoding object information is output.

The error correction/detection decoding unit 87 in this embodiment is described in the following. The error correction/detection decoding unit 87 receives the decoding object information, and performs error correction/detection decoding on the decoding object information to obtain detected watermark information. At this time, when an error is detected in the decoding object information, if the error is correctable, the error is corrected so that detected watermark information is output. If an uncorrectable error is detected, digital watermark detection impossible is output.

The order of the decoding object information selection unit 86 and the error correction/detection decoding unit 87 can be changed. That is, first, the error correction/detection decoding unit 87 performs error correction/detection decoding on each decoding object information in the decoding object information group so that decoding object information including correctable error are selected. If uncorrectable error is detected in every decoding object information, digital watermark detection impossible is output. Next, the decoding object information selection unit 86 performs threshold determination on each digital watermark presence or absence index value corresponding to decoding object information including correctable error. If every index value is less than the threshold, digital watermark detection impossible is output. If not, information obtained by performing error correction/detection decoding on decoding object information corresponding to a largest digital watermark presence or absence index value is output as detected watermark information.

In addition, in the above-mentioned embodiment, although it is described that all of the converted detection value matrixes are generated beforehand and processes after that are performed together, processes from generation of the converted detection value matrixes to error correction/detection decoding may be performed sequentially so that, when threshold determination by the digital watermark presence or absence index value and correction ability check by the correction/detection process are passed, the process may be interrupted to output the detected watermark information. By adopting this procedure, expected value of process time until detection process ends becomes about half of the above-mentioned example. In addition, loop exit may be determined by only one of the threshold determination by the digital watermark presence or absence index value and the correction ability check by the error correction/detection process, so that when the loop exit occurs, another determination process is performed. Then, when the another check is passed, the detected watermark information is output, and when the check is not passed, the loop process continues. Accordingly, the speed of the process in the loop increases, so that the speed can be further increased.

Further, the digital watermark detection presence or absence index value/despreading calculation may be performed for a partial series in the detection object series. For example, the calculation may be performed for the first half of the decoding object information so as to perform threshold determination for an obtained digital watermark presence or absence index value. If the value is equal to or greater than the threshold, remaining despreading process is performed and detected watermark information is output by error correction/detection decoding. This process can be performed because there is a possibility that the digital watermark detection presence or absence index value is output as an adequate value for determining digital watermark detection presence or absence even for the partial series having some length. According to this process, process amount of the digital watermark detection presence or absence index value/despreading calculation is only necessary for the partial series in the detection object series, the speed of the process can be increased.

As described so far, according to the present embodiment, digital watermark detection can be performed by correcting affine transformation (linear transformation + translation) added to the image without using the frame line and the like. In addition, without independently adding a signal for geometric distortion correction separately from digital watermark information as performed conventionally, the pattern representing the digital watermark information also functions as the signal for geometric distortion correction, so that the problem of the interference of signals is solved and detection performance improves.

Each apparatus described in each embodiment can be realized by installing a program for executing functions of the apparatus in a computer including a CPU, storage devise and the like. The program can be distributed by storing it in a recording medium such as a CD-ROM or a memory, and can be distributed via a network.

The present invention is not limited to the specifically disclosed embodiments, and variations and modifications may be made without departing from the scope of the invention.

The invention claimed is:

1. A digital watermark embedding apparatus for embedding digital watermark information by superimposing macroblock patterns on an image, the digital watermark embedding apparatus comprising:
 a digital watermark information spreading unit for spreading input digital watermark information to obtain an embedding series having a length corresponding to a number of pixel blocks of a macroblock pattern;
 a waveform pattern setting unit for selecting at least a frequency from among predetermined plural frequencies according to a term value of the embedding series corresponding to a position of a pixel block in the macroblock pattern, and setting a waveform pattern corresponding to the selected frequency as a pixel of the pixel block; and
 a macroblock pattern superimposing unit for amplifying, with an embedding strength value, the macroblock pattern on which a waveform pattern is superimposed on each pixel block by the waveform pattern setting unit, and superimposing the macroblock pattern on an input image like a tile.

2. The digital watermark embedding apparatus as claimed in claim 1, wherein the waveform pattern setting unit quantizes the term value of the embedding series, and selects the at least a frequency according to the quantized value.

3. The digital watermark embedding apparatus as claimed in claim 1, wherein the waveform pattern setting unit selects the at least a frequency according to a sign of the term value of the embedding series.

4. The digital watermark embedding apparatus as claimed in claim 1, wherein the waveform pattern setting unit sets the waveform pattern on each pixel block while changing phases such that, among plural pixel blocks on which waveform patterns of the same frequency are set in the macroblock pattern, phases of the waveform patterns are aligned on the macroblock pattern.

5. The digital watermark embedding apparatus as claimed in claim 1, wherein the macroblock superimposing unit superimposes the macroblock pattern on the input image while changing phases of waveform patterns of the same frequency in pixel blocks in the macroblock pattern such that phases of the waveform patterns of the same frequency are aligned on the image after the macroblock pattern is superimposed.

6. A digital watermark detection apparatus for detecting digital watermark information from an image on which macroblock patterns each being formed by arranging pixel blocks including plural waveform patterns are superimposed, the digital watermark detection apparatus comprising:
 a linear transformation distortion correction unit for performing linear transformation distortion correction for an input image by using at least two peak position information in a power spectrum matrix obtained by performing discrete Fourier transform on an input image and predetermined reference position information;
 an added macroblock generation unit for dividing, from an arbitrary position, the linear transformation distortion corrected image into macroblocks each having a size of the macroblock pattern, and adding the macroblocks obtained by the division to generate an added macroblock;
 a frequency-by-frequency filter processed image group generation unit for applying a convolution process using each of convolution operators corresponding to predetermined plural kinds of frequencies on the added macroblock to obtain filter processed images each corresponding to one of the frequencies;
 a search position setting unit for setting coordinates of a point in a predetermined search region;
 a block cut out position response value calculation unit for performing block dividing on each image in the filter processed images each corresponding to one of the frequencies using the coordinates as a block cut out position, obtaining pixel blocks located in the same block position from the images each corresponding to one of the frequencies, obtaining, for each pixel block in the pixel blocks located in the same block position, sum of absolute values of pixel values of all pixels in the pixel block to obtain a pixel absolute value sum group and obtain a largest value in the pixel absolute value sum group as a largest absolute value sum, and performing processes for obtaining the largest absolute value sum for every block position to obtain total sum of largest absolute value sums and output the total sum as a block cut out position response value;

a block cut out position detection unit for obtaining block cut out position response values by the block cut out position response value calculation unit for each point in the search region set by the search position setting unit, and detecting, as the block cut out position, coordinates corresponding to a largest block cut out position response value among block cut out position response values corresponding to each point;

a detection value matrix configuration unit for performing block dividing on each image of the filter processed images each corresponding to one of the frequencies using the block cut out position detected by the block cut out position detection unit, and from each image corresponding to one of the frequencies, obtaining, for each pixel block in a pixel block group corresponding to the same block position, sum of absolute values of pixel values of all pixels in the pixel block, and using at least a frequency corresponding to a pixel block having the largest absolute sum to obtain an element value of a detection value matrix corresponding to a block position of the pixel block, and performing processes for obtaining the element value for every pixel block to obtain the detection value matrix; and a watermark information despreading unit for obtaining a detection object series from the detection value matrix, and despreading the detection object series to obtain detected digital watermark information.

7. The digital watermark detection apparatus as claimed in claim 6, wherein the watermark information despreading unit includes:

a rotation unit for generating four matrices by rotating arrangement of elements of the detection value matrix by 0 degree, 90 degrees, 180 degrees and 270 degrees respectively, and reversing each sign of all elements of two matrices rotated by 90 degrees and 270 degrees respectively;

a conversion unit for performing, for each of four matrices obtained by the rotation unit, a process for cyclically shifting elements such that a particular element position in the matrix moves to a predetermined position so as to obtain a converted detection value matrix group for each element position;

a unit for obtaining a detection object series group from each matrix in the converted detection value matrix group, and outputting, as the detected digital watermark information, a most reliable piece of information in an information group obtained by despreading each detection object series in the detection object series group.

8. The digital watermark detection apparatus as claimed in claim 6, wherein the plural frequencies are two kinds of frequencies associated with a sign + and a sign − respectively, and the detection value matrix configuration unit determines a value, as the element value of the detection value matrix corresponding to the block position of the pixel block, by subtracting an absolute value sum of the pixel block corresponding to a frequency associated with the sign − from an absolute value sum of the pixel block corresponding to a frequency associated with the sign +.

9. The digital watermark detection apparatus as claimed in claim 6, wherein the plural frequencies are two kinds of frequencies associated with a sign + and a sign − respectively, the detection value matrix configuration unit determines a value, as the element value of the detection value matrix corresponding to the block position of the pixel block, by adding a sign corresponding to a frequency associated with a pixel block having a larger absolute value sum to an absolute value of a difference between absolute value sums of pixel blocks corresponding to the two kinds of frequencies.

10. A digital watermark embedding method in a digital watermark embedding apparatus for embedding digital watermark information by superimposing macroblock patterns on an image, the digital watermark embedding method comprising:

a digital watermark information spreading step of spreading input digital watermark information to obtain an embedding series having a length corresponding to a number of pixel blocks of a macroblock pattern;

a waveform pattern setting step of selecting at least a frequency from among predetermined plural frequencies according to a term value of the embedding series corresponding to a position of a pixel block in the macroblock pattern, and setting a waveform pattern corresponding to the selected frequency as a pixel of the pixel block; and a macroblock pattern superimposing step of amplifying, with an embedding strength value, the macroblock pattern on which a waveform pattern is superimposed on each pixel block by the waveform pattern setting step, and superimposing the macroblock pattern on an input image like a tile.

11. The digital watermark embedding method as claimed in claim 10, wherein the waveform pattern setting step includes a step of quantizing the term value of the embedding series, and selecting the at least a frequency according to the quantized value.

12. The digital watermark embedding method as claimed in claim 10, wherein the waveform pattern setting step includes a step of selecting the at least a frequency according to a sign of the term value of the embedding series.

13. The digital watermark embedding method as claimed in claim 10, wherein the waveform pattern setting step sets the waveform pattern on each pixel block while changing phases such that, among plural pixel blocks on which waveform patterns of the same frequency are set in the macroblock pattern, phases of the waveform patterns are aligned on the macroblock pattern.

14. The digital watermark embedding step as claimed in claim 10, wherein the macroblock superimposing step superimposes the macroblock pattern on the input image while changing phases of waveform patterns of the same frequency in pixel blocks in the macroblock pattern such that phases of the waveform patterns of the same frequency are aligned on the image after the macroblock pattern is superimposed.

15. A digital watermark detection method in a digital watermark detection apparatus for detecting digital watermark information from an image on which macroblock patterns each being formed by arranging pixel blocks including plural waveform patterns are superimposed, the digital watermark detection method comprising:

a linear transformation distortion correction step of performing linear transformation distortion correction for an input image by using at least two peak position information in a power spectrum matrix obtained by performing discrete Fourier transform on the input image and predetermined reference position information;

an added macroblock generation step of dividing, from an arbitrary position, the linear transformation distortion corrected image into macroblocks each having a size of the macroblock pattern, and adding the macroblocks obtained by the division to generate an added macroblock;

a frequency-by-frequency filter processed image group generation step of applying a convolution process using each of convolution operators corresponding to predetermined plural kinds of frequencies on the added macroblock to obtain filter processed images each corresponding to one of the frequencies;

a search position setting step of setting coordinates of a point in a predetermined search region;

a block cut out position response value calculation step of performing block dividing on each image in the filter processed images each corresponding to one of the frequencies using the coordinates as a block cut out position, obtaining pixel blocks located in the same block position from the images each corresponding to one of the frequencies, obtaining, for each pixel block in the pixel blocks located in the same block position, sum of absolute values of pixel values of all pixels in the pixel block to obtain a pixel absolute value sum group and obtain a largest value in the pixel absolute value sum group as a largest absolute value sum, and performing processes for obtaining the largest absolute value sum for every block position to obtain total sum of largest absolute value sums and output the total sum as a block cut out position response value;

a block cut out position detection step of obtaining block cut out position response values by the block cut out position response value calculation unit for each point in the search region set by the search position setting unit, and detecting, as the block cut out position, coordinates corresponding to a largest block cut out position response value among block cut out position response values corresponding to each point;

a detection value matrix configuration step of performing block dividing on each image of the filter processed images each corresponding to one of the frequencies using the block cut out position detected by the block cut out position detection unit, and from each image corresponding to one of the frequencies, obtaining, for each pixel block in a pixel block group corresponding to the same block position, sum of absolute values of pixel values of all pixels in the pixel block, and using at least a frequency corresponding to a pixel block having the largest absolute sum to obtain an element value of a detection value matrix corresponding to a block position of the pixel block, and performing processes for obtaining the element value for every pixel block to obtain the detection value matrix; and a watermark information despreading step of obtaining a detection object series from the detection value matrix, and despreading the detection object series to obtain detected digital watermark information.

16. The digital watermark detection method as claimed in claim 15, wherein the watermark information despreading step includes:

a rotation step of generating four matrixes by rotating arrangement of elements of the detection value matrix by 0 degree, 90 degrees, 180 degrees and 270 degrees respectively, and reversing each sign of all elements of two matrixes rotated by 90 degrees and 270 degrees respectively;

a conversion step of performing, for each of four matrixes obtained by the rotation unit, a process for cyclically shifting elements such that a particular element position in the matrix moves to a predetermined position so as to obtain a converted detection value matrix group for each element position; and a step of obtaining a detection object series group from each matrix in the converted detection value matrix group, and outputting, as the detected digital watermark information, a most reliable piece of information in an information group obtained by despreading each detection object series in the detection object series group.

17. The digital watermark detection method as claimed in claim 15, wherein the plural frequencies are two kinds of frequencies associated with a sign + and a sign − respectively, and the detection value matrix configuration step includes a step of determining a value, as the element value of the detection value matrix corresponding to the block position of the pixel block, by subtracting an absolute value sum of the pixel block corresponding to a frequency associated with the sign − from an absolute value sum of the pixel block corresponding to a frequency associated with the sign +.

18. The digital watermark detection method as claimed in claim 15, wherein the plural frequencies are two kinds of frequencies associated with a sign + and a sign − respectively, the detection value matrix configuration step includes a step of determining a value, as the element value of the detection value matrix corresponding to the block position of the pixel block, by adding a sign corresponding to a frequency associated with a pixel block having a larger absolute value sum to an absolute value of a difference between absolute value sums of pixel blocks corresponding to the two kinds of frequencies.

19. A program for causing a computer to execute each step in the digital watermark embedding method as claimed in any one of claims 10-18.

20. A computer readable recording medium storing the program as claimed in claim 19.

* * * * *